US011227187B1

(12) United States Patent
Weinberger

(10) Patent No.: US 11,227,187 B1
(45) Date of Patent: Jan. 18, 2022

(54) GENERATING ARTIFICIAL INTELLIGENCE SOLUTIONS USING RAW DATA AND SIMULATED DATA

(71) Applicant: Augustus Intelligence Inc., New York, NY (US)

(72) Inventor: Pascal Christian Weinberger, Liederbach am Taunus (DE)

(73) Assignee: Augustus Intelligence Inc., New York, NY (US)

( * ) Notice: Subject to any disclaimer, the term of this patent is extended or adjusted under 35 U.S.C. 154(b) by 51 days.

(21) Appl. No.: 16/880,824

(22) Filed: May 21, 2020

Related U.S. Application Data

(60) Provisional application No. 62/852,245, filed on May 23, 2019.

(51) Int. Cl.
*G06K 9/62* (2006.01)
*G06N 3/04* (2006.01)
(Continued)

(52) U.S. Cl.
CPC ............. *G06K 9/6256* (2013.01); *G06N 3/04* (2013.01); *G06N 3/08* (2013.01); *G06T 3/40* (2013.01);
(Continued)

(58) Field of Classification Search
CPC ......... G06K 9/6256; G06T 3/40; G06T 5/007; G06T 3/60; G06T 7/11;
(Continued)

(56) References Cited

U.S. PATENT DOCUMENTS 10,438,094 B1 * 10/2019 Ko ..................... G06K 9/6218
10,657,461 B2    5/2020 McMahan et al.
(Continued)

FOREIGN PATENT DOCUMENTS

WO    2019112667 A1    6/2019

OTHER PUBLICATIONS

Lauter, K., et al., "Can Homomorphic Encryption be Practical?", Proceedings of the 3rd ACM Cloud Computing Security Workshop, CCSW 2011, Chicago, IL, USA, Oct. 21, 2011, 18 pages.
(Continued)

*Primary Examiner* — Charlotte M Baker
(74) *Attorney, Agent, or Firm* — Athorus, PLLC

(57) ABSTRACT

Artificial intelligence systems are created for end users based on raw data received from the end users or obtained from any source. Training, validation and testing data is maintained securely and subject to authentication prior to use. A machine learning model is selected for providing solutions of any type or form and trained, verified and tested by an artificial intelligence engine using such data. A trained model is distributed to end users, and feedback regarding the performance of the trained model is returned to the artificial intelligence engine, which updates the model on account of such feedback before redistributing the model to the end users. When an end user provides data to an artificial intelligence engine and requests a trained model, the end user monitors progress of the training of the model, along with the performance of the model in providing quality artificial intelligence solutions, via one or more dashboards.

20 Claims, 35 Drawing Sheets

(51) Int. Cl.
　　　*G06N 3/08*　　　(2006.01)
　　　*G06T 3/60*　　　(2006.01)
　　　*G06T 3/40*　　　(2006.01)
　　　*G06T 7/11*　　　(2017.01)
　　　*G10L 15/22*　　　(2006.01)
　　　*G10L 15/19*　　　(2013.01)
　　　*G10L 15/06*　　　(2013.01)
　　　*G06T 5/00*　　　(2006.01)

(52) U.S. Cl.
　　　CPC ............... *G06T 3/60* (2013.01); *G06T 5/007* (2013.01); *G06T 7/11* (2017.01); *G10L 15/063* (2013.01); *G10L 15/19* (2013.01); *G10L 15/22* (2013.01); *G06T 2207/20081* (2013.01); *G06T 2207/20084* (2013.01); *G06T 2207/20132* (2013.01)

(58) Field of Classification Search
　　　CPC . G06T 2207/20084; G06T 2207/20081; G06T 2207/20132; G10L 15/19; G10L 15/063; G10L 15/22; G06N 3/04; G06N 3/08
　　　USPC ......................................................... 382/157
　　　See application file for complete search history.

(56) References Cited

U.S. PATENT DOCUMENTS

2017/0221072 A1\*　8/2017　AthuluruTlrumala .. H04W 8/18
2017/0364539 A1　12/2017　Jacob et al.
2020/0065966 A1\*　2/2020　Spencer ................... G06T 7/70

OTHER PUBLICATIONS

Yang, T., et al., "Applied Federated Learning: Improving Google Keyboard Query Suggestions." arXiv preprint arXiv:1812.02903, https://arxiv.org/pdf/1812.02903.pdf (2018), 9 pages.

\* cited by examiner

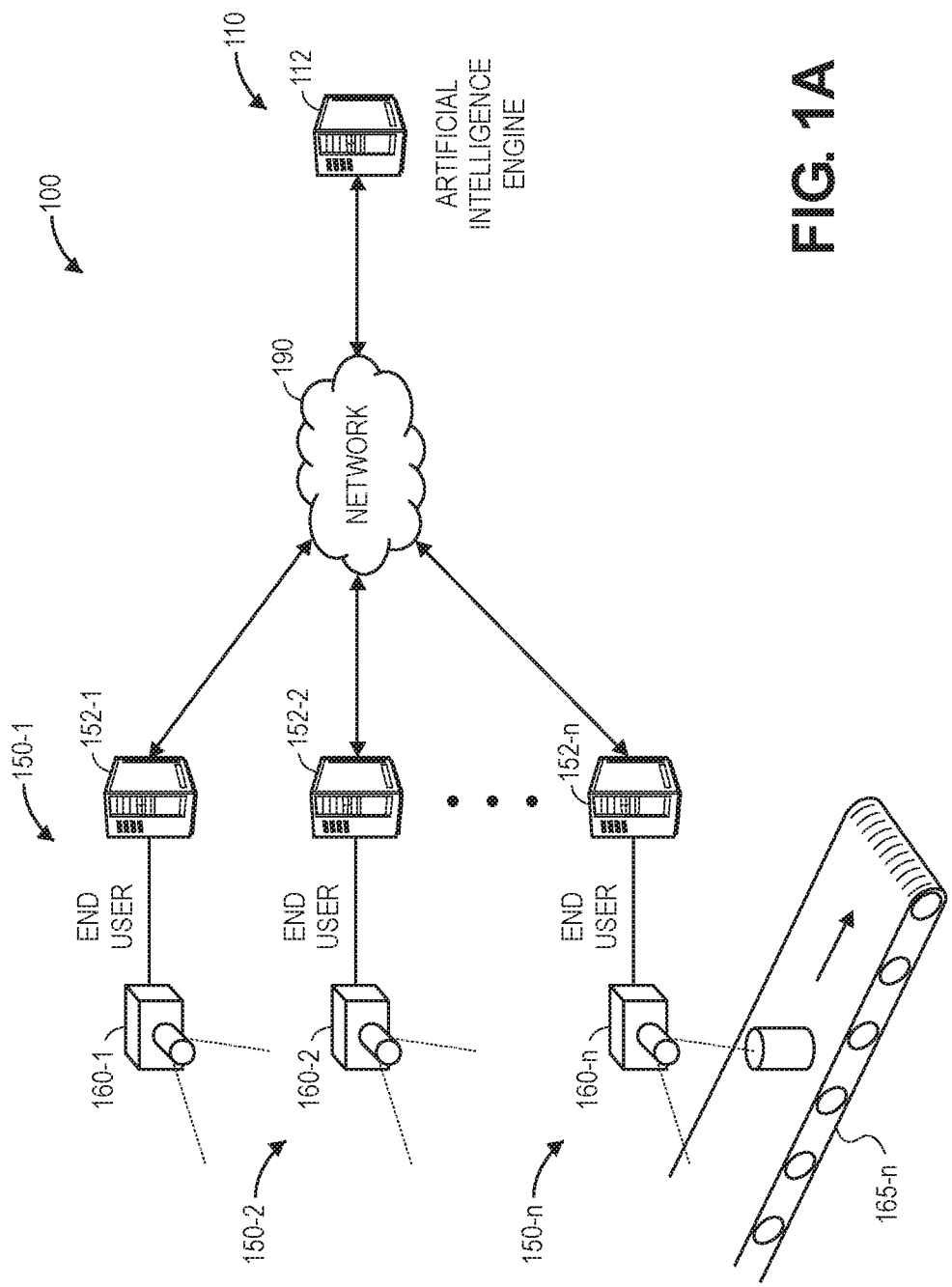

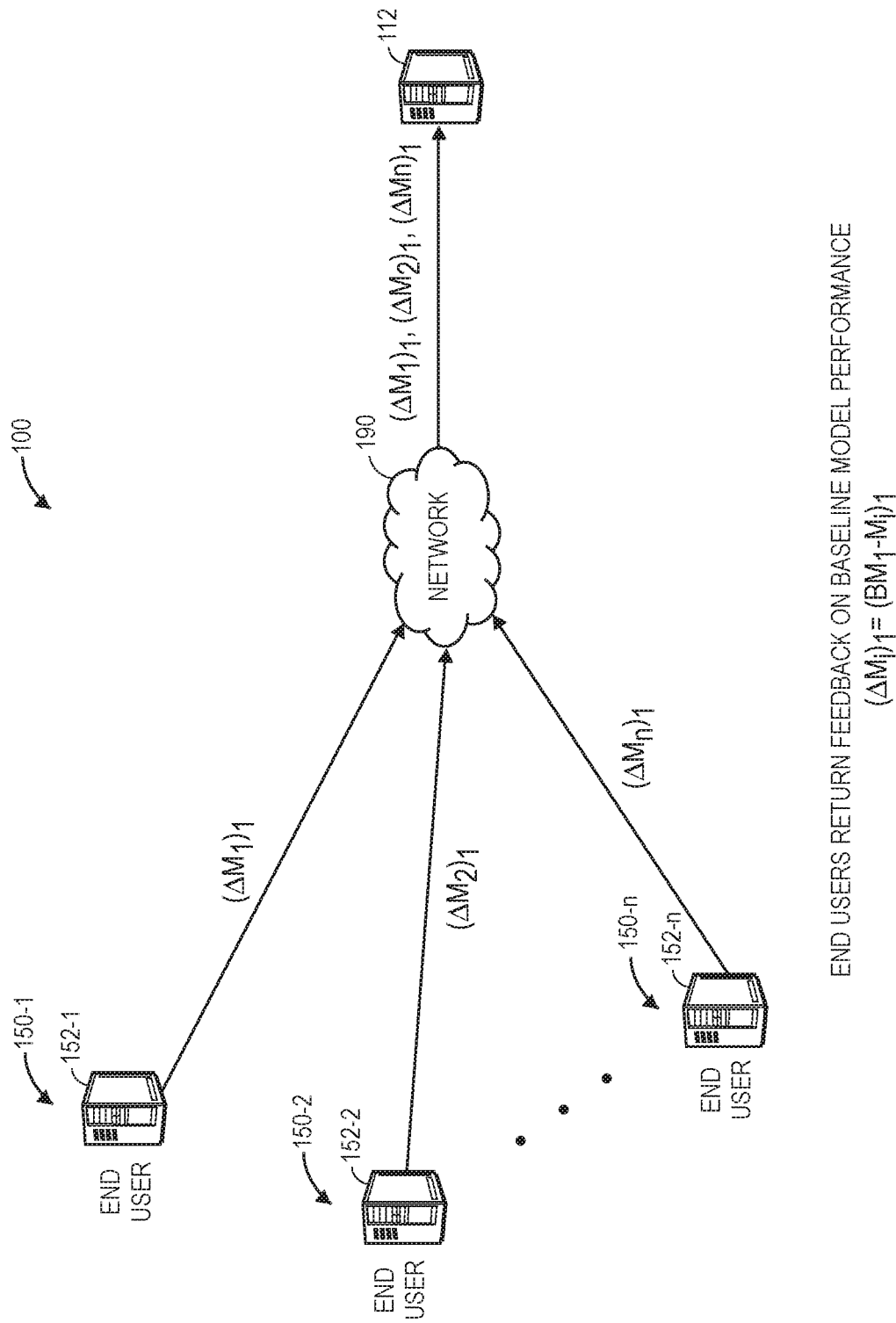

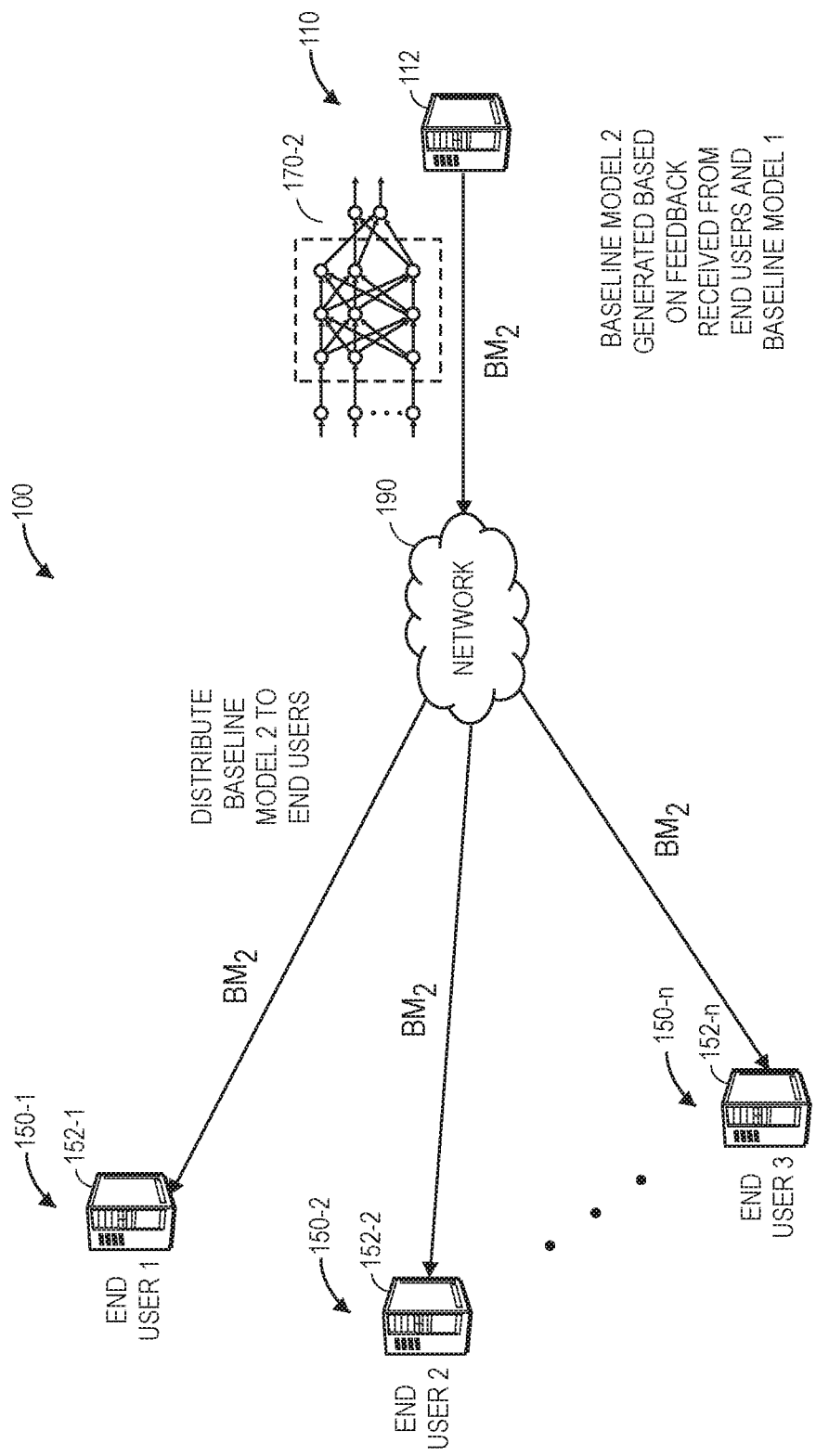

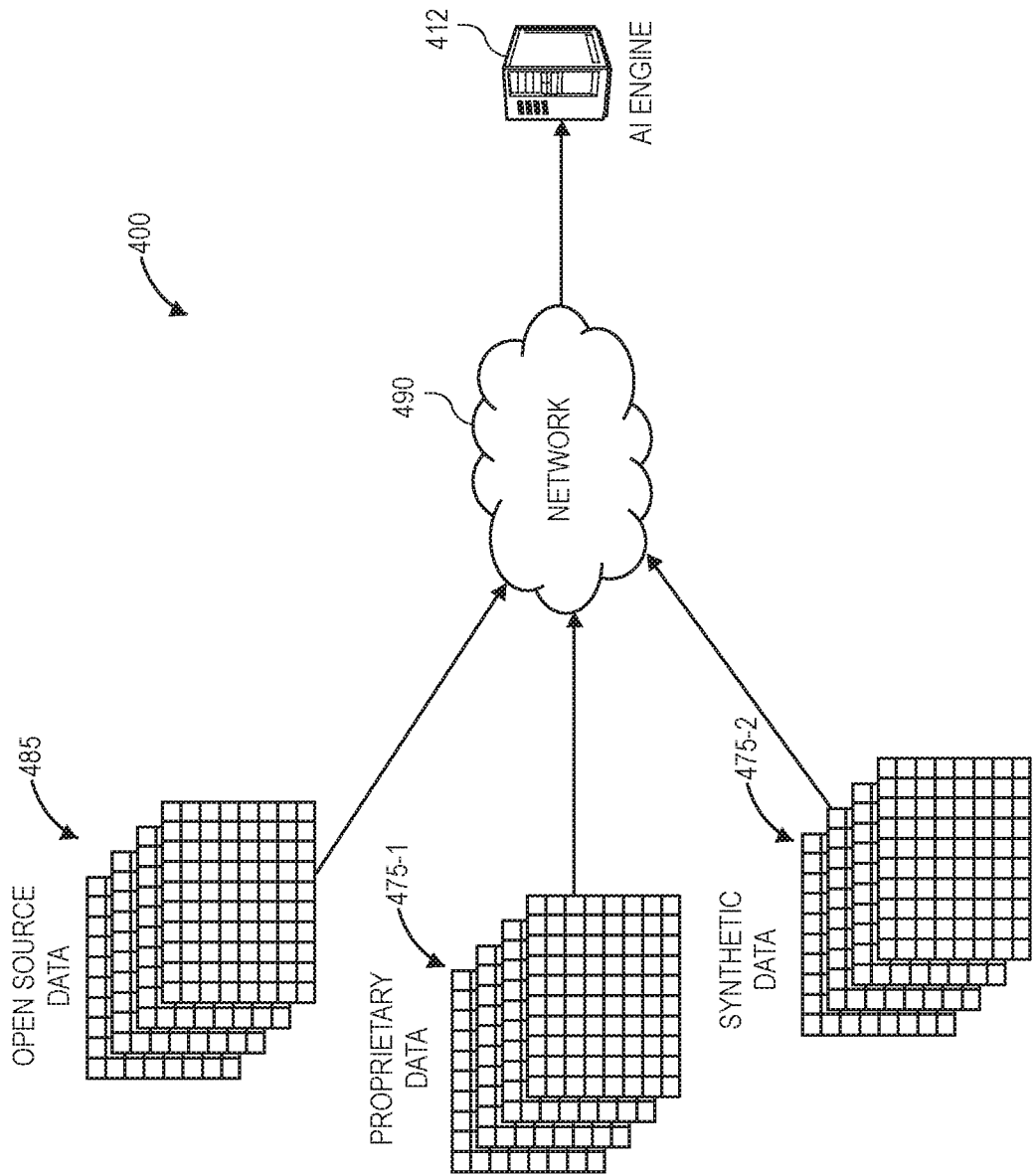

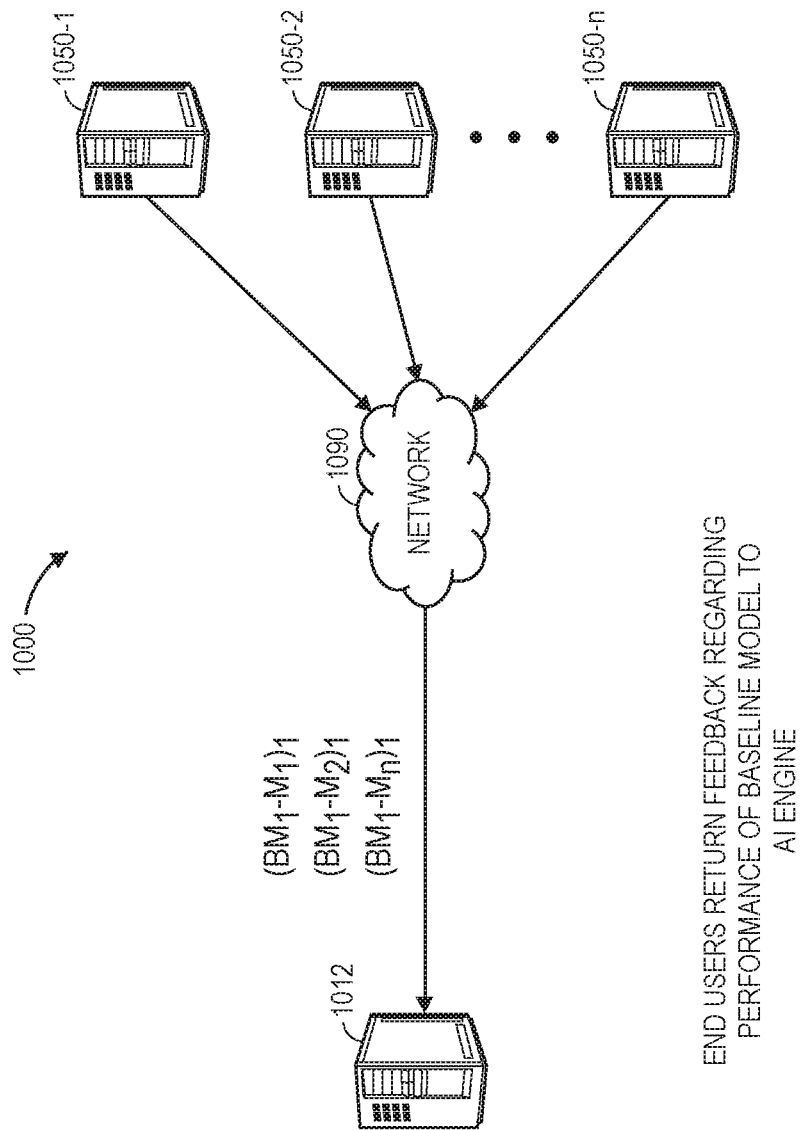

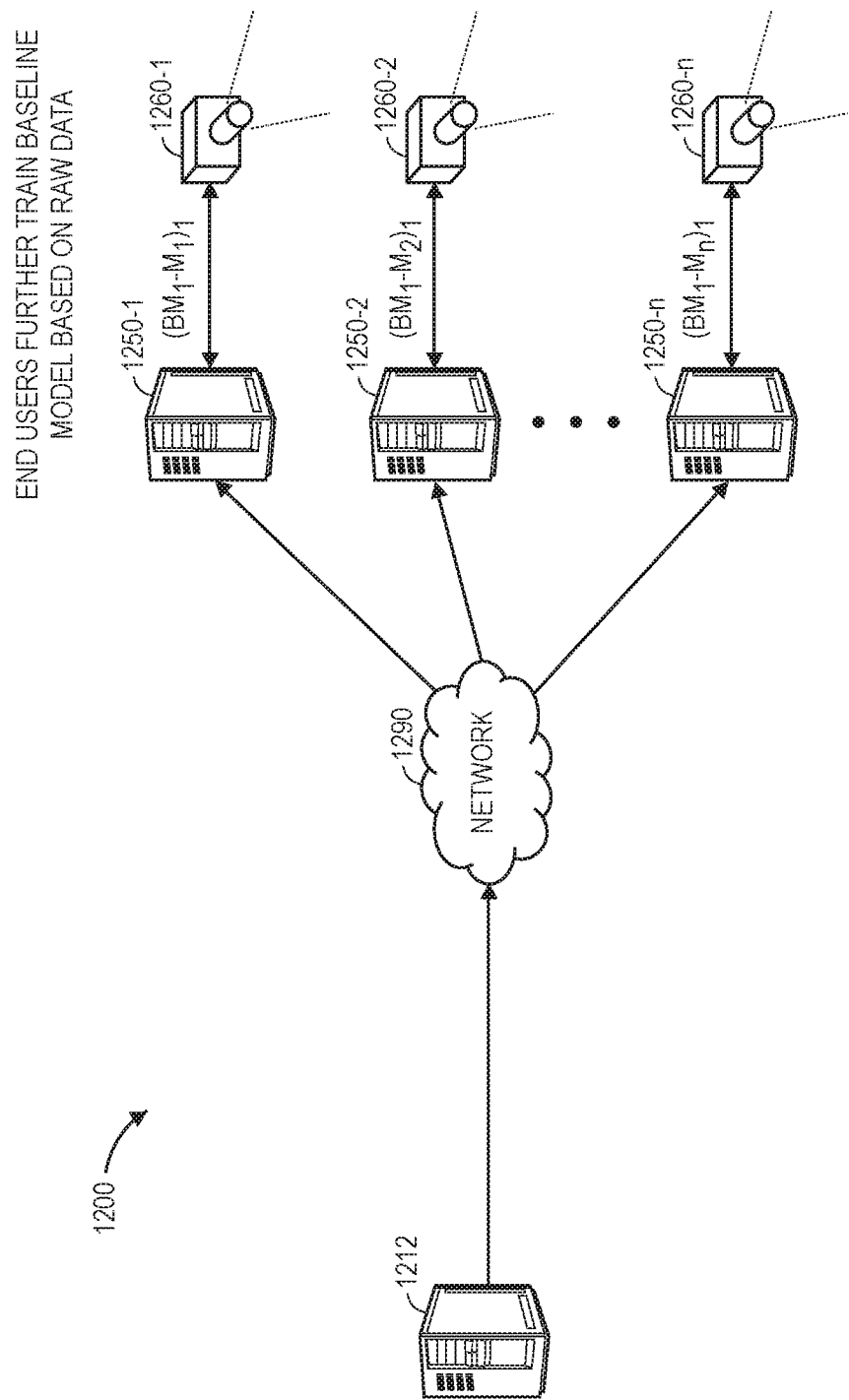

GENERATING ARTIFICIAL INTELLIGENCE SOLUTIONS USING RAW DATA AND SIMULATED DATA

CROSS-REFERENCE TO RELATED APPLICATIONS

This application claims priority to U.S. Patent Application No. 62/852,245, filed May 23, 2019, the contents of which are incorporated by reference herein in their entirety.

BACKGROUND

Advancements in processing capacity and network connectivity have enabled computers to permeate into nearly every aspect of the human experience. For example, what we now know as the computer processor was born from the development of a number of components in the mid-20th Century, such as vacuum tube processors, transistors, integrated circuits and printed circuit boards. Since then, computer processors have been integrated into machines ranging from wrist watches to rockets, and become ever smaller over time, while growing faster and increasingly powerful according to an observed trend commonly referred to as Moore's Law.

Similarly, the Internet traces its roots to ARPANET, a packet-switching network of computers that was established by the United States Department of Defense during the Cold War. Eventually, civilian computer networks such as BITNET, which began with a single network link between Yale University and the City University of New York in 1981, joined universities and government institutions over networked connections according to the Transmission Control Protocol and Internet Protocol, or TCP/IP. Internet connectivity ultimately reached into businesses and homes via dial-up systems, subscriber lines and television networks, and eventually through wireless components such as transceivers, modems or routers. Today, a theory known as the "Internet of things" predicts a world of the future in which a variety of systems, machines, objects or people are interconnected via wired or wireless computer networks, and seamlessly transfer information or data between one another.

Artificial intelligence is a term that was first coined in the 1950s, and generally refers to the simulation of intelligent human behavior in computers, or the capability of a computer-based machine to learn and imitate intelligent human behavior, particularly in the making of intelligent decisions. Computer devices may effectively "learn" human behavior by providing a set of training data that includes training inputs and training outputs (or "targets") to a machine learning model or algorithm, in an effort to train the model or algorithm to learn patterns within the training inputs and to associate such training inputs with their corresponding training outputs or targets. During a training process, other data, e.g., a set of validation data including validation inputs and validation outputs, is used to validate the training of the model or algorithm with respect to data that was not used for training the model or algorithm. Finally, after the training process is complete, still other data, e.g., a set of test data that includes both test inputs and test outputs, is used to obtain an unbiased evaluation of the model or algorithm.

Unlike processors or network connectivity, however, artificial intelligence has yet to be adopted into mainstream computer systems or networks on a wide scale. Some hurdles to making artificial intelligence available to the masses include, but are not limited to, the fact that generating machine learning models typically requires highly skilled programmers and engineers, and top-heavy investments in computer infrastructure. For these reasons, and others, the many benefits of artificial intelligence are presently limited to substantially large and sophisticated entities having both the will and the means to obtain timely and relevant data associated with a task, to generate machine learning models that are best suited for performing the task, and to train such models using the timely and relevant data.

BRIEF DESCRIPTION OF THE DRAWINGS

FIGS. 1A through 1G are views of aspects of one system in accordance with embodiments of the present disclosure.

FIGS. 4A through 4C are views of aspects of one system in accordance with embodiments of the present disclosure.

FIGS. 10A through 10D are views of aspects of one system in accordance with embodiments of the present disclosure.

FIGS. 12A through 12E are views of aspects of one system in accordance with embodiments of the present disclosure.

DETAILED DESCRIPTION

Figure 1B:
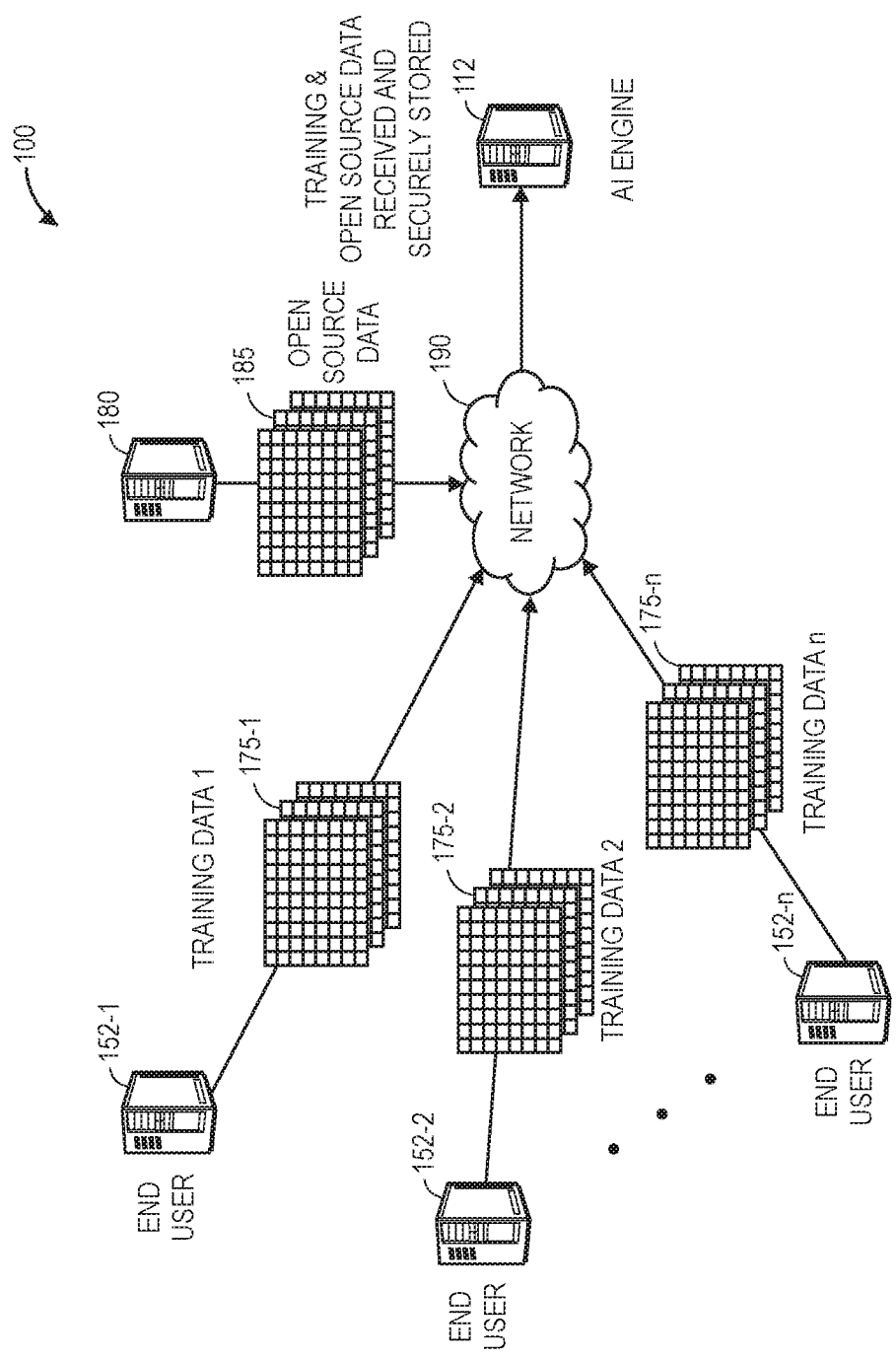

As is set forth in greater detail below, the present disclosure is directed to generating and updating trained machine learning models for providing artificial intelligence solutions to end users using relevant data received from the end users or from other sources. More specifically, the systems and methods of the present disclosure make artificial intelligence solutions available to end users at scales and levels of quality that are presently beyond the core capacities of their personnel or the availability of their technical infrastructure. Such end users may include companies, customers or other clients that are engaged in task-based operations of any sizes, durations or complexity, and in any fields or industries. The systems and methods of the present disclosure thereby lower barriers to entry to artificial intelligence for end users of any levels of sophistication, and provide them with well-trained models even where the end users have limited amounts of data, while protecting their data through the process, and presenting them with easy, intuitive systems for monitoring the process from cradle to grave.

In accordance with the present disclosure, an artificial intelligence engine or other computer device or system may generate and train machine learning models of any type or form are generated behalf of end users, or in concert with such end users, e.g., according to one or more federated learning techniques. The artificial intelligence engine or other device or system may select or train a machine learning model for performing a task for an end user, or for multiple end users, based on any attributes or characteristics of the task or of data ordinarily required to perform the task. Sets of data for training the machine learning model may be obtained from such end users or from any other sources, e.g., open sources, and augmented or supplemented by simulated data that is generated based on the data received by the artificial intelligence engine from the end users or the open sources, as necessary. Trained machine learning models may be furnished to the end users, and updated based on feedback received from the end users or newly available data. Feedback may be returned to the artificial intelligence engine in any manner and in any format. For example, the feedback may represent the effectiveness or level of performance of a model in performing a task on behalf of one or more end users, and may be encrypted according to one or more algorithms or protocols (e.g., homomorphic encryption algorithms), or unencrypted. Furthermore, an artificial intelligence solution in accordance with the present disclosure may utilize one or more sets of rules, as well as trained machine learning models. Where a result associated with a given data point may be more accurately or easily obtained by evaluating the data point with respect to one or more rules, the data point need not be provided to a trained machine learning model, which may then be freed to determine results for data points that may not be accurately or easily processed according to any of the rules.

Referring to FIGS. 1A through 1G, views of aspects of one system in accordance with the present disclosure are shown. As is shown in FIG. 1A, a system 100 includes an artificial intelligence engine (or other data processing system) 110 and a plurality of end users 150-1, 150-2 . . . 150-$n$. The artificial intelligence engine 110 operates a server 112 or other computer device or machine having one or more processors, memory components or other data storage components. Each of the end users 150-1, 150-2 . . . 150-$n$ includes a computer device 152-1, 152-2 . . . 152-$n$ in communication with a sensor 160-1, 160-2 . . . 160-$n$ associated with the performance of a task. For example, as is shown in FIG. 1A, each of the sensors 160-1, 160-2 . . . 160-$n$ comprises an imaging device configured to capture data for use in the performance of one or more computer vision, anomaly detection or other image-based tasks. Additionally, each of the computer devices 152-1, 152-2 . . . 152-$n$ is in communication with the server 112 over a network 190, which may include the Internet in whole or in part.

As is shown in FIG. 1B, each of the end users 150-1, 150-2 . . . 150-$n$ may provide sets of training data 175-1, 175-2 . . . 175-$n$ to the server 112 over the network 190. The training data 175-1, 175-2 . . . 175-$n$ may include any relevant information, data or metadata regarding one or more tasks of interest to the end users 150-1, 150-2 . . . 150-$n$. For example, where the end users 150-1, 150-2 . . . 150-$n$ are engaged in the performance of computer vision-related tasks, the training data 175-1, 175-2 . . . 175-$n$ may include sets of images along with one or more annotations of relevant aspects of such images, as applicable. Such annotations may be applied to the respective images themselves, or stored in one or more data files or records, which may include one or more coordinate pairs identifying the relevant aspects depicted within the respective images. Where the end users 150-1, 150-2 . . . 150-$n$ are engaged in the performance of anomaly detection-related tasks, the training data 175-1, 175-2 . . . 175-$n$ may include data (e.g., images) representing one or more anomalous and anomaly-free conditions, as well as metadata or other records identifying the presence of such anomalies within such data. Where the end users 150-1, 150-2 . . . 150-$n$ are engaged in the performance of voice recognition or natural language processing tasks, the training data 175-1, 175-2 . . . 175-$n$ may include sets of acoustic data corresponding to spoken words, or representations of the acoustic data, e.g., plots or waveforms of sound amplitudes and/or frequencies, as well as labels or identifiers of words, parts of speech, participants or sentiments represented within the acoustic data.

Additionally, as is also shown in FIG. 1B, the server 112 may also receive or otherwise obtain open source data 185 from an open source 180 having one or more servers or other computer devices or machines that are connected to the network 190. The open source data 185 may be publicly or commonly available, free of charge or for a fee, and may also correspond to one or more tasks performed by the end users 150-1, 150-2 . . . 150-$n$. Whereas the training data 175-1, 175-2 . . . 175-$n$ may have been generated or obtained by the respective end users 150-1, 150-2 . . . 150-$n$, e.g., using one or more of the sensors 160-1, 160-2 . . . 160-$n$ shown in FIG. 1A, during an ordinary course of business or operation, the open source data 185 may have been generated or received by the open source 180 at any time and from any source, and made available to one or more computer devices or machines over the network 190.

The training data 175-1, 175-2 . . . 175-$n$ and/or the open source data 185 may be identified and furnished to the server 112 on any basis, and in any manner, in accordance with the present disclosure. For example, in some embodiments, the training data 175-1, 175-2 . . . 175-$n$ and/or the open source data 185 may be provided to the server 112 over the network 190 via one or more wired or wireless connections. Alternatively, the training data 175-1, 175-2 . . . 175-$n$ and/or the open source data 185 may be physically delivered to a location associated with the server 112 via a data transport system, and uploaded to the server 112 upon its arrival. Moreover, in some embodiments, data may be received from fewer than all of the end users 150-1, 150-2 . . . 150-$n$, e.g., from just one of the end users 150-1, 150-2 . . . 150-$n$, or from the open source 180. In some other embodiments, the training data 175-1, 175-2 . . . 175-$n$ and/or the open source data 185 may be augmented with simulated data, which may be modified versions of one or more data points of the training data 175-1, 175-2 . . . 175-$n$ and/or the open source data 185 received from the end users 150-1, 150-2 . . . 150-$n$, or from the open source 180. For example, where the training data 175-1, 175-2 . . . 175-$n$ or the open source data 185 includes imaging data, one or more images may be rotated, zoomed, cropped or otherwise altered, and may augment the training data 175-1, 175-2 . . . 175-$n$ or the open source data 185. Where the training data 175-1, 175-2 . . . 175-$n$ or the open source data 185 includes or describes acoustic signals, the acoustic signals or corresponding data may be filtered or otherwise altered, and the filtered or altered data may augment the training data 175-1, 175-2 . . . 175-$n$ or the open source data 185.

Upon receiving the training data 175-1, 175-2 . . . 175-$n$ and/or the open source data 185 from the end users 150-1, 150-2 . . . 150-$n$ and the open source 180, the server 112 may securely store the data in one or more data stores. For example, in some embodiments, any annotations or other information or data associated with the training data 175-1, 175-2 . . . 175-$n$ and/or the open source data 185 may be identified, evaluated and modified, as necessary, by one or more human operators other devices or machines, prior to storing the data on the server 112, or on one or more other computer devices or machines (not shown). Alternatively, or additionally, the server 112 may execute one or more authentication functions (e.g., hash functions) on the training data 175-1, 175-2 . . . 175-n and/or the open source data 185 prior to storing the data on the server 112 or elsewhere. The authentication functions may return values (e.g., hashes) representative of the contents of the respective data points within the training data 175-1, 175-2 . . . 175-n and/or the open source data 185, as well as values (e.g., hashes) representative of their respective annotations or other identifiers or metadata associated with such data points.

Figure 1C:
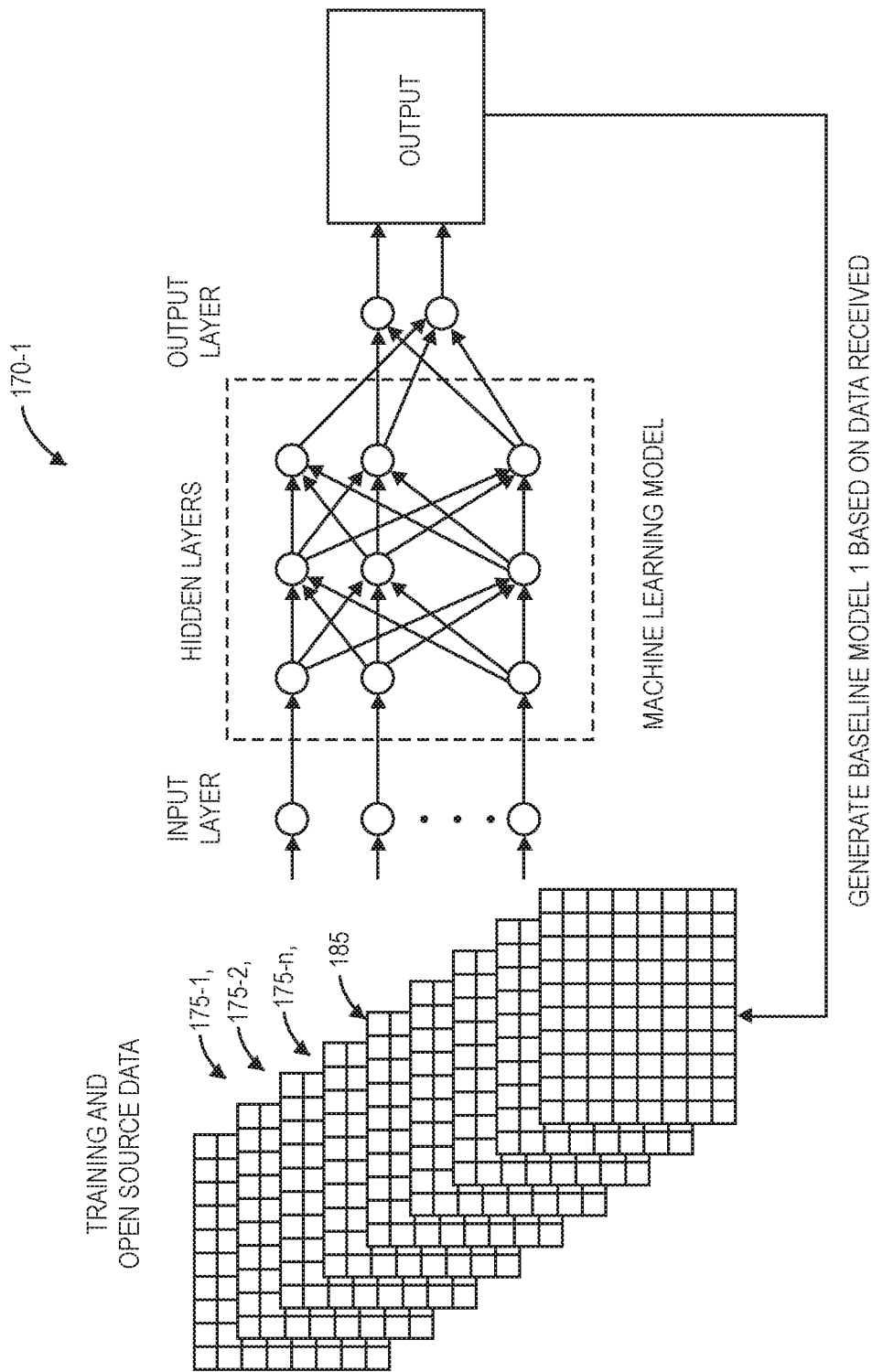

As is shown in FIG. 1C, the training data 175-1, 175-2 . . . 175-n and/or the open source data 185 may be used to generate and/or train a baseline machine learning model 170-1. For example, in some embodiments, the training data 175-1, 175-2 . . . 175-n and/or the open source data 185 may be split or parsed into a set of training data, a set of validation data, and a set of test data, each including corresponding inputs and outputs. The baseline model 170-1 may be trained to map inputs to desired outputs, e.g., by adjusting connections between one or more neurons in layers, in order to provide an output that most closely approximates or associates with an input to a maximum practicable extent. In accordance with embodiments of the present disclosure, any type or form of machine learning model may be generated or trained, including but not limited to artificial neural networks, deep learning systems, support vector machines, or others. Furthermore, in some embodiments, information or data regarding the transfer of the training data 175-1, 175-2 . . . 175-n and/or the open source data 185 to the server 112, or the training of the baseline model 170-1 based on such data, may be returned to the respective end users 150-1, 150-2 . . . 150-n and displayed in one or more user interfaces (e.g., dashboards) by the respective computer devices 152-1, 152-2 . . . 152-n.

Figure 1D:
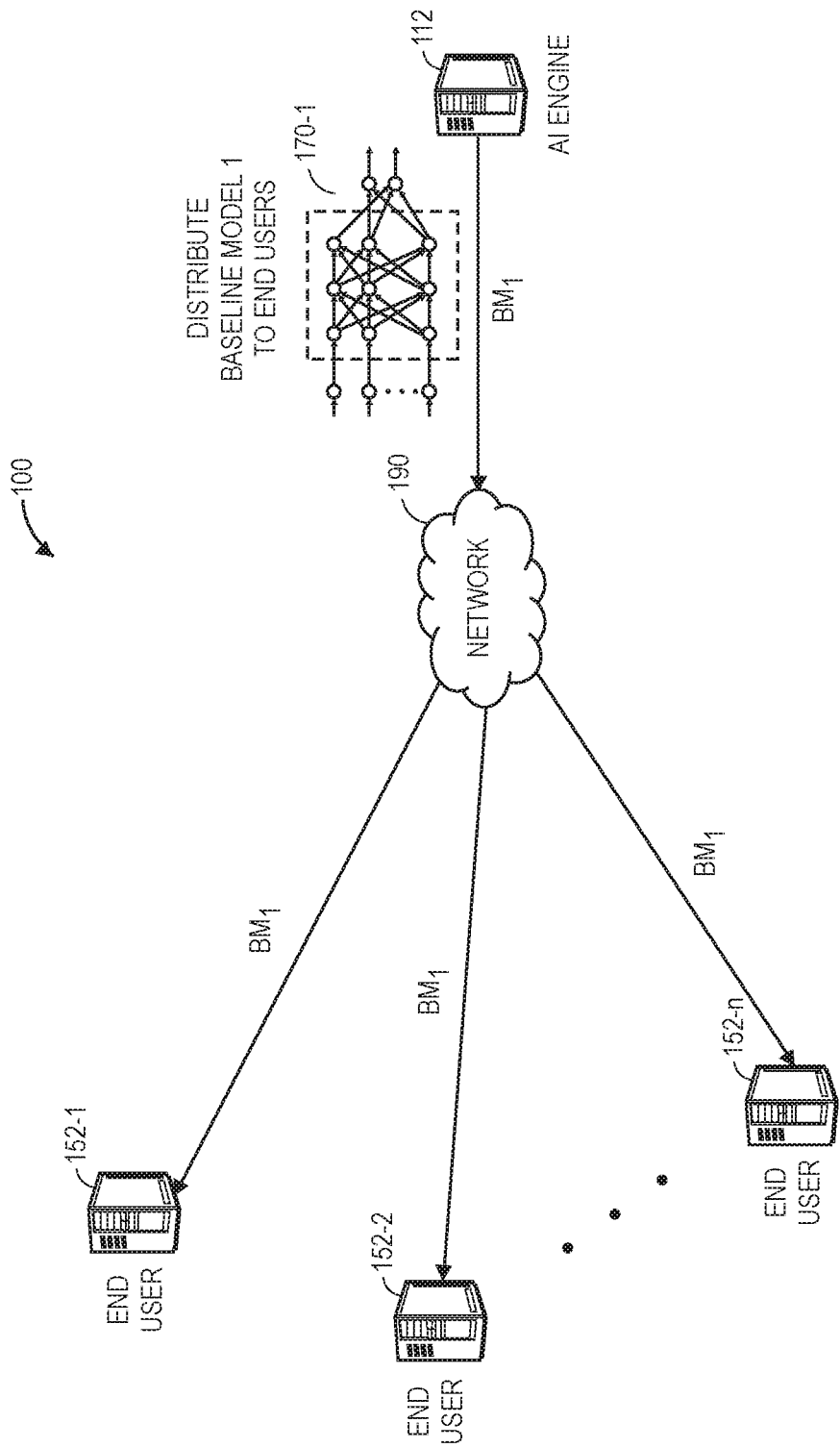
Figure 1E:
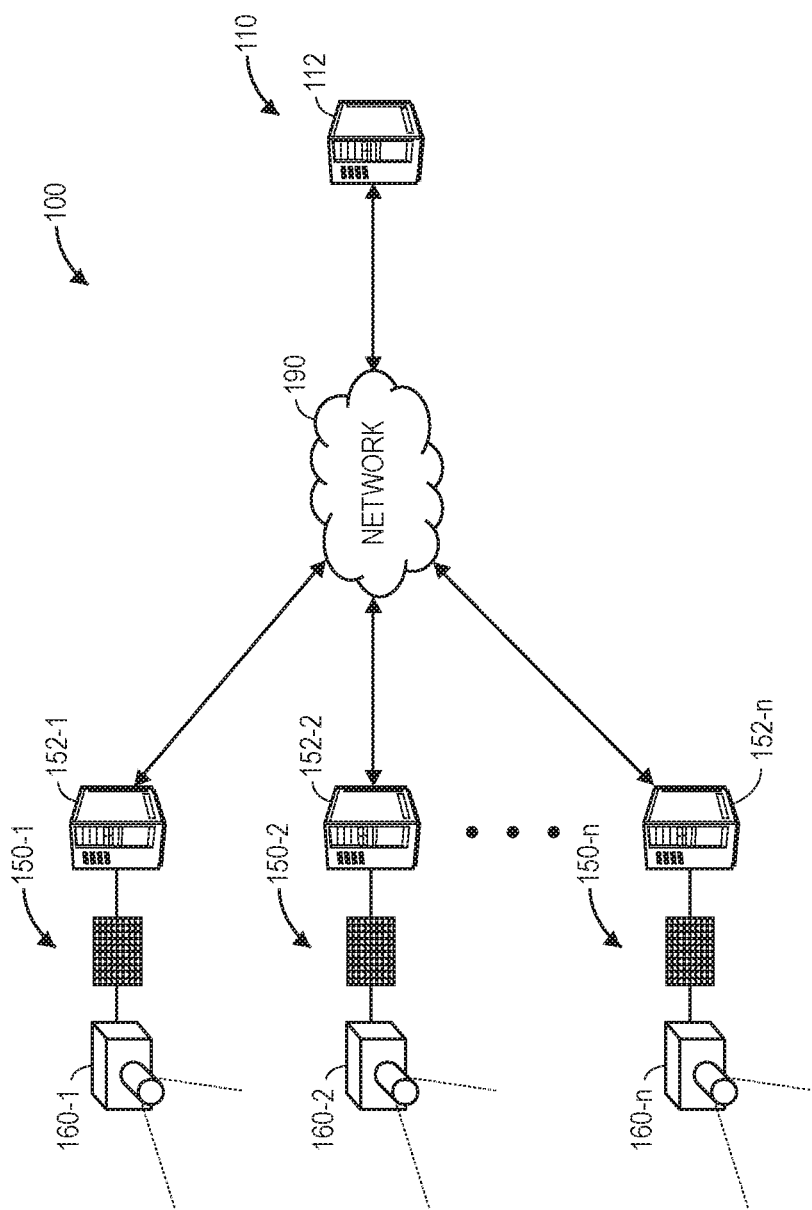

As is shown in FIG. 1D, once the baseline model 170-1 has been generated and sufficiently trained, the server 112 may distribute the baseline model 170-1 to the one or more end users 150-1, 150-2 . . . 150-n. For example, in some embodiments, code for operating the baseline model 170-1 may be transmitted to the one or more end users 150-1, 150-2 . . . 150-n, e.g., over the network 190. The code may identify or represent numbers of layers of or neurons within such layers, synaptic weights between neurons, or any factors describing the operation of the baseline model 170-1. Alternatively, the baseline model 170-1 may be provided to the respective end users 150-1, 150-1 . . . 150-n in any other manner. As is shown in FIG. 1E, after receiving the baseline model 170-1 is received, the computer devices 152-1, 152-2 . . . 152-n may operate the baseline model 170-1 to process data captured using the sensors 160-1, 160-2 . . . 160-n or obtained from any other sources, and to make decisions based on such data.

As is shown in FIG. 1F, one or more of the end users 150-1, 150-1 . . . 150-n may provide feedback regarding the performance of the baseline model 170-1 with respect to the task for which the model was trained. For example, as is shown in FIG. 1F, each of the respective computer devices 152-1, 152-2 . . . 152-n of the end users 150-1, 150-1 . . . 150-n may further train the baseline model 170-1 based on data encountered during the performance of the task, and may calculate or determine differences between the baseline model 170-1, or $BM_1$, as generated and trained by the server 112, and the subsequently trained models $M_i$, or $(\Delta M_i)_1 = (BM_1 - M_i)_1$. The differences $(\Delta M_1)_1$, $(\Delta M_2)_1$, $(\Delta M_3)_1$ calculated by the respective computer devices 152-1, 152-2 . . . 152-n may be returned to the server 112 as feedback over the network 190, or in any other manner. Alternatively, any other type or form of feedback may be returned to the server 112. For example, where the baseline model 170-1 is used to perform a task requiring the identification of an output based on one or more data points provided to the baseline model 170-1 as an input, the outputs generated by the baseline model 170-1 may be manually evaluated with respect to the respective inputs, e.g., by one or more human operators, to determine a measure of efficiency or performance of the baseline model 170-1.

As is shown in FIG. 1G, upon receiving the feedback from one or more of the end users 150-1, 150-1 . . . 150-n, the server 112 may generate a modified baseline model 170-2 based on the feedback received and the original baseline model 170-1, and may distribute the baseline model 170-2 to the end users 150-1, 150-1 . . . 150-n. Subsequently, one or more of the end users 150-1, 150-1 . . . 150-n, or any additional end users (not shown), may utilize the baseline model 170-2 in the performance of the task, and may generate and return feedback regarding the performance of the baseline model 170-1 to the server 112.

Accordingly, the systems and methods of the present disclosure may generate artificial intelligence solutions for end users by training a machine learning model to perform a task based on data received from such end users or obtained from an open source, as well as data that has been simulated or modified from such data.

Artificial intelligence solutions may be generated, trained and utilized for the performance of any task or function in accordance with the present disclosure. For example, a machine learning model may be trained to execute any number of computer vision applications in accordance with the present disclosure. In some embodiments, an artificial intelligence solution generated according to the present disclosure may be used in medical applications, such as where images of samples of tissue or blood, or radiographic images, must be interpreted in order to properly diagnose a patient. Alternatively, an artificial intelligence solution generated according to the present disclosure may be used in autonomous vehicles, such as to enable an autonomous vehicle to detect and recognize one or more obstacles, features or other vehicles based on imaging data, and making one or more decisions regarding the safe operation of an autonomous vehicle accordingly. Likewise, a machine learning model may also be trained to execute any number of anomaly detection (or outlier detection) tasks for use in any application. In some embodiments, an artificial intelligence solution generated according to the present disclosure may be used to determine that objects such as manufactured goods, food products (e.g., fruits or meats) or faces or other identifying features of humans comply with or deviate from one or more established standards or requirements. In some embodiments, an artificial intelligence may also be trained to perform voice interpretation, or natural language processing functions, for use in any application in which computers must understand and interpret spoken languages. The number of applications, tasks or functions that may be enhanced through the use of artificial intelligence solutions generated according to the present disclosure is not limited.

Any type or form of machine learning model may be generated, trained and utilized using one or more of the embodiments disclosed herein. For example, machine learning models, such as artificial neural networks, have been utilized to identify relations between respective elements of apparently unrelated sets of data. An artificial neural network is a parallel distributed computing processor system comprised of individual units that may collectively learn and store experimental knowledge, and make such knowledge available for use in one or more applications. Such a network may simulate the non-linear mental performance of the many neurons of the human brain in multiple layers by acquiring knowledge from an environment through one or more flexible learning processes, determining the strengths of the respective connections between such neurons, and utilizing such strengths when storing acquired knowledge. Like the human brain, an artificial neural network may use any number of neurons in any number of layers. In view of their versatility, and their inherent mimicking of the human brain, machine learning models including not only artificial neural networks but also deep learning systems, support vector machines, nearest neighbor methods or analyses, factorization methods or techniques, K-means clustering analyses or techniques, similarity measures such as log likelihood similarities or cosine similarities, latent Dirichlet allocations or other topic models, decision trees, or latent semantic analyses have been utilized in many applications, including but not limited to computer vision applications, anomaly detection applications, and voice recognition or natural language processing.

Artificial neural networks may be trained to map inputted data to desired outputs by adjusting strengths of connections between one or more neurons, which are sometimes called synaptic weights. An artificial neural network may have any number of layers, including an input layer, an output layer, and any number of intervening hidden layers. Each of the neurons in a layer within a neural network may receive an input and generate an output in accordance with an activation or energy function, with parameters corresponding to the various strengths or synaptic weights. For example, in a heterogeneous neural network, each of the neurons within the network may be understood to have different activation or energy functions. In some neural networks, at least one of the activation or energy functions may take the form of a sigmoid function, wherein an output thereof may have a range of zero to one or 0 to 1. In other neural networks, at least one of the activation or energy functions may take the form of a hyperbolic tangent function, wherein an output thereof may have a range of negative one to positive one, or −1 to +1. Thus, the training of a neural network according to an identity function results in the redefinition or adjustment of the strengths or weights of such connections between neurons in the various layers of the neural network, in order to provide an output that most closely approximates or associates with the input to the maximum practicable extent.

Artificial neural networks may typically be characterized as either feedforward neural networks or recurrent neural networks, and may be fully or partially connected. In a feedforward neural network, e.g., a convolutional neural network, information may specifically flow in one direction from an input layer to an output layer, while in a recurrent neural network, at least one feedback loop returns information regarding the difference between the actual output and the targeted output for training purposes. Additionally, in a fully connected neural network architecture, each of the neurons in one of the layers is connected to all of the neurons in a subsequent layer. By contrast, in a sparsely connected neural network architecture, the number of activations of each of the neurons is limited, such as by a sparsity parameter.

Moreover, the training of a neural network is typically characterized as supervised or unsupervised. In supervised learning, a training set comprises at least one input and at least one target output for the input. Thus, the neural network is trained to identify the target output, to within an acceptable level of error. In unsupervised learning of an identity function, such as that which is typically performed by a sparse autoencoder, target output of the training set is the input, and the neural network is trained to recognize the input as such. Sparse autoencoders employ backpropagation in order to train the autoencoders to recognize an approximation of an identity function for an input, or to otherwise approximate the input. Such backpropagation algorithms may operate according to methods of steepest descent, conjugate gradient methods, or other like methods or techniques, in accordance with the systems and methods of the present disclosure. Those of ordinary skill in the pertinent art would recognize that any algorithm or method may be used to train one or more layers of a neural network. Likewise, any algorithm or method may be used to determine and minimize errors in an output of such a network. Additionally, those of ordinary skill in the pertinent art would further recognize that the various layers of a neural network may be trained collectively, such as in a sparse autoencoder, or individually, such that each output from one hidden layer of the neural network acts as an input to a subsequent hidden layer.

Once a neural network has been trained to recognize dominant characteristics of an input of a training set, e.g., to associate a point or a set of data such as an image with a label to within an acceptable tolerance, an input in the form of a data point may be provided to the trained network, and a label may be identified based on the output thereof.

In some embodiments, a machine learning model may be selected for use in any application, on any basis. For example, the machine learning model may be selected based on aspects of a particular task to be performed on behalf of one or more end users, or based on a level of similarity between data that is received from end users, and data that was previously received or obtained from other end users to train a machine learning model to perform similar tasks. Furthermore, in some embodiments, a machine learning model may be generated organically based at least in part on data received from the end users and trained accordingly. In some embodiments, the machine learning system may be obtained from another source, e.g., an open source, and trained based at least in part on data received from the end users.

In some embodiments, the systems and methods of the present disclosure may receive raw data (or physical data) from end users, or obtain open source data from one or more sources. The raw data or the open source data may be properly annotated or otherwise prepared for use by the end users or sources from which the data is received, or upon its receipt, and securely stored in one or more data stores. In some embodiments, raw data received from end users or open source data may be modified or augmented to increase the data that is made available for generating a trained machine learning model. For example, in some embodiments, where imaging data is received from a number of end users or from an open source, e.g., for use in computer vision applications or anomaly detection purposes, some of the images may be synthetically altered (e.g., rotating, zooming, cropping, or the like) to emphasize or enhance flaws or defects depicted therein, e.g., by altering portions of such subjects within the images. Moreover, once images of undamaged subjects have been synthetically altered, such images may be refined to enhance the appearance of such flaws or defects within such images, and make such images appear to be more realistic, e.g., by providing the images to a generative adversarial network, or GAN, to enhance the realism of the synthetic images. In some embodiments, a generative adversarial network may refine such images using a refiner network that is configured to make a synthetically altered image appear more realistic, and a discriminator network that is configured to distinguish between synthetic images and real images. Synthesizing data may be substantially less expensive than obtaining additional data, e.g., other images, by capturing data.

Data received from end users or obtained from open source may be subject to one or more annotation processes in which regions of such images, or objects depicted therein, are designated accordingly. In computer vision applications, annotation is commonly known as marking or labeling of images or video files captured from a scene, such as to denote the presence and location of one or more objects or other features within the scene in the images or video files. Annotating a video file typically involves placing a virtual marking such as a box or other shape on an image frame of a video file, thereby denoting that the image frame depicts an item, or includes pixels of significance, within the box or shape. Alternatively, in some embodiments, a video file may be annotated by applying markings or layers including alphanumeric characters, hyperlinks or other markings on specific frames of the video file, thereby enhancing the functionality or interactivity of the video file in general, or of the video frames in particular. In some other embodiments, annotation may involve generating a table or record identifying positions of objects depicted within image frames, e.g., by one or more pairs of coordinates.

In some embodiments, data received from end users, or obtained from open sources, may be split or parsed into training sets, validation sets or test sets, each having any size or containing any proportion of the total data received or obtained. The data and any annotations may be authenticated or validated according to one or more functions (e.g., an authentication function, or a hash function) prior to training a machine learning model to perform one or more tasks, prior to validating the training of the model, and prior to testing the trained model. Each time the data is accessed for training, or for validation or testing, the data and annotations may be further subjected to the authentication function in order to confirm that the data is unchanged and has neither been altered nor compromised. Once a machine learning model has been sufficiently trained, validated and tested by an artificial intelligence engine, the model may be distributed to one or more end users, e.g., over a network, to the artificial intelligence engine including but not limited to one or more of the end users that requested the model, or provided data by which the model was trained, validated and tested.

Subsequently, in some embodiments, end users that receive a trained machine learning model for performing a task from an artificial intelligence engine may return feedback regarding the performance or the efficacy of the model to the artificial intelligence engine, including the accuracy or efficiency of the model in performing the task for which the model was generated. The feedback may take any form, including but not limited to one or more measures of the effectiveness of the trained machine learning model in performing a given task, including an identification of one or more sets of data regarding inaccuracies of the model in interpreting inputs and generating outputs for performing the task.

Moreover, in some embodiments, after receiving a baseline trained machine learning model for performing a task, an end user may be configured to continue training the baseline model using raw data (or physical data) that is obtained by the end users, or from an open source. In such embodiments, feedback may be returned to an artificial intelligence engine that generated the baseline model, including differences between results generated by a model, as further trained by the end user in performing the task, and results generated by the baseline model in performing the task. Regardless of the form or format of the feedback received from the end users, an artificial intelligence engine may utilize such feedback in further updating the baseline model. Thereafter, an updated baseline model may be returned to one or more of the end users that received the baseline model originally, or to any other end users that may subsequently request a trained machine learning model for performing the same task.

In some embodiments, differences between performance of a task using a baseline model and performance of the task using the baseline model as further trained by an end user may be returned directly to an artificial intelligence engine from each of the end users that received the baseline model from the artificial intelligence engine. In some other embodiments, however, differences between the performance of the baseline model and the performance of the further trained model may be accumulated by one or more of the end users and returned to the artificial intelligence engine. For example, differences between the performance of the baseline model and the performance of the further trained model may be encrypted by each of the end users, e.g., according to an encryption algorithm or function, and exchanged among the end users, such that the artificial intelligence engine receives sequentially averaged differences from all of the end users.

In some embodiments, an artificial intelligence solution generated in accordance with the present disclosure may be configured to pre-process data, prior to providing the data to a trained machine learning model as inputs, to determine whether decisions may be made more appropriately by rule rather than based on outputs received from the trained machine learning model. For example, where a rule is more appropriately aimed to a selected data point, such as where the data point equals, falls below or exceeds a threshold associated with a rule having a designated or assigned outcome, the rule may be used to assign the outcome to the data point, rather than having the data point be provided as an input to a machine learning model, and predicting an outcome based on an output from the machine learning model.

In some embodiments, artificial intelligence solutions may be provided to clients in a "toolbox," or a computing environment that enables end users to apply the artificial intelligence solutions with little to no background in machine learning or other computer systems. For example, the artificial intelligence solutions may be applied in a scalable, "cloud"-based architecture that may be accessed by end users via one or more user interfaces, and need not maintain or store code or other aspects of the baseline models on their respective computer systems or devices. Such interfaces, for example, may enable end users to upload relevant data to an artificial intelligence engine or other data processing system for evaluation or processing, and for secure storage. The end users may maintain ownership over their own respective data, while being restricted from accessing the data of others, yet may exploit the benefits of a machine learning model that has been trained using all of such data and others. Alternatively, in some embodiments, an artificial intelligence solution may be provided directly to an end user, and stored directly on a computer system or device of the end user, before being operated to process data captured or obtained by the end user and to make decisions based on such data. Any of the functions or actions described herein with regard to the generation, training, validation or testing of machine learning models, or the transfer of information or data regarding results obtained by the machine learning models, or decisions made based on such results, may be performed by one or more computer devices or systems associated with an end user or with an artificial intelligence engine in accordance with the present disclosure.

Furthermore, in some embodiments, information regarding the generation of a machine learning model, and the training of the machine learning model, may be provided to end users in one or more dashboards or other user interfaces. For example, an end user that provides raw data to an artificial intelligence engine for the purpose of generating a trained machine learning model for performing a task may monitor a status of the transfer of the raw data to the artificial intelligence engine on one or more dashboards rendered on a mobile device or other computer system, which may display characters, icons, graphs, meters, charts or other information regarding the transfer to one or more personnel associated with the end user. Likewise, as the training of the machine learning model is in progress, the end user may be further updated regarding the training with information displayed on one or more dashboards. Furthermore, when the machine learning model has been adequately trained and returned to the end user, information regarding the performance of the machine learning model may also be displayed on one or more dashboards.

The systems and methods of the present disclosure are not limited to use in any of the embodiments disclosed herein, including but not limited to computer vision, anomaly detection or natural language processing applications. For example, one or more of the artificial intelligence solutions generated in accordance with the present disclosure may be utilized to process data and make decisions in connection with banking, education, manufacturing or retail applications, or any other applications, in accordance with the present disclosure. Moreover, those of ordinary skill in the pertinent arts will recognize that any of the aspects of embodiments disclosed herein may be utilized with or applicable to any other aspects of any of the other embodiments disclosed herein.

Figure 2A:
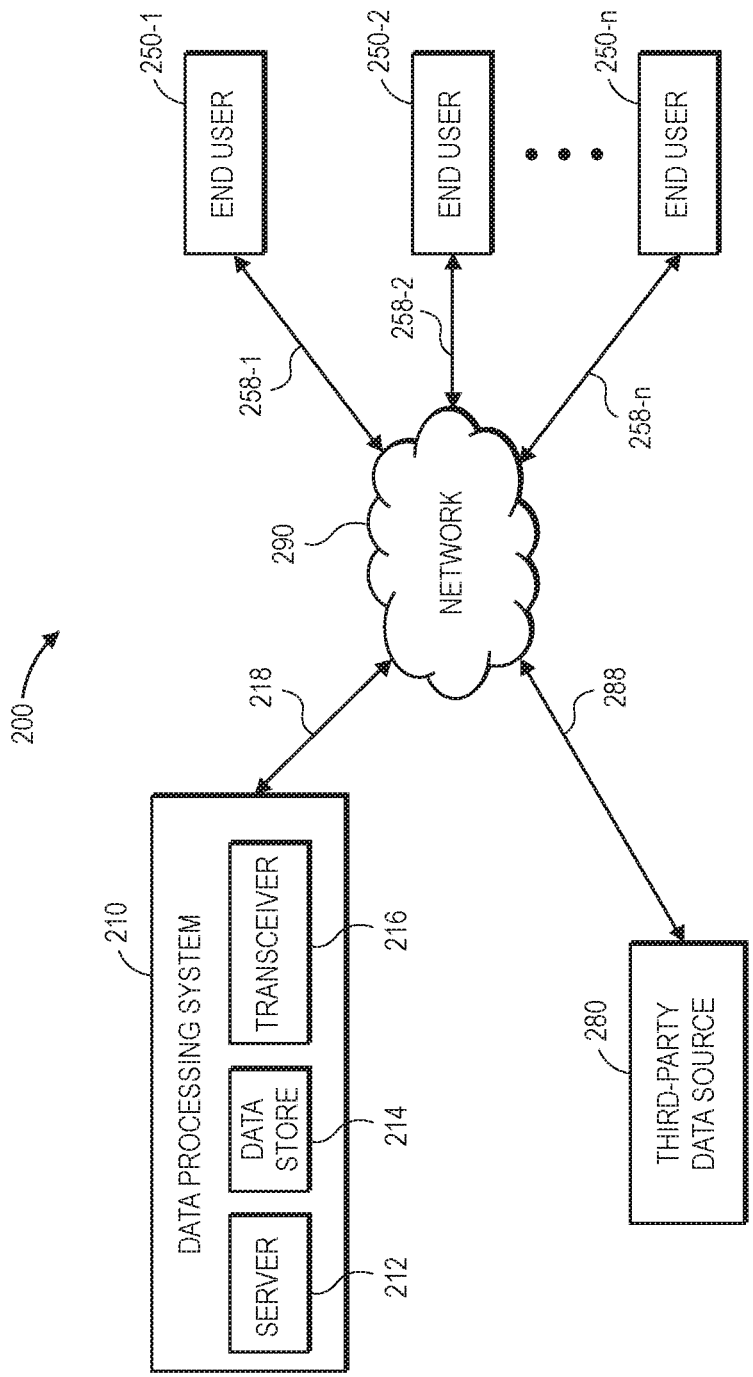
FIGS. 2A and 2B are block diagrams of one system in accordance with embodiments of the present disclosure.
Figure 2B:
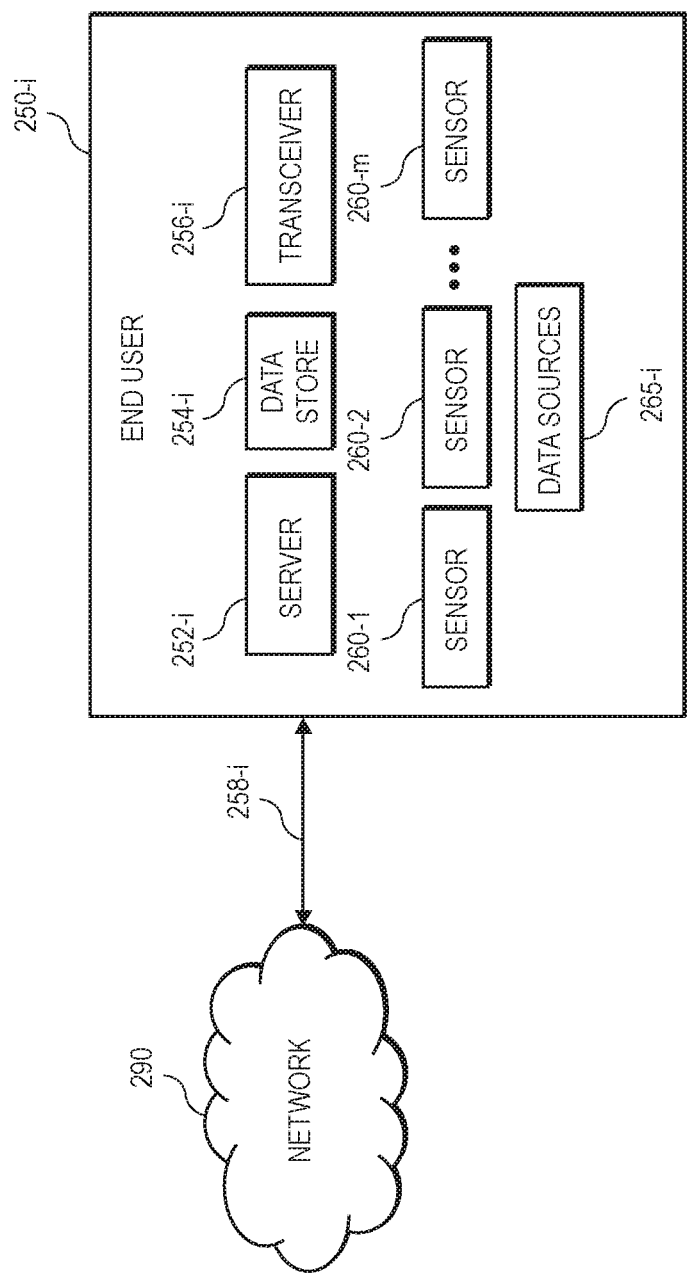

Referring to FIGS. 2A and 2B, block diagrams of one system 200 in accordance with embodiments of the present disclosure is shown. As is shown in FIG. 2A, the system 200 includes a data processing system 210, a plurality of end users 250-1, 250-2 . . . 250-n and a third-party data source 280 that are connected to one another over a network 290. Except where otherwise noted, reference numerals preceded by the number "2" shown in the block diagram of FIG. 2A or 2B indicate components or features that are similar to components or features having reference numerals preceded by the number "1" shown in FIGS. 1A through 1G.

The data processing system 210 may be an artificial intelligence engine or any other system that includes one or more physical or virtual computer servers 212 or other computer devices or machines having any number of processors that may be provided for any specific or general purpose, and one or more data stores (e.g., data bases) 214 and transceivers 216 associated therewith. For example, the data processing system 210 of FIGS. 2A and 2B may be independently provided for the exclusive purpose of receiving, analyzing, processing or storing data received from the end users 250-1, 250-2 . . . 250-n or the third-party data source 280 or, alternatively, provided in connection with one or more physical or virtual services that are configured to receive, analyze or store such data, or perform any other functions. The data stores 274 may store any type of information or data, including but not limited to imaging data, acoustic signals, or any other information or data, for any purpose. The servers 212 and/or the data stores 214 may also connect to or otherwise communicate with the network 290, as indicated by line 218, through the sending and receiving of digital data.

The data processing system 210 may further include any facility, structure, or station for receiving, analyzing, processing or storing data using the servers 212, the data stores 214 and/or the transceivers 216. For example, the data processing system 210 may be provided within or as a part of one or more independent or freestanding facilities, structures, stations or locations that need not be associated with any one specific application or purpose. In some embodiments, the data processing system 210 may be provided in a physical location. In other such embodiments, the data processing system 210 may be provided in one or more alternate or virtual locations, e.g., in a "cloud"-based environment.

The servers 212 are configured to execute any calculations or functions for training, validating or testing one or more machine learning models, or for using such machine learning models to arrive at one or more decisions or results. In some embodiments, the servers 212 may be a uniprocessor system including one processor, or a multiprocessor system including several processors (e.g., two, four, eight, or another suitable number), and may be capable of executing instructions. For example, in some embodiments, the servers 212 may include one or more general-purpose or embedded processors implementing any of a number of instruction set architectures (ISAs), such as the x86, PowerPC, SPARC, or MIPS ISAs, or any other suitable ISA. Where one or more of the servers 212 is a multiprocessor system, each of the processors within the multiprocessor system may operate the same ISA, or different ISAs.

The servers 212 may be configured to generate and train, validate or test any type or form of machine learning model, or to utilize any type or form of machine learning model, in accordance with the present disclosure. Some of the machine learning models that may be generated or operated in accordance with the present disclosure include, but are not limited to, artificial neural networks (e.g., convolutional neural networks, or recurrent neural networks), deep learning systems, support vector machines, nearest neighbor methods or analyses, factorization methods or techniques, K-means clustering analyses or techniques, similarity measures such as log likelihood similarities or cosine similarities, latent Dirichlet allocations or other topic models, or latent semantic analyses. The types or forms of machine learning models that may be generated or operated by the servers 212 or any other computer devices or machines disclosed herein are not limited.

The data stores 214 (or other memory or storage components) may store any type of information or data, e.g., instructions for operating the data processing system 210, or information or data received, analyzed, processed or stored by the data processing system 210. The data stores 214 may be implemented using any suitable memory technology, such as static random-access memory (SRAM), synchronous dynamic RAM (SDRAM), nonvolatile/Flash-type memory, or any other type of memory. In some embodiments, program instructions, imaging data and/or other data items may be received or sent via a transceiver, e.g., by transmission media or signals, such as electrical, electromagnetic, or digital signals, which may be conveyed via a communication medium such as a wired and/or a wireless link.

The transceivers 216 are configured to enable the data processing system 210 to communicate through one or more wired or wireless means, e.g., wired technologies such as Ethernet, Universal Serial Bus (or "USB") or fiber optic cable, or standard wireless protocols such as Bluetooth® or any Wireless Fidelity (or "Wi-Fi") protocol, such as over the network 290 or directly. Such transceivers 216 may further include or be in communication with one or more input/output (or "I/O") interfaces, network interfaces and/or input/output devices, and may be configured to allow information or data to be exchanged between one or more of the components of the data processing system 210, or to one or more other computer devices or systems (e.g., other aerial vehicles, not shown) via the network 290. For example, in some embodiments, a transceiver 216 may be configured to coordinate I/O traffic between the servers 212 and/or data stores 214 or one or more internal or external computer devices or components. Such transceivers 216 may perform any necessary protocol, timing or other data transformations in order to convert data signals from a first format suitable for use by one component into a second format suitable for use by another component. In some other embodiments, functions ordinarily performed by the transceivers 216 may be split into two or more separate components, or integrated with the servers 212 and/or the data stores 214.

The end users 250-1, 250-2 ... 250-$n$ may be any entities that are configured to perform, or that require the performance of, one or more computer-based tasks using data obtained by the end users 250-1, 250-2 ... 250-$n$ themselves or from any other source. Some of the tasks to be performed by or on behalf of the end users 250-1, 250-2 ... 250-$n$ may include, but are not limited to, computer vision applications, anomaly detection applications, voice recognition or natural language processing applications, or any other applications. The end users 250-1, 250-2 ... 250-$n$ may operate or exist in any industry or field, and may include business clients, governments, personal users (e.g., individuals) or any other entities. For example, the end users 250-1, 250-2 ... 250-$n$ may include hospitals, universities, research laboratories, military facilities, financial institutions, manufacturing plants or retail stores (e.g., bricks-and-mortar establishments or electronic commerce entities), or any other end users.

Each of the end users 250-1, 250-2 ... 250-$n$ may utilize or operate a discrete computer infrastructure. As is shown in FIG. 2B, a representative one of the end users 250-$i$ includes a server 252-$i$, a data store 254-$i$, a transceiver 256-$i$, as well as a plurality of m sensors 260-1, 260-2 ... 260-$m$ and one or more data sources 265-$i$.

The server 252-$i$, the data store 254-$i$ and the transceiver 256-$i$ may have any of the qualities, features or properties of the servers 212, the data stores 214 and/or the transceivers 216, as discussed above. The sensors 260-1, 260-2 ... 260-$m$ may be configured to capture any type or form of information or data that may be required for the performance of one or more tasks by or on behalf of the end user 250-$i$, including but not limited to imaging data, acoustic data, or any other information or data. In some embodiments, the sensors 260-1, 260-2 ... 260-$m$ may include one or more imaging devices (e.g., color, grayscale or black-and-white digital cameras, radiographic cameras, depth sensors or range cameras, infrared cameras, or other optical systems). In some other embodiments, the sensors 260-1, 260-2 ... 260-$m$ may include one or more acoustic sensors or other devices, components, systems or instruments for capturing and/or interpreting acoustic energy, e.g., microphones (e.g., a transducer such as a dynamic microphone, a condenser microphone, a ribbon microphone or a crystal microphone) that are configured to convert acoustic energy of any intensity and across any or all frequencies into one or more electrical signals. In still other embodiments, the sensors 260-1, 260-2 ... 260-$m$ may further include one or more thermometers, barometers, hygrometers, gyroscopes, air monitoring sensors (e.g., oxygen, ozone, hydrogen, carbon monoxide or carbon dioxide sensors), pH sensors, magnetic anomaly detectors, metal detectors, radiation sensors (e.g., Geiger counters, neutron detectors, alpha detectors), attitude indicators, depth gauges, or other sensors.

The data sources 265-$i$ may be any sources of information or data of any type or form, and such data may, but need not, have been captured using one or more of the sensors 260-1, 260-2 ... 260-$m$.

The third-party data source 280 may be any source or repository of data, such as an open source of data, that may be accessed by one or more computer devices or machines via the network 290, including but not limited to the data processing system 210 and/or the end users 250-1, 250-2 ... 250-$n$. For example, the third-party data source 280 may be associated with a library, a laboratory, a government agency, an educational institution, or an industry or trade group, and may include any number of associated computer devices or machines for receiving, analyzing, processing and/or storing information or data thereon. In some embodiments, the third-party data source 280 may include one or more servers, data stores and/or transceivers having any of the qualities, features or properties of the servers 212, the data stores 214 and/or the transceivers 216, as discussed above. The third-party data source 280 may utilize such servers, data stores and/or transceivers to connect to or otherwise communicate with the network 290, as indicated by line 288, through the sending and receiving of digital data.

Although FIG. 2A shows just three boxes corresponding to the end users 250-1, 250-2 ... 250-$n$, the system 200 shown in FIG. 2A may include any number of end users, including as few as one or as many as dozens, hundreds or even thousands of end users, or more.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The data processing system 210, the end users 250-1, 250-2 ... 250-n, and the third-party data source 280 may use any web-enabled or Internet applications or features, or any other client-server applications or features including E-mail or other messaging techniques, to connect to the network 290, or to communicate with one another, such as through short or multimedia messaging service (SMS or MMS) text messages. For example, the data processing system 210 may be adapted to transmit information or data in the form of synchronous or asynchronous messages to the end users 250-1, 250-2 ... 250-n or the third-party data source 280 or to any other computer device in real time or in near-real time, or in one or more offline processes, via the network 290. Those of ordinary skill in the pertinent art would recognize that data processing system 210, the end users 250-1, 250-2 ... 250-n, and the third-party data source 280 may operate, include or be associated with any of a number of computing devices that are capable of communicating over the network 290, including but not limited to set-top boxes, personal digital assistants, digital media players, web pads, laptop computers, desktop computers, tablet computers, smartphones, electronic book readers, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 212, the server 252-i, or any other computers or control systems utilized by the data processing system 210, the end users 250-1, 250-2 . . . 250-n, or the third-party data source 280, and having sequences of instructions which, when executed by a processor (e.g., a central processing unit, or "CPU"), cause the processor to perform all or a portion of the functions, services and/or methods described herein. Such computer executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

In accordance with some embodiments of the present disclosure, information or data received from end users may be authenticated and securely stored, separate and apart from information or data received from other end users. Each time that the information or data is retrieved, e.g., to generate or utilize a machine learning model, the information or data may be independently verified to ensure that the information or data has not been tampered, hacked or otherwise misused. The information or data received from any number of end users, or from one or more open sources, may be used to train, validate or test a machine learning model. Once the machine learning model has been generated, code or other data for operating the machine learning model, e.g., one or more matrices of weights or other attributes of layers or neurons of an artificial neural network, may be distributed to the end users, thereby enabling each of the end users to take advantage of a machine learning model that is fully and richly trained, without divulging their own information or data to one or more competitors or other entities.

Figure 3A:
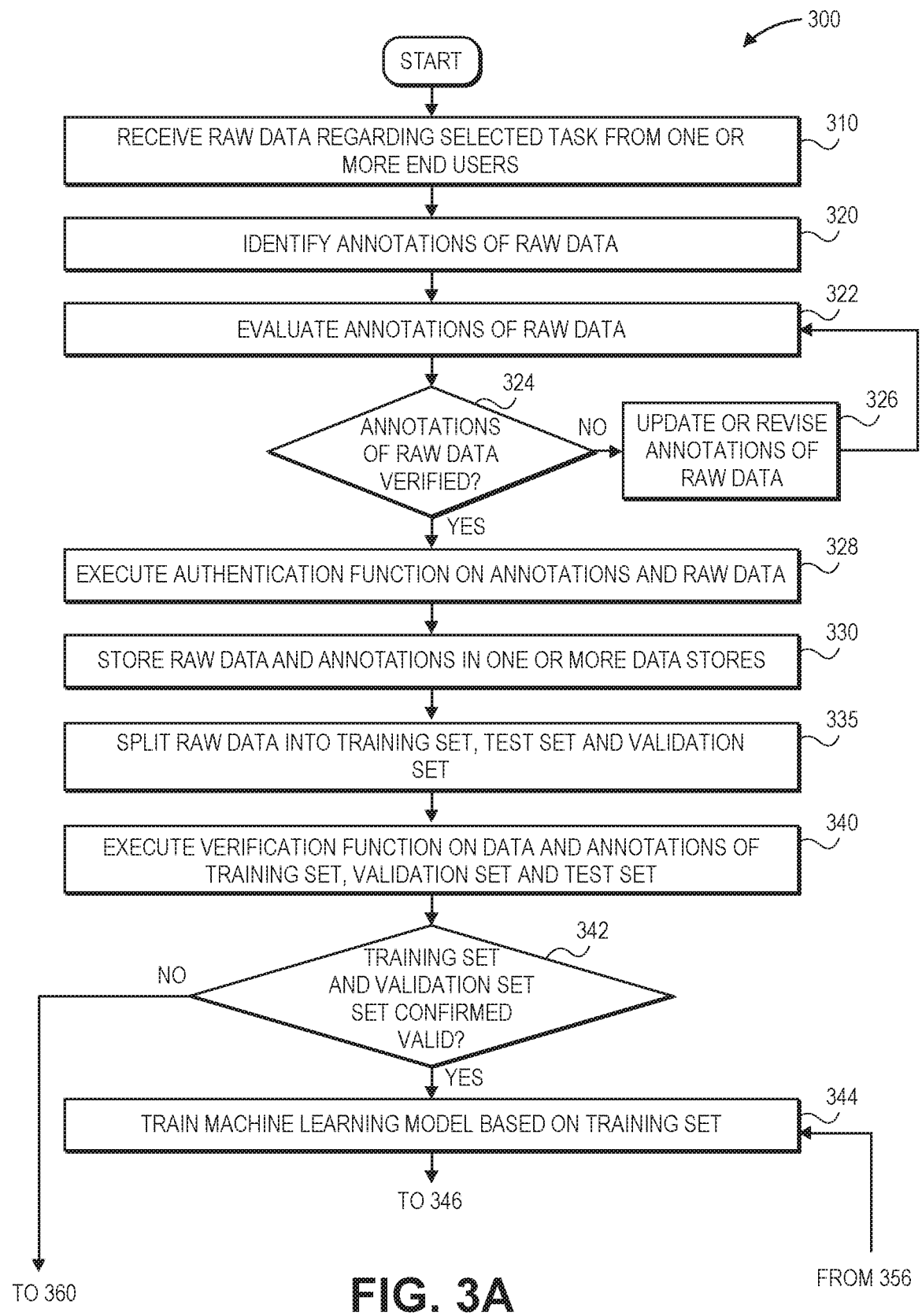
FIGS. 3A and 3B are a flow chart of one process in accordance with embodiments of the present disclosure.
Figure 3B:
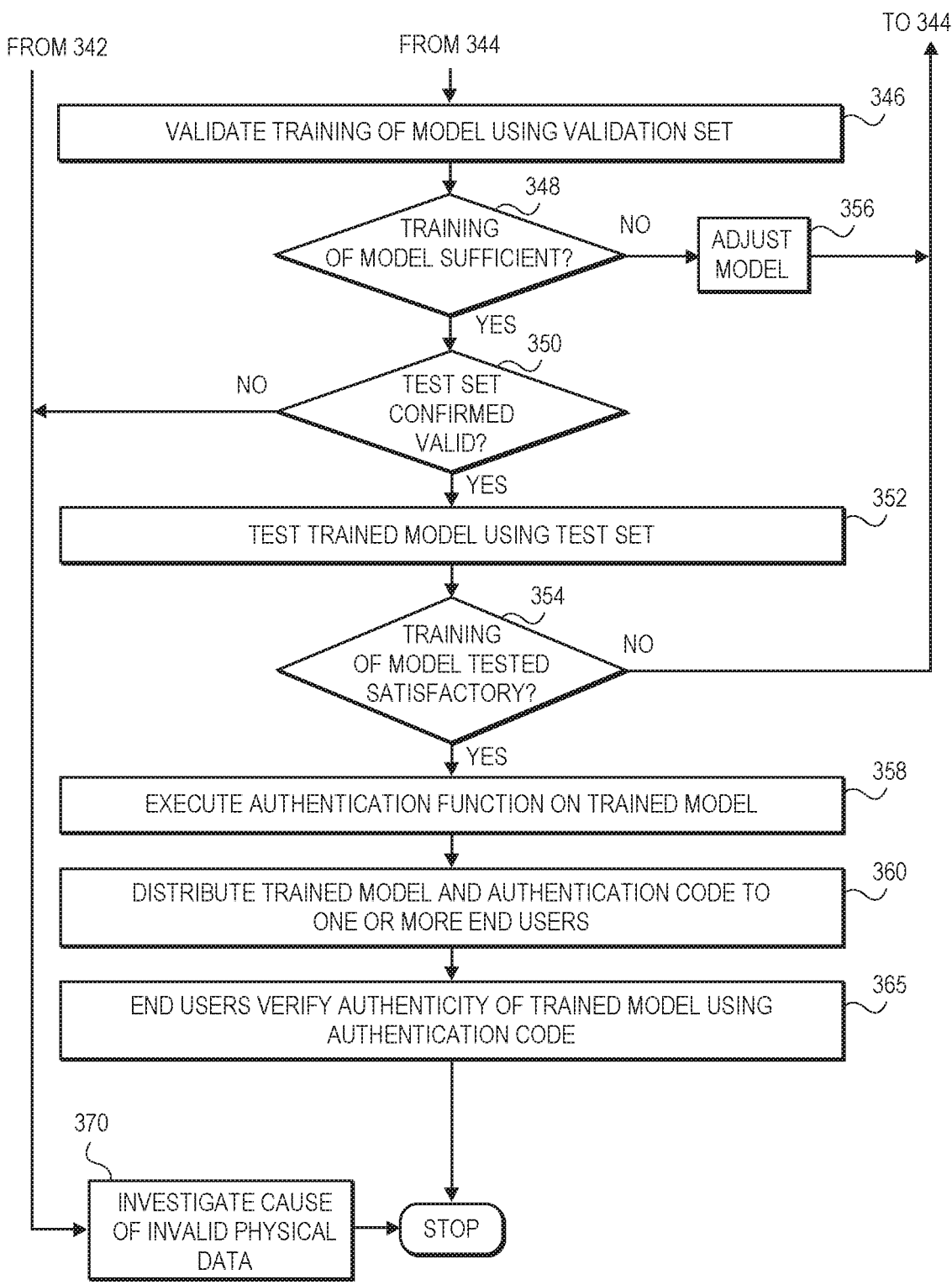

Referring to FIGS. 3A and 3B, a flow chart of one process in accordance with embodiments of the present disclosure is shown. At box 310, raw data regarding a selected task is received from one or more end users. The raw data may be any data that was previously considered when the selected task was previously performed, e.g., by standard techniques that do not involve machine learning or by another machine learning model, or any data that is ordinarily associated with the performance of the selected task. Additionally, the selected task may be any number of computer-based tasks such as computer vision, anomaly detection, voice recognition or natural language processing that are to be performed by or on behalf of the end users, who may be any entities that operate or exist in any industry or field.

At box 320, annotations of the raw data are identified. The annotations may be any virtual markings or designations of portions or subsets of each of the data points that signify that such portions are relevant or of interest to the performance of the given task. For example, in some embodiments, the annotations may be boxes or shapes applied to a portion of an image, or coordinates identifying the portion of the image (e.g., stored in a table or record of metadata). Alternatively, where the raw data includes data other than images, such as acoustic data, the annotations may be designators of portions of interest of such data, e.g., timestamps of sound pressure levels, intensities or frequencies of interest within acoustic data, or of words, phrases or parts of speech represented within the acoustic data, or any other designators.

At box 322, the annotations of the raw data are evaluated, e.g., by a human operator or machine that may confirm that the annotations appropriately identify portions of the raw data that are relevant or of interest to the performance of the given task. At box 324, whether the annotations are verified is determined. If the annotations are not verified, then the process advances to box 326, where the annotations of the raw data are updated or revised, e.g., by narrowing, expanding or relocating the annotations with respect to the raw data, or redesignating other portions of the raw data, before returning to box 322.

If the annotations are verified, however, then the process advances to box 328, where the authentication function is executed on the annotations and the raw data. For example, upon retrieving the raw data from one or more data stores, or prior to accessing the raw data for generating a machine learning tool, the authentication function may be executed on the raw data and annotations. In some embodiments, the authentication function may be a hash function, e.g., a function that reduces each of the data points and/or the annotations to a value having a fixed size, e.g., 128-bits, 256-bits, or any other size, and is preferably operable in a single way or direction. At box 330, the raw data and the annotations are stored in the one or more data stores, e.g., along with their respective hash values. The raw data received from a given end user, and annotations of the raw data, may be stored in a discrete and/or secure file in one or more data stores, separate and apart from raw data received from other end users, and annotations of such raw data.

At box 335, the raw data and annotations is split into a training set, a validation set and a test set, along with their respective annotations. For example, the raw data may be split into a substantially large portion for training, e.g., approximately seventy to eighty percent of the raw data, as well as smaller portions for testing and validation, e.g., approximately ten percent of the raw data each for testing and validation. The sizes of the respective sets of data for training, for validation and for testing may be chosen on any basis.

At box 340, a verification function is executed on the data and the annotations of the training set and the validation set. The verification function may be the same function that was executed on the raw data and the annotations at box 328, or any other function for verifying that that the raw data and the annotations are valid and have not been tampered, hacked or otherwise misused, e.g., surreptitiously by one or more other end users or other entities.

At box 342, whether the training set and the validation set are confirmed valid is determined, e.g., based on the verification function executed on the data and annotations at box 340. If any of the data points or annotations of the training set or the validation set are not confirmed to be valid, the process advances to box 370, where causes of the invalid raw data are investigated, and the process ends. For example, raw data or an annotation may be determined to be invalid where a value generated by an authentication function executed on the raw data or annotation at box 328 does not match or is inconsistent with values generated by the verification function executed on the raw data and annotations at box 340.

If the training set, the validation set and the test set are confirmed to be valid, however, then the process advances to box 344, where a machine learning model is trained based on the training set. For example, a machine learning model may be selected on any basis, such as a level of suitability for performing the task, which may be determined in any manner relating to the data or the task, e.g., based on past experience with the task or with similar raw data, or any relevant standards of accuracy or precision that may be required, an amount of time, processing power or memory that is available to train the model, or on any other relevant factor. The machine learning model may be trained using both the raw data and the annotations, which may act as targets or other desired values to be received as outputs in response to providing the raw data to the model as inputs.

Upon providing a data point to the machine learning model during training, an output received from the machine learning model may be compared to the annotation of the data point. In some embodiments, the output received from the machine learning model may represent a probability (e.g., a number between 0 and 1, or a number according to any scale), or other score, that may be compared to the annotation of the data point. Whether the machine learning model is sufficiently trained may be determined based on a difference between the output and the annotation. For example, in some embodiments, a convolutional neural network may be trained for use in for large-scale image recognition applications, e.g., for detecting and classifying damage to subjects.

At box 346, the training of the model is validated using the validation set. For example, the raw data of the validation set may be provided to the model as inputs, and outputs received from the model may be compared to the respective annotations of the validation set. At box 348, whether the training of the model is sufficient is determined. For example, whether the accuracy of the model in evaluating the raw data of the validation set to identify the annotations of the validation set exceeds a threshold may be determined. If the training of the model is not sufficient, then the process advances to box 356, where the model is adjusted, before returning to box 344, where the machine learning model is again trained based on the training set.

If the training of the model is sufficient, however, then the process advances to box 350, where whether the test set has been confirmed as valid is determined, e.g., based on the verification function executed on the data and annotations at box 340. If any of the data points or annotations of the test set are not confirmed to be valid, the process advances to box 370, where causes of the invalid raw data are investigated, and the process ends.

If the test set is confirmed to be valid, however, then the process advances to box 352, where the trained model is tested using the test set. For example, the raw data of the test set may be provided to the model as inputs, and outputs received from the model may be compared to the respective annotations of the test set, in a manner similar to the validation of the training of the model at box 346 using the validation set. At box 354, whether the training of the model is tested satisfactorily is determined. If the training of the model is not satisfactory, e.g., such as where the outputs received from the model in response to providing raw data of the test set to the model as inputs are not sufficiently similar to the annotations of the test set, then the process returns to box 344, where the model is further trained using the training set.

If the training of the model is determined to be satisfactory, however, then the process advances to box 358, where an authentication function is executed on the trained model. For example, a hash function or other authentication function may be executed on code for performing the trained model, e.g., on matrices of weights or other attributes of layers or neurons of an artificial neural network. At box 360, the trained model and an authentication code are distributed to one or more end users. For example, the code for performing the trained model may be distributed over a network or in any other manner to such end users, along with the authentication code. Finally, at box 365, end users verify the authenticity of the trained model using the authentication code, and the process ends.

Figure 4B:
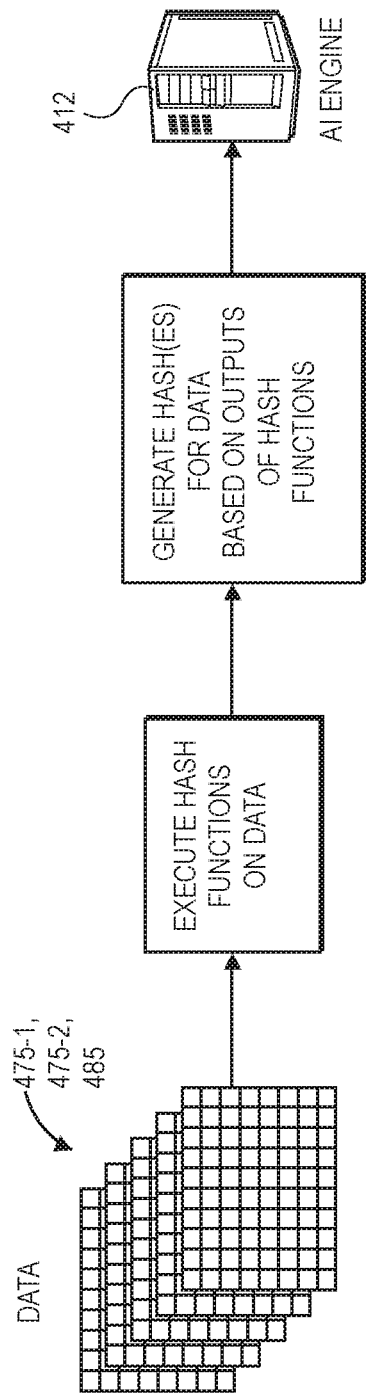
Figure 4C:
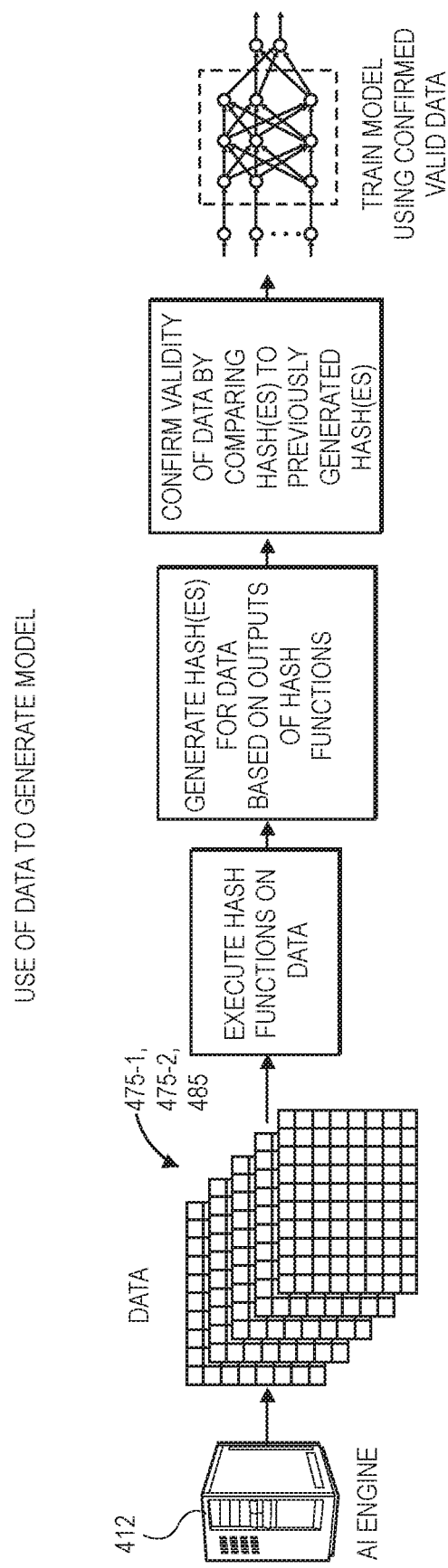

Referring to FIGS. 4A through 4C, views of aspects of one system in accordance with embodiments of the present disclosure are shown. Except where otherwise noted, reference numerals preceded by the number "4" shown in FIGS.

4A through 4C indicate components or features that are similar to components or features having reference numerals preceded by the number "2" shown in the block diagram of FIG. 2A or 2B or by the number "1" shown in FIGS. 1A through 1G.

As is shown in FIG. 4A, a system 400 includes a server 412 associated with an artificial intelligence engine or other data processing system. The server 412 is configured to receive relevant data of various types from end users or other sources over a network 490. For example, as is shown in FIG. 4A, the server 412 receives open source data 485, e.g., data that is relevant to the performance of one or more tasks yet is available to the public, free of charge or for a fee. Additionally, the open source data 485 may include annotations corresponding to or identifying relevant portions of one or more data points of the open source data 485. Alternatively, the open source data 485 may be annotated after it is received by the server 412, e.g., by one or more human operators or machines, such as by one or more applications operating on or accessible to the server 412.

The server 412 further receives proprietary data 475-1, which may include sensitive, private information or data pertaining to the performance of the one or more tasks that may be protected as trade secrets or as confidential data by one or more end users or other sources of the proprietary data 475-1. The server 412 also receives synthetic data 475-2, which may be modified or altered forms of the proprietary data 475-1 or the open source data 485. For example, the synthetic data 475-2 may include images of the proprietary data 475-1 or the open source data 485 that rotated, zoomed, cropped or otherwise altered to emphasize or accentuate portions of the images that are relevant to the performance of the one or more tasks, or for any other purpose. In some embodiments, contrasts or other attributes of the images may be optionally adjusted, as necessary, in order to increase the likelihood that relevant aspects depicted within the images are detected by the server 412. Adjustments in contrast are optional, not mandatory, and may be applied where a relevant portion of an image lacks sufficient contrast to cause flaws to appear in a distinct manner with respect to the material texture. In some embodiments, the images may be further duplicated and optionally mirrored, on a random basis, and/or subjected to rotations by any angle or extent, e.g., by ninety degrees (90°). Images may be mirrored and/or rotated to expand a number of available images, particularly where a number of available damaged or undamaged images for training a machine learning model is low.

Alternatively, the synthetic data 475-2 may include acoustic signals or corresponding data of the proprietary data 475-1 or the open source data 485 that is filtered or otherwise altered to emphasize or accentuate portions of the acoustic data that are relevant to the performance of the one or more tasks, or for any other purpose. The proprietary data 475-1 and the synthetic data 475-2 may include one or more annotations or, alternatively, may be annotated after it is received by the server 412, e.g., by one or more human operators or machines, such as by one or more applications operating on or accessible to the server 412.

As is shown in FIG. 4B, upon receiving the data 475-1, 475-2, 485, the server 412 executes one or more hash functions or other authentication functions on the data 475-1, 475-2, 485 and any annotations, and generates hash values or other values corresponding to the data 475-1, 475-2, 485 based on outputs received from such functions. Such hashes may be values having a fixed size, e.g., 128-bits, 256-bits, or any other size, and may reduce each of the data points and/or the annotations to such values. Subsequently, the data 475-1, 475-2, 485 and annotations, and the hash values, may be stored on the server 412, e.g., in one or more discrete and/or secure files that are maintained separate and apart from the data and annotations received from other end users, and the corresponding hashes or other values.

Subsequently, where the data 475-1, 475-2, 485 is to be used in the generation of a trained machine learning model, the data 475-1, 475-2, 485 may be retrieved and subjected to one or more hash functions or other validation functions. Where the hashes or other values generated based on outputs of the validation functions are consistent with the hashes generated upon authenticating the data 475-1, 475-2, 485, the validity of the data 475-1, 475-2, 485 is confirmed, and a machine learning model may be trained based on the data 475-1, 475-2, 485. If the hashes or other values are not consistent, however, then the validity of the data 475-1, 475-2, 485 is in question, and the data 475-1, 475-2, 485 may not be used to train a machine learning model.

Figure 5:
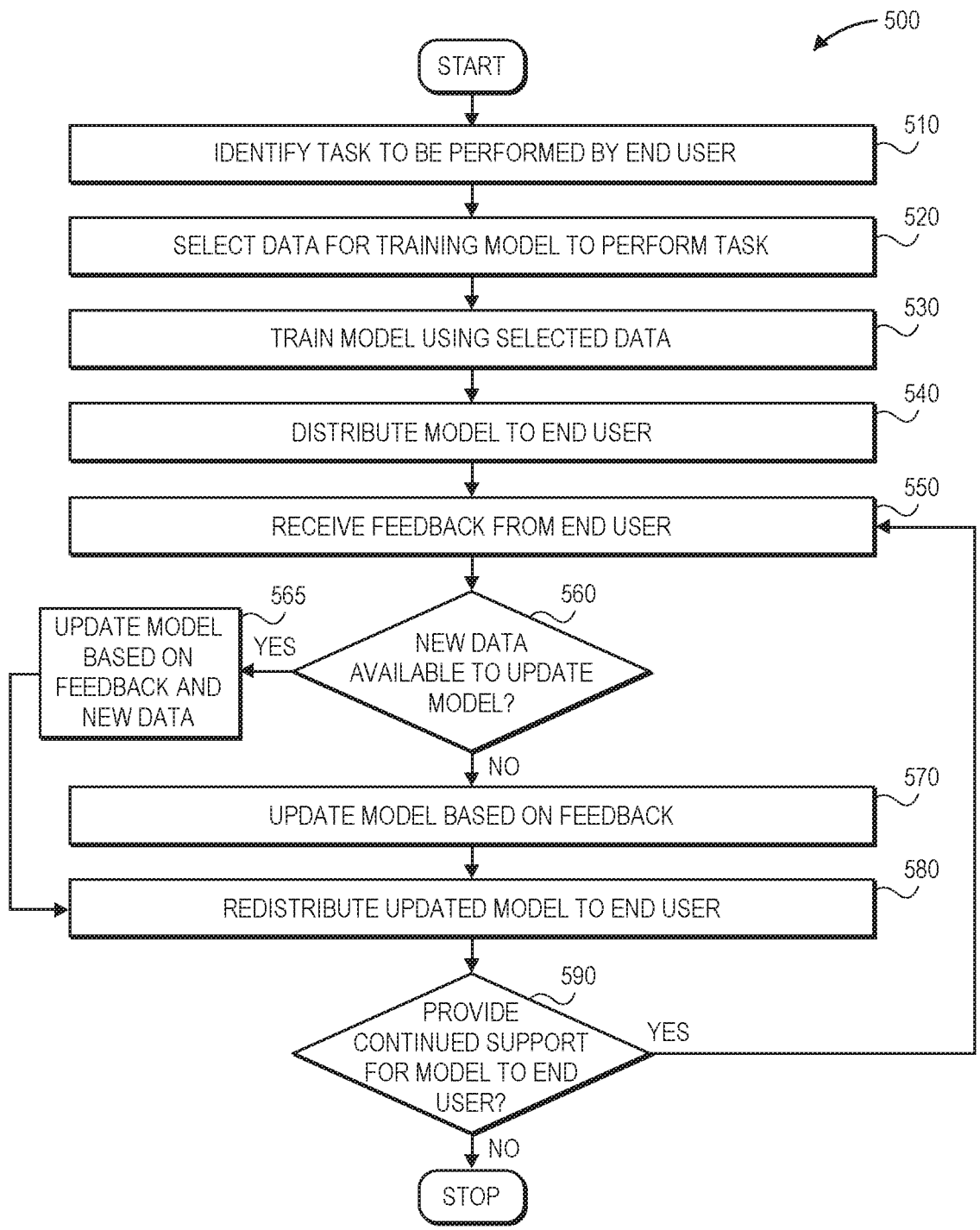
FIG. 5 is a flow chart of one process in accordance with embodiments of the present disclosure.

As is discussed above, the systems and methods of the present disclosure may train and distribute machine learning models to end users for the performance of one or more tasks, and may continue to update such models based on feedback or newly available data before distributing the updated models to such end users. Referring to FIG. 5, a flow chart of one process in accordance with embodiments of the present disclosure is shown. At box 510, a task to be performed on behalf of an end user is identified. The task may be any number of computer-based tasks such as computer vision, anomaly detection, voice recognition or natural language processing that are to be performed by or on behalf of the end user, or one or more other end users.

At box 520, raw data for training a model to perform the task is selected. The raw data may be any data that was previously considered when the selected task was previously performed by one or more end users, such as by standard techniques that do not involve machine learning or by another machine learning model, in any other manner.

At box 530, the model is trained using the selected data, e.g., by providing data points of the raw data to the machine learning model as inputs, and comparing outputs received from the machine learning model to annotations, labels or other data associated with the data point. In some embodiments, whether the machine learning model is sufficiently trained may be determined based on a difference between outputs generated in response to the inputs and the annotations, labels or other data.

At box 540, the model is distributed to the end user, e.g., by providing code or other data for operating the machine learning model, such as one or more matrices of weights or other attributes of layers or neurons of an artificial neural network, to the end user over one or more networks.

At box 550, feedback is received from the end user, e.g., over one or more networks. For example, the feedback may include one or more measures of the accuracy or efficiency of the model in performing the task for which the model was trained, and may take any form.

At box 560, whether new data is available to update the model 560 is determined. For example, any new and relevant data regarding the performance of the task may have been identified after the raw data was selected for training the model at box 520, or after the model was so trained at box 530. If any new data is available, the process advances to box 565, where the model is updated based on the feedback received from the end user and the new data. For example, the new data may be provided to the model as inputs, and outputs received from the model may be compared to one or more annotations, labels or other data associated with the data point. If no new data is available, however, then the process advances to box 570, where the model is updated based on the feedback alone.

At box 580, the updated model is redistributed to the end user, e.g., over one or more networks, or in any other manner. At box 590, whether the end user requires continued support for the model is determined. If the end user requires further support for the model, such as for tasks in rapidly emerging fields where levels of accuracy or standards are comparatively high or continue to evolve, then the process returns to box 550, where further feedback is received from the end user. If the end user no longer requires support for the model, however, then the process ends.

As is discussed above, where an end user provides information or data to an artificial intelligence engine to generate a machine learning model for performing a task, or where the end user requests that the machine learning model perform the task based on information or data, one or more user interfaces, or dashboards, may be used to present information or data regarding the status of the transfer of data to the artificial intelligence engine, the training of the model by the artificial intelligence engine, or cost savings or other measures of performance of the model in performing the task.

Referring to FIGS. 6A through 6D, views of aspects of one system in accordance with embodiments of the present disclosure are shown. Except where otherwise noted, reference numerals preceded by the number "6" shown in FIGS. 6A through 6D indicate components or features that are similar to components or features having reference numerals preceded by the number "4" shown in FIGS. 4A through 4C, by the number "2" shown in the block diagram of FIG. 2A or 2B or by the number "1" shown in FIGS. 1A through 1G.

Figure 6A:
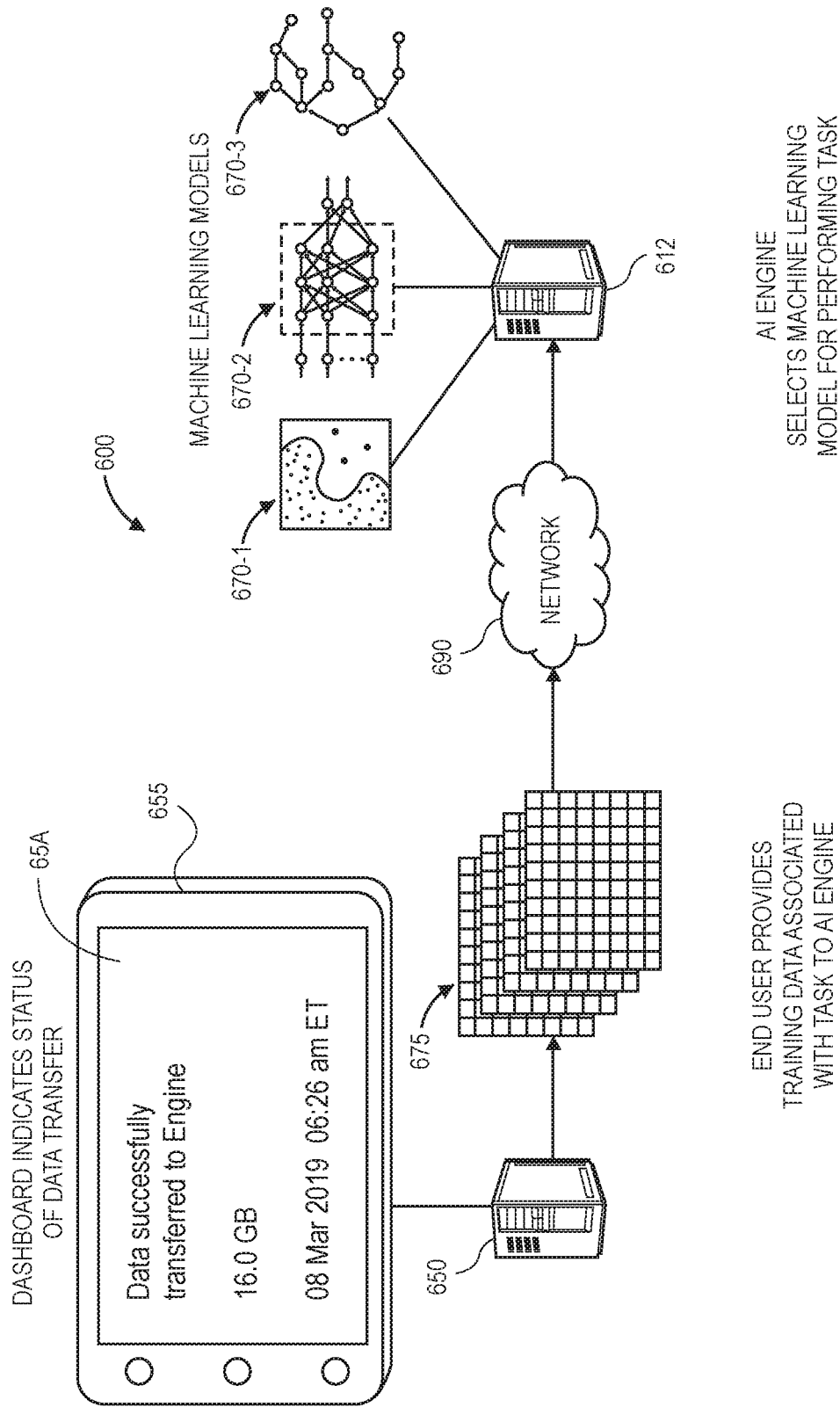
FIGS. 6A through 6D are views of aspects of one system in accordance with embodiments of the present disclosure.

As is shown in FIG. 6A, a system 600 includes a server 612 associated with an artificial intelligence engine or other data processing system connected to a server 650 associated with an end user over a network 690. The server 650 is in communication with one or more mobile devices 655 or other computer devices or machines, e.g., over a standard wireless protocol such as Bluetooth® or Wi-Fi, or in any other manner. The server 650 transfers a set of training data 675 to the server 612, e.g., over the network 690, or in any other manner. The training data 675 may include any type or form of data (e.g., raw data obtained or generated by the end user, or open source data) for generating a machine learning model for performing a given task, as well as any annotations, labels or other identifiers associated with the performance of the task. The server 612 is configured to receive the training data 675, and to select one of a plurality of machine learning models 670-1, 670-2, 670-3 for performing the task on any basis. For example, in some embodiments, the server 612 may select one of the machine learning models 670-1, 670-2, 670-3 based on a sample of the training data 675, or the task to be performed, or on any other basis.

As is also shown in FIG. 6A, a dashboard 65A or other user interface is displayed on the mobile device 655. The dashboard 65A shows information or data regarding a status of a transfer of the training data 675 to the server 612 over the network 690. In some embodiments, the dashboard 65A may show text, characters, symbols, numerical indicators or graphical representations (viz., icons, characters, avatars, visuals, thumbnails or other representations of virtual construction of castles or one or more other structures) of the progress of the transfer. Additionally, the dashboard 65A may further indicate an amount of the training data 675 that is transferred, a time at which the transfer of the training data 675 began, or a time at which the transfer of the training data 675 was completed. The dashboard 65A, or any other dashboards disclosed herein, may be generated based on information or data provided to the server 650 by the server 612, or provided to the mobile device 655 directly. Any type of information or data may be displayed in a dashboard in accordance with embodiments of the present disclosure.

Figure 6B:
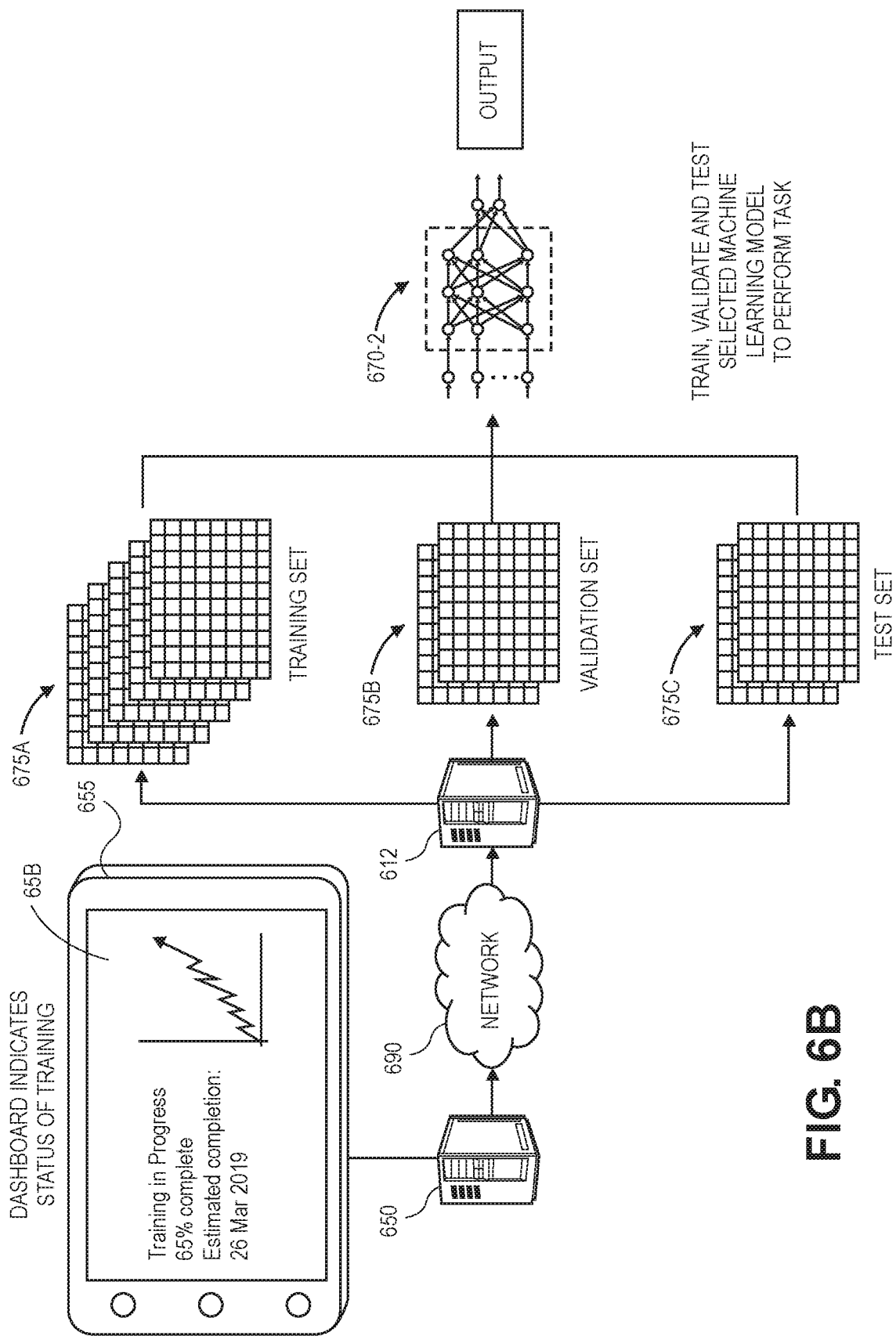

As is shown in FIG. 6B, upon receiving the training data 675, the server 612 splits or parses the training data 675 into a training set 675A, a validation set 675B and a test set 675C, and uses the respective sets of data 675A, 675B, 675C to train a selected machine learning model 670-2. For example, the server 612 may provide data points of the data 675A, 675B, 675C to the machine learning model 670-2 as inputs, and compare outputs received from the machine learning model 670-2 to annotations, labels or other data associated with the data point. Whether the machine learning model 670-2 is sufficiently trained may be determined based on a difference between outputs generated in response to the inputs and the annotations, labels or other data.

Concurrently, as is also shown in FIG. 6B, a dashboard 65B displayed on the mobile device 655 shows information or data regarding a progress of a training of the machine learning model 670-2 using the data 675A, 675B, 675C. For example, the dashboard 65B shows a percentage or a status of the training, as well as a time or a date at which the training is expected to be complete, and one or more graphs or other indicators of the progress of the training. Alternatively, or additionally, the dashboard 65B may display one or more words or other qualitative indicators of the progress of the training, such as "training," "validating," or "testing," or the like. In some embodiments, the dashboard 65B may show training data, numbers of false positives or false negatives associated with the data 675A, 675B, 675C and the task. Any other type of information regarding the training may be displayed in the dashboard 65B in accordance with the present disclosure.

Figure 6C:
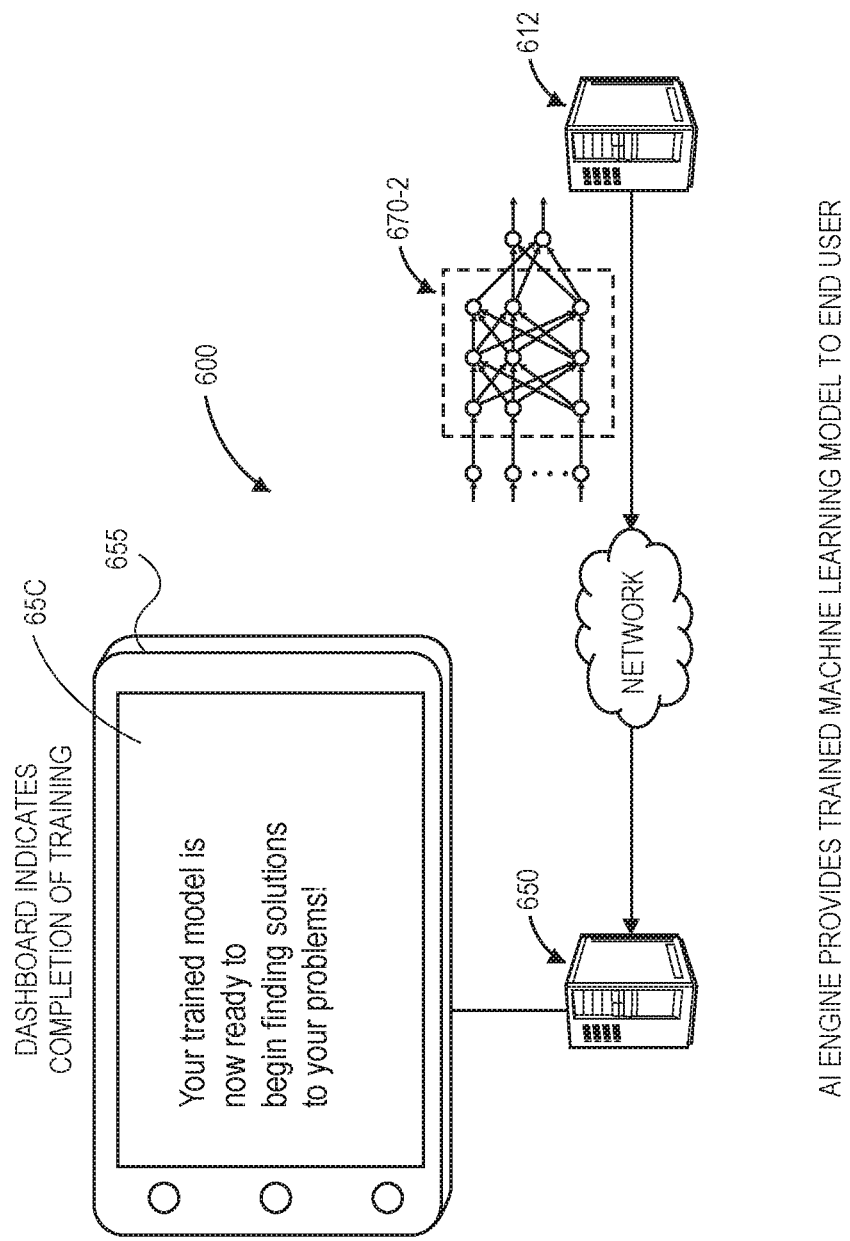

As is shown in FIG. 6C, when the training of the model 670-2 is complete, the trained model 670-2 (e.g., a matrix of weights or other attributes of layers or neurons of an artificial neural network) is transmitted to the server 650 over the network 690. Concurrently, as is also shown in FIG. 6C, a dashboard 65C displayed on the mobile device 655 indicates that the training is complete, and that the trained model 670-2 is being transmitted to the server 650.

Figure 6D:
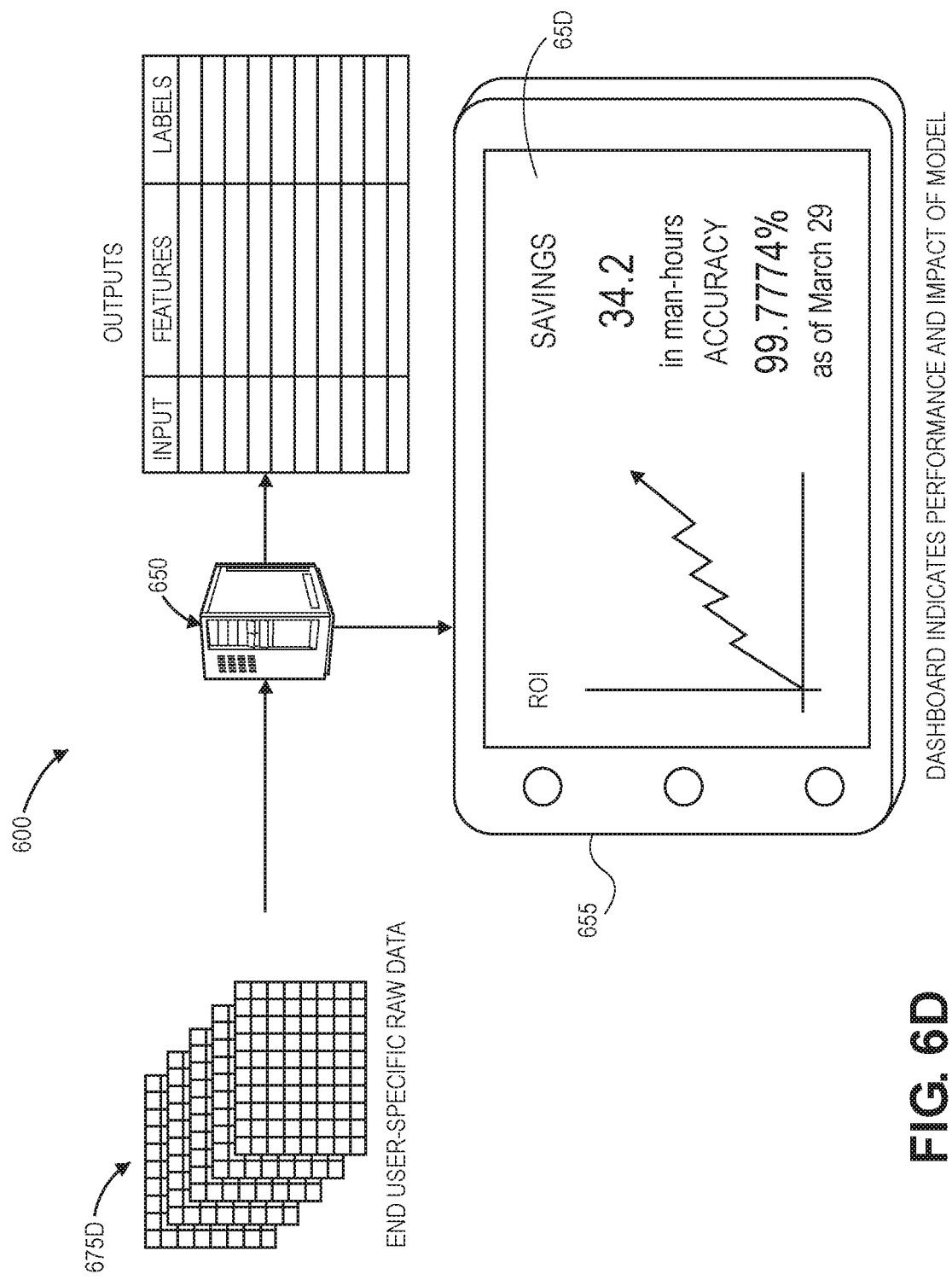

As is shown in FIG. 6D, the model 670-2 is used by the server 650 to process data 675D that is specific to the end user during the performance of the task. Concurrently, as is also shown in FIG. 6D, a dashboard 65D displayed on the mobile device 655 indicates that the model 670-2 is being used to perform the task, and includes information or data regarding a return on an investment in the model 670-2, including man-hours saved by having the server 650 perform the task using the model 670-2, as well as a percentage of accuracy or any other relevant information or data regarding the performance of the task using the model 670-2. For example, the dashboard 65D may indicate a number of employees that would have been required to perform the task at the same level of accuracy as the model 670-2, or any other information or data regarding the task, the level of accuracy, or the employees that would have been required.

A machine learning model may be selected to perform a computer-based task on any basis. For example, where training data is received from an end user for use in training a model to perform a task, and the training data is similar to data that was previously used to train a model, the model that was trained using the similar set of data may be provided to the end user for use in performing the task, and, alternatively or additionally, further trained by the end user.

Figure 7:
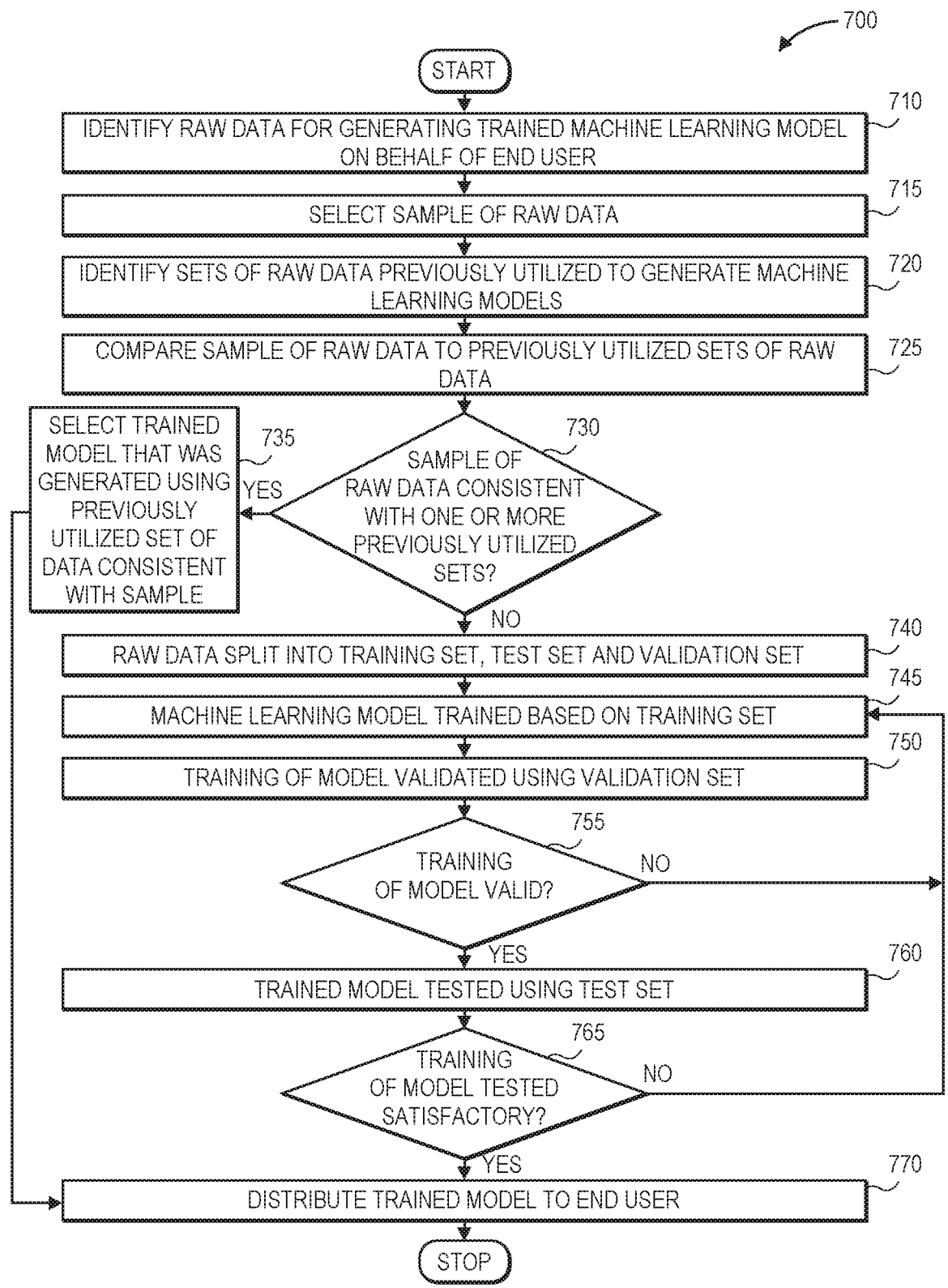
FIG. 7 is a flow chart of one process in accordance with embodiments of the present disclosure.

Referring to FIG. 7, a flow chart of one process in accordance with embodiments of the present disclosure is shown. At box 710, a set of raw data for generating a trained machine learning model on behalf of an end user is identified. For example, the raw data may be data that was previously considered when a given task was performed, e.g., by standard techniques that do not involve machine learning, or data that must be processed to perform the task. The raw data may include imaging data, acoustic data or any other type or form of data, along with annotations, labels or other identifiers of specific portions of the data. At box 715, a sample of the raw data is selected. For example, a random subset of the raw data, samples of the raw data obtained at repeated intervals of time, or samples of the raw data that were obtained at specific relative times (e.g., newest or oldest data) may be selected. The sample of the raw data may be selected according to any criterion in accordance with the present disclosure.

At box 720, sets of raw data that were previously utilized to generate machine learning models are identified. For example, where an artificial intelligence engine previously generated one or more machine learning models, one or more data points of the sets of the raw data that were used to train the machine learning models, or hashes generated based on such data points, may be compared to one or more data points of the sample selected at box 715.

At box 725, the sample of the raw data selected at box 715 is compared to one or more of the previously utilized sets of raw data identified at box 720. The comparison may evaluate similarities of types, formats, values or other attributes of the sample of the raw data selected at box 715 and the sets of raw data identified at box 720.

At box 730, whether the sample of the raw data is consistent with one or more of the previously utilized sets of data is determined, e.g., according to one or more thresholds, metrics or standards. If the sample of the raw data is consistent with one or more of the previously utilized sets of data, then the process advances to box 735, where a trained model that was generated using one or more of the previously utilized sets of data that are consistent with the sample is selected. For example, where a similar set of data was used to generate a convolutional neural network for processing images, a convolutional neural network may be selected. At box 770, the trained model is distributed to the end user, and the process ends.

If the sample of the raw data is not consistent with the one or more of the previously utilized sets of data, however, then the process advances to box 740, where the raw data is split into a training set, a validation set and a test set, which may have any sizes with respect to one another, e.g., where the training set includes approximately seventy to eighty percent of the raw data, or where the validation set and the test set include approximately ten percent of the raw data each. The sizes of the respective sets of data for training, for validation and for testing may be chosen on any basis. Moreover, where the raw data is annotated, the training set, the validation set and the test set may include not only the raw data but also the corresponding annotations of such data.

At box 745, the machine learning model is trained based on the training set, e.g., by providing data points of the training set to the machine learning model as inputs, and comparing outputs received from the machine learning model to annotations, labels or other data associated with the data point. In some embodiments, whether the machine learning model is sufficiently trained may be determined based on a difference between outputs generated in response to the inputs and the annotations, labels or other data.

At box 750, the training of the model is validated using the validation set, e.g., by providing the raw data of the validation set to the model as inputs, and outputs received from the model may be compared to the respective annotations of the validation set. At box 755, whether the training of the model is valid is determined. If the training of the model is not valid, then the process returns to box 745, where the model is further trained based on the training set.

If the training of the model is valid, however, then the process advances to box 760, where the trained model is tested using the test set. For example, the raw data of the test set may be provided to the model as inputs, and outputs received from the model may be compared to the respective annotations of the test set, in a manner similar to the validation of the training of the model at box 750 using the validation set.

At box 765, whether the training of the model is satisfactory is determined. If the trained model does not test satisfactorily, then the process returns to box 745, where the model is further trained based on the training set. If the training of the model is satisfactory, however, then the process advances to box 770, where the trained model is distributed to the end user, e.g., by distributing code for operating the trained model to the end user over a network or in any other manner, and the process ends.

Figure 8:
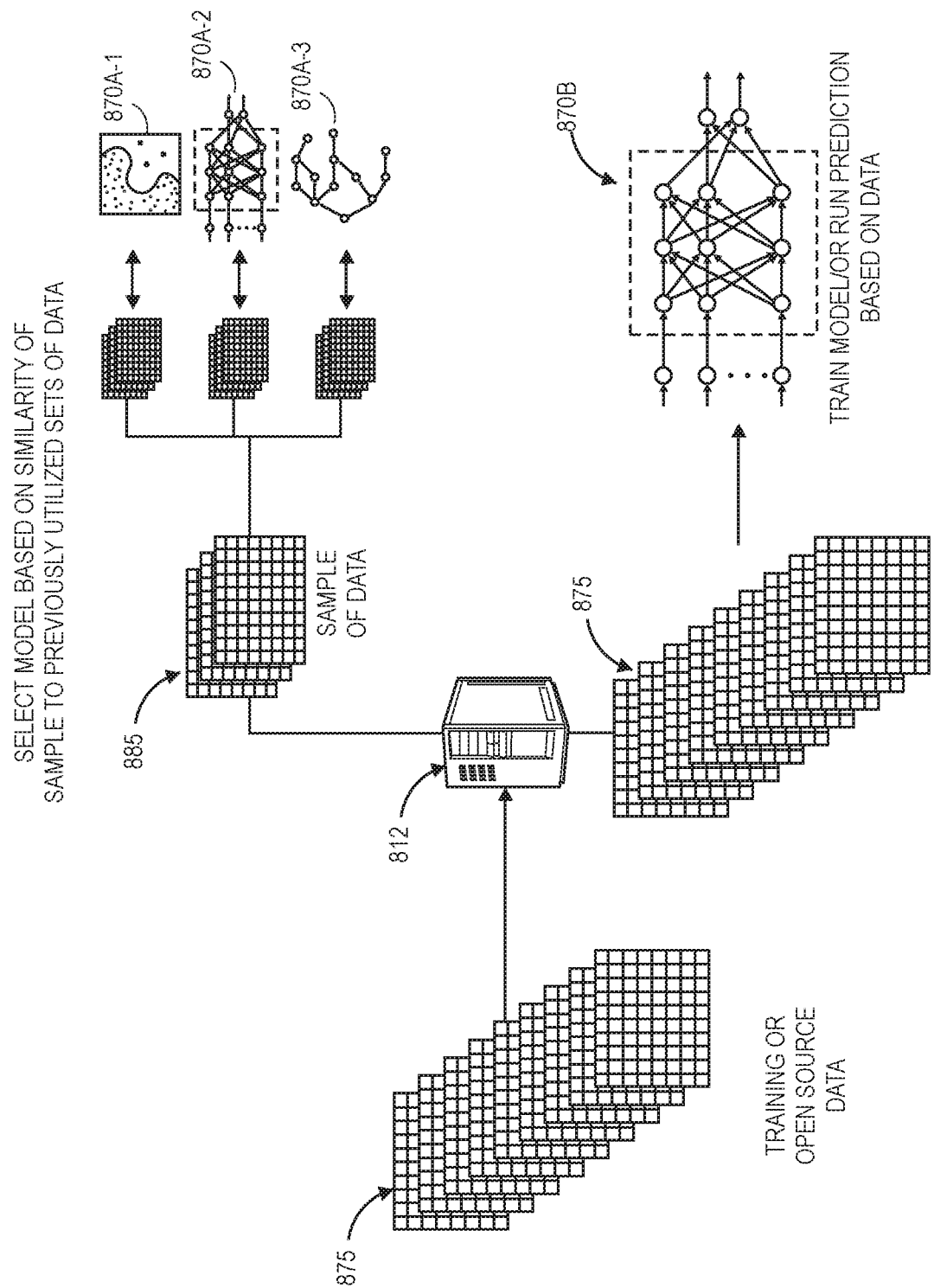
FIG. 8 is a view of aspects of one system in accordance with embodiments of the present disclosure.

Referring to FIG. 8, views of aspects of one system in accordance with embodiments of the present disclosure are shown. Except where otherwise noted, reference numerals preceded by the number "8" shown in FIG. 8 indicate components or features that are similar to components or features having reference numerals preceded by the number "6" shown in FIGS. 6A through 6D, by the number "4" shown in FIGS. 4A through 4C, by the number "2" shown in the block diagram of FIG. 2A or 2B or by the number "1" shown in FIGS. 1A through 1G.

As is shown in FIG. 8, a system 800 includes a server 812 or other computer device or machine associated with an artificial intelligence engine. Where the server 812 receives data 875 (e.g., training or open source data) from an end user or another source for the purpose of training a machine learning model, a sample 885 of the data 875 may be extracted on any basis and compared to sets of data that were previously utilized to generate or train machine learning models 870A-1, 870A-2, 870A-3. If the sample of the data is sufficiently similar to one of the previously utilized sets of data, then one of the models 870A-1, 870A-2, 870A-3 that was trained using the sufficiently similar one of the sets of data may be selected and provided to an end user for use in performing the task. Alternatively, where none of the sets that was previously used to train one of the models 870A-1, 870A-2, 870A-3 is sufficiently similar to the sample 885, the server 812 may train a machine learning model 870B using the data 875 and, upon validating and testing the model 870B, distribute the model 870B to one or more end users.

Where an artificial intelligence engine trains a machine learning model for the performance of a given task by one or more end users, a baseline machine learning model is distributed to the end users for use in performing the task. The end users may further continue to refine the trained machine learning model, based on data captured or obtained by any of the end users during the performance of the task. Each of the end users may return a summary of the differences between their respectively trained models and the baseline model to the artificial intelligence engine, which may consider such differences, and any newly available data, when training and further updating the baseline model for use in the performance of the given task.

Figure 9:
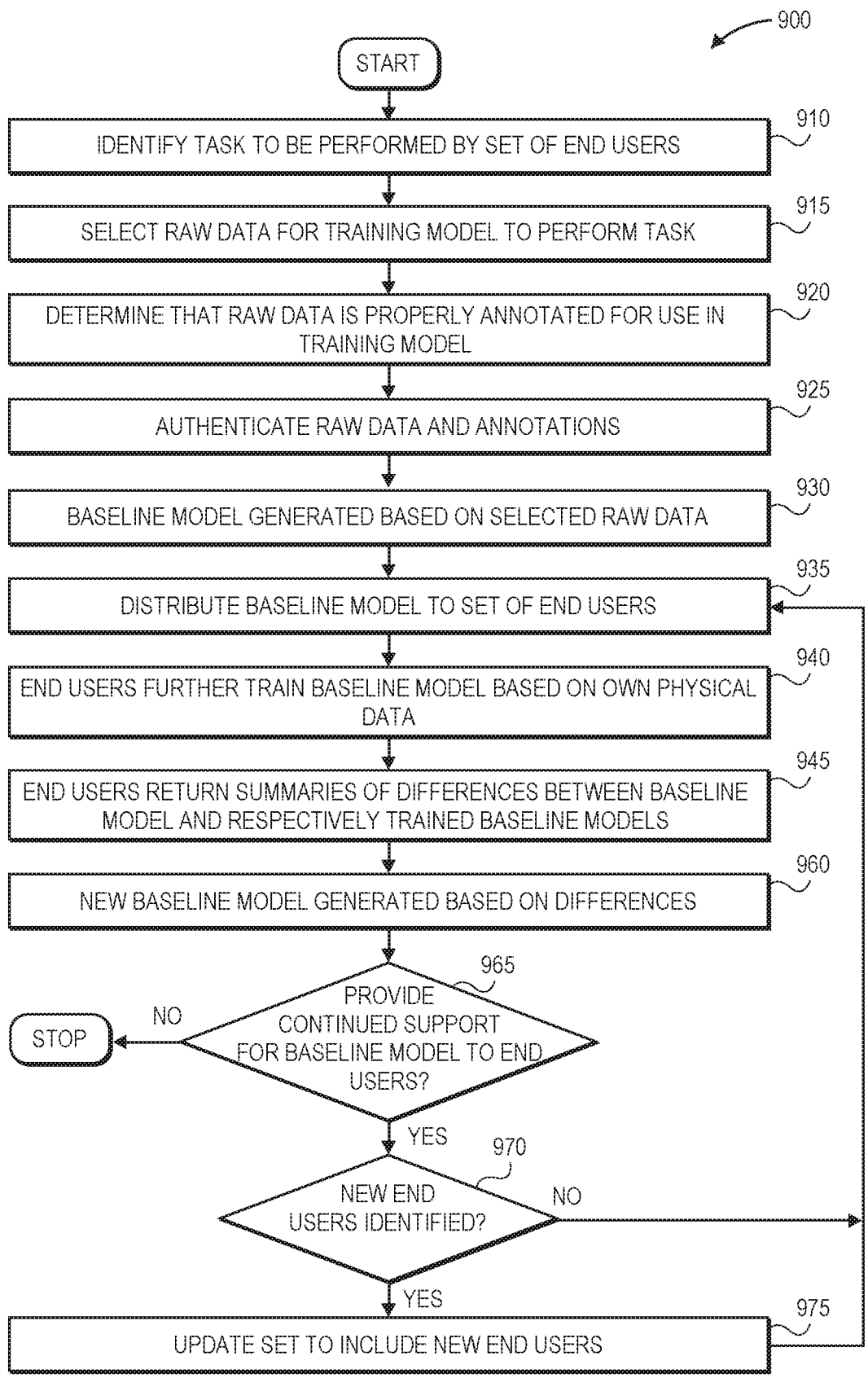
FIG. 9 is a flow chart of one process in accordance with embodiments of the present disclosure.

Referring to FIG. 9, a flow chart of one process in accordance with embodiments of the present disclosure is shown. At box 910, a task to be performed by a set of end users is identified. For example, the end users may be public or private entities such as governments, hospitals, businesses, schools or other facilities that require the performance of a common task using data that is generated or obtained in a similar manner. The task may include, but is not limited to, one or more image processing, computer vision, anomaly detection or voice processing applications, or any other applications. Moreover, any number of end users may perform the task, including as few as one.

At box 915, raw data for training a model to perform the task is selected. In some embodiments, the raw data may be received from each of the end users, or from one or more of the end users, which may be selected or identified on any basis. For example, in some embodiments, the raw data may be data that was previously used by one or more of the end users in performing the task, and end users from which the raw data is to be used may be selected based on any information or data regarding levels of accuracy or precision in having performed the task based on such data. Alternatively, or additionally, data obtained from one or more open sources may be identified for use in training the model, either alone or in combination with other raw data. Furthermore, the model may be any artificial neural network, deep learning system, support vector machine, nearest neighbor methods or analyses, factorization methods or technique, K-means clustering analyses or technique, similarity measures such as log likelihood similarities or cosine similarities, latent Dirichlet allocations or other topic model, decision tree, or latent semantic analyses.

At box 920, that the raw data is properly annotated for use in training the model is determined, e.g., by one or more human operators or other computer devices or systems, such as an artificial intelligence engine. For example, the annotations may be evaluated to determine whether the annotations encompass too much of a given data point, or too little of the data point, or whether the annotations appropriately select or denote relevant portions of the data point for the purposes of training the model. Alternatively, where the raw data is not property annotated, the annotations may be updated or revised, e.g., by narrowing, expanding or relocating the annotations with respect to the raw data, or redesignating other portions of the raw data as annotations.

At box 925, the raw data and annotations are authenticated, e.g., by executing one or more authentication functions on the data and the annotations. In some embodiments, the authentication function may be a hash function, or any other function. At box 930, a baseline model is generated based on the selected raw data. The machine learning model may be trained using both the raw data and the annotations, which may act as targets or other desired values to be received as outputs in response to providing the raw data to the model as inputs. Upon providing a data point to the machine learning model during training, an output received from the machine learning model may be compared to the annotation of the data point. In some embodiments, the output received from the machine learning model may represent a probability (e.g., a number between 0 and 1, or a number according to any scale), or other score, that may be compared to the annotation of the data point. Whether the machine learning model is sufficiently trained may be determined based on a difference between the output and the annotation.

At box 935, the baseline model is distributed to the end user, e.g., by distributing code for operating the trained model to the end user over a network or in any other manner. At box 940, one or more of the end users further train the baseline model based on their own physical data. For example, where the end users obtain raw data, e.g., intrinsic, proprietary raw data other than the raw data selected for training the model at box 915, the end users may further train the baseline model received from the artificial intelligence engine at box 935 by annotating the raw data, providing the raw data to the baseline model as inputs, and comparing outputs received from the baseline model to the annotations. Because such data that the end users may use to further train the baseline model differs from the raw data that was selected at box 915, the accuracy or precision of the baseline model may be enhanced by the additional training.

At box 945, the end users return summaries of the differences between the baseline model that each of the end users received at box 935 and the baseline models following their subsequent training at box 940. For example, each of the end users may independently transmit one or more records or sets of code indicative of the differences between the baseline models, both before and after the training at box 940, over one or more networks, e.g., to the artificial intelligence engine or other system that generated the baseline model at box 930.

At box 960, a new baseline model is generated based on the differences received from the respective end users. For example, the differences between the respectively trained models and the baseline model may be used to adjust the baseline model that was generated at box 930, e.g., by using the differences to tune or modify one or more parameters of the baseline model. Once the baseline model has been updated, code for operating the baseline model may be stored in one or more data stores. Alternatively, in some embodiments, the new baseline model may be generated based on any new and relevant data regarding the performance of the task that may have been identified or become available since the previous baseline model was generated at box 930.

At box 965, whether the end users require continued support for the use of the baseline model is determined. For example, where the task identified at box 910 is an ongoing one, or where data associated with the task continues to evolve, e.g., where the task is in a rapidly emerging field, the end users may require updated versions of the baseline model to continue to perform the task at sufficiently high levels of accuracy. If the end users do not require any further support for the use of the baseline model, then the process ends.

If the end users require further support for the model, however, then the process advances to box 970, where whether any new end users are identified as requiring the baseline model in order to perform the task is determined. If there are any new end users, then the process advances to box 975, where the set of users is updated to include the new end users.

If there are no new end users, or after the set has been updated at box 975 to include the new end users, the process returns to box 935, where the new baseline model generated at box 960 is distributed to the end users, and to box 940, where the end users further train the baseline model based on their own raw data. The baseline models may be repeatedly generated, distributed, trained and updated any number of times or for any number of iterations in accordance with the present disclosure, and the end users of the set that utilize the baseline model in the performance of the task may vary with each iteration.

Referring to FIGS. 10A through 10D, views of aspects of one system in accordance with embodiments of the present disclosure are shown. Except where otherwise noted, reference numerals preceded by the number "10" shown in FIGS. 10A through 10D indicate components or features that are similar to components or features having reference numerals preceded by the number "8" shown in FIG. 8, by the number "6" shown in FIGS. 6A through 6D, by the number "4" shown in FIGS. 4A through 4C, by the number "2" shown in the block diagram of FIG. 2A or 2B or by the number "1" shown in FIGS. 1A through 1G.

Figure 10A:
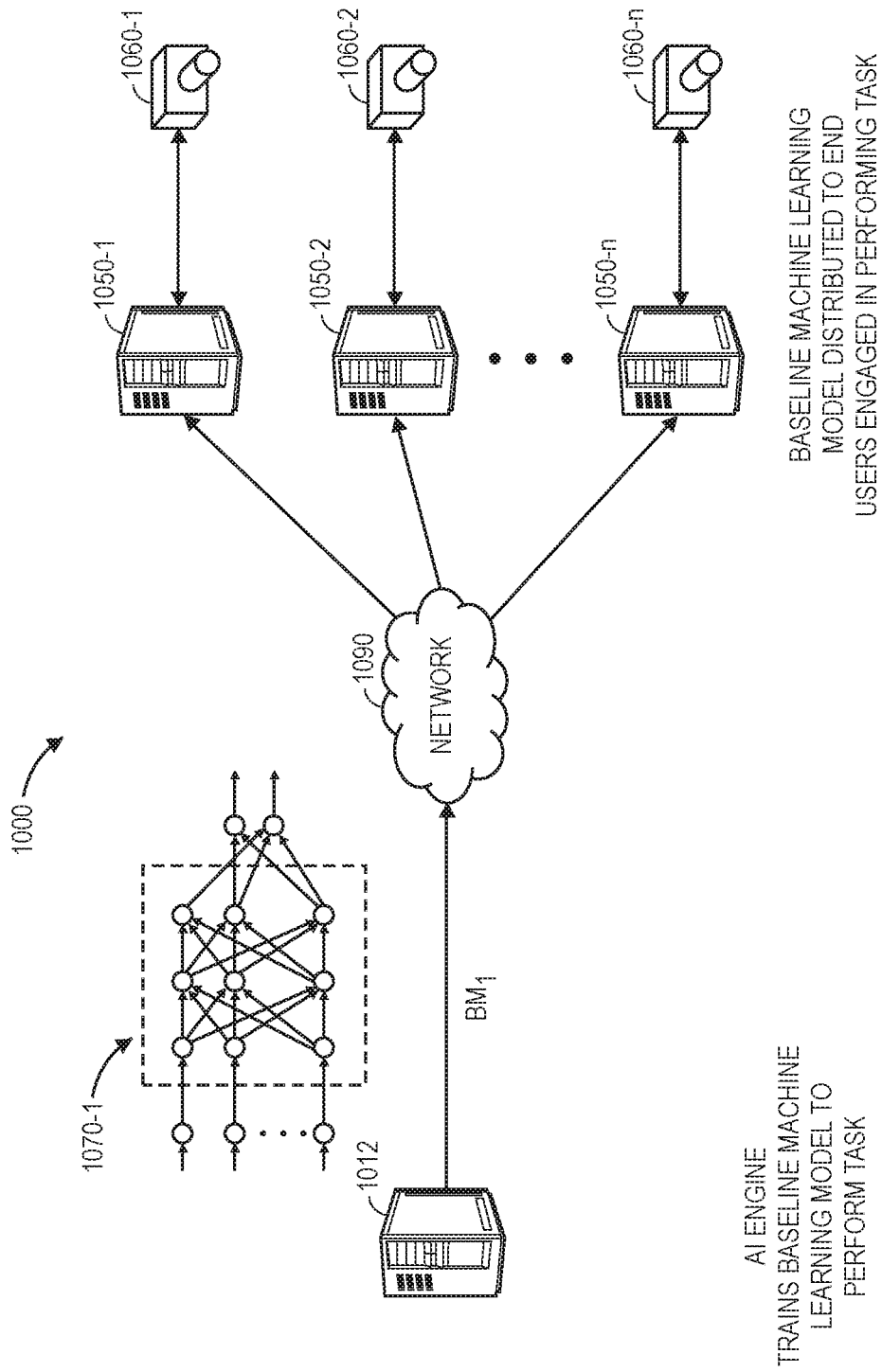

As is shown in FIG. 10A, a system 1000 includes a server 1012 operated by or associated with an artificial intelligence engine or other data processing system and a plurality of servers (or other computer devices or systems) 1050-1, 1050-2 . . . 1050-$n$ that are operated by or associated with end users. In some embodiments, the end users may include hospitals, universities, research laboratories, military facilities, financial institutions, manufacturing plants or retail stores (e.g., bricks-and-mortar establishments or electronic commerce entities), or any other end users. Each of the servers 1050-1, 1050-2 . . . 1050-$n$ is in communication with one or more sensors 1060-1, 1060-2 . . . 1060-$n$ that are configured to capture information or data that is required to perform a task. The sensors 1060-1, 1060-2 . . . 1060-$n$ may include, but are not limited to, digital cameras or other imaging devices, microphones or other acoustic sensors, or any other sensors.

Although the system 1000 shown in FIG. 10A shows just three servers 1050-1, 1050-2 . . . 1050-$n$, those of ordinary skill in the pertinent arts will recognize that any number of servers associated with any number of end users may be in communication with the artificial intelligence system in accordance with the present disclosure. Likewise, although each of the servers 1050-1, 1050-2 . . . 1050-$n$ is shown as being in communication with a respective one of the sensors 1060-1, 1060-2 . . . 1060-$n$ in FIGS. 10A through 10D, an end user may utilize any number of sensors that are configured to capture any type of information or data in accordance with the present disclosure.

As is further shown in FIG. 10A, the server 1012 trains a baseline machine learning model 1070-1 to perform a task. For example, in some embodiments, the task may require the processing of imaging data, acoustic data, or any other information or data captured by the sensors 1060-1, 1060-2 . . . 1060-$n$, in accordance with one or more computer vision applications, anomaly detection applications, or voice recognition or natural language processing applications. Subsequently, the server 1012 distributes the baseline model 1070-1 to the servers 1050-1, 1050-2 . . . 1050-$n$ associated with the end users via the network 1090, such as by transmitting code or other data for operating the machine learning model, e.g., one or more matrices of weights or other attributes of layers or neurons of an artificial neural network, to the servers 1050-1, 1050-2 . . . 1050-$n$, or in any other manner.

Figure 10B:
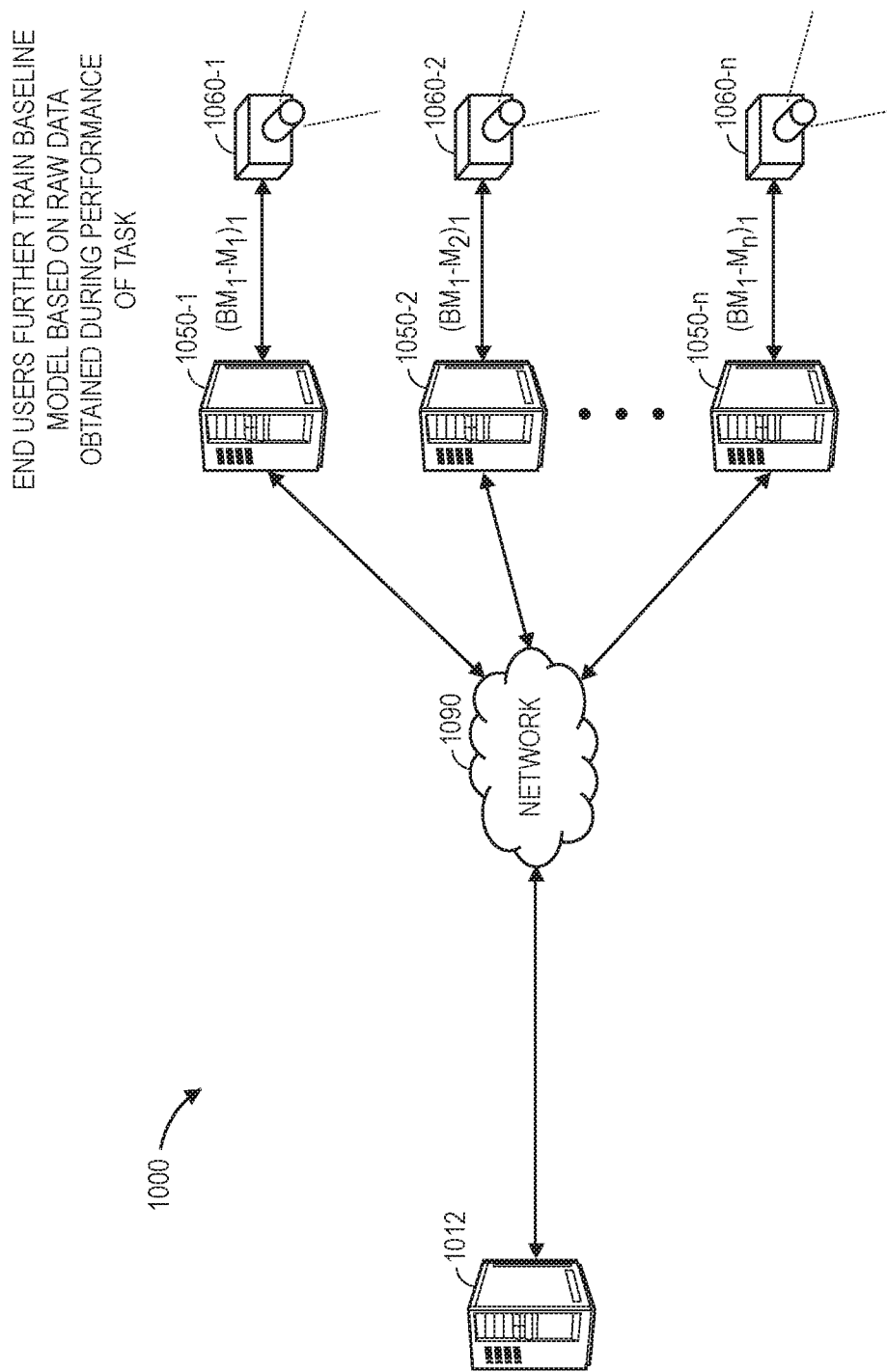

Upon receiving the baseline model 1070-1, each of the servers 1050-1, 1050-2 . . . 1050-$n$ may immediately begin using the baseline model 1070-1 to assist in the performance of the task. Additionally, as is shown in FIG. 10B, the end users may further train the baseline model 1070-1 based on the raw data captured by the sensors 1060-1, 1060-2 . . . 1060-$n$ during the performance of the task, or obtained in any other manner. For example, as is shown in FIG. 10B, each of the servers 1050-1, 1050-2 . . . 1050-$n$ may calculate differences between the baseline model 1070-1, or $BM_1$, and updated or revised versions of the baseline model $M_1$, $M_2$ . . . $M_n$ that were respectively trained by each of the servers 1050-1, 1050-2 . . . 1050-$n$ using the data captured by the sensors 1060-1, 1060-2 . . . 1060-$n$, or $(BM_1\text{-}M_1)_1$, $(BM_1\text{-}M_2)_1$ . . . $(BM_1\text{-}M_n)_1$. As is shown in FIG. 10C, each of the servers 1050-1, 1050-2 . . . 1050-$n$ returns feedback regarding the performance of the baseline model 1070-1 to the server 1012 over the network 1090, or in any other manner. For example, as is further shown in FIG. 10C, the feedback may include the differences calculated between the baseline model 1070-1, or $BM_1$, and the respectively trained versions of the baseline model $M_1$, $M_2$ . . . $M_n$, or $(BM_1\text{-}M_1)_1$, $(BM_1\text{-}M_2)_1$ . . . $(BM_1\text{-}M_n)_1$, to the server 1012. Alternatively, the feedback may include any other qualitative or quantitative information regarding the effectiveness of the baseline model 1070-1 during the performance of the task.

Figure 10D:
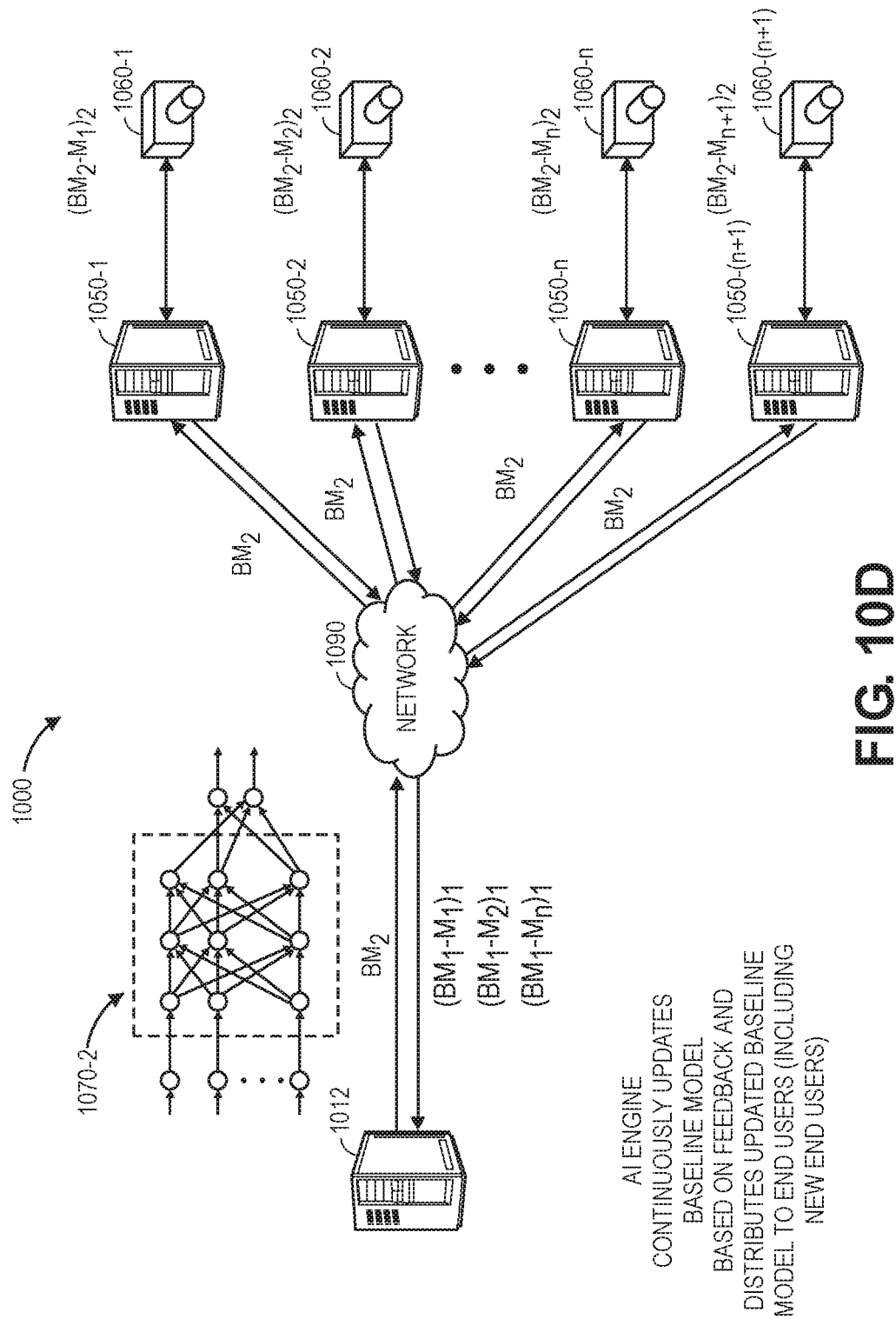

As is shown in FIG. 10D, the server 1012 associated with the artificial intelligence engine continuously updates the baseline models generated thereby based on feedback received from the servers 1050-1, 1050-2 . . . 1050-$n$, through any number of iterations. The server 1012 may update the baseline models by training the baseline models based on the feedback, and may validate and/or test the updated baseline models before distributing the updated baseline models to the end users, including any new end users that may be engaged in the performance of the same task. For example, as is shown in FIG. 10D, upon receiving the feedback in the form of the differences $(BM_1\text{-}M_1)_1$, $(BM_1\text{-}M_2)_1$ . . . $(BM_1\text{-}M_n)_1$ from the servers 1050-1, 1050-2 . . . 1050-$n$, the server 1012 generates an updated baseline model 1070-2, or $BM_2$, and distributes the baseline model 1070-2 not only to the servers 1050-1, 1050-2 . . . 1050-$n$ that received the baseline model 1070-1 and returned the feedback to the server 1012, but also one or more additional servers 1050-($n$+1) that are associated with new end users that did not previously receive the baseline model 1070-1.

Thereafter, any of the servers 1050-1, 1050-2 . . . 1050-$n$, 1050-($n$+1) may further train the baseline model 1070-2 based on the raw data captured by sensors 1060-1, 1060-2 . . . 1060-$n$, 1060-($n$+1) during the performance of the task, and return feedback in the form of differences calculated between the baseline model 1070-2, or $BM_2$, and respectively trained versions of the baseline model $M_1$, $M_2$ . . . $M_n$, or $(BM_2\text{-}M_1)_2$, $(BM_2\text{-}M_2)_2$ . . . $(BM_2\text{-}M_n)_2$, $(BM_2\text{-}M_{n+1})_2$, to the server 1012, for any number of iterations in accordance with the present disclosure.

Where an artificial intelligence engine trains a machine learning model for the performance of a given task by one or more end users, a baseline machine learning model is distributed to the end users for use in performing the task. The end users may further continue to refine the trained machine learning model, based on data captured or obtained by any of the end users during the performance of the task. Each of the end users may return a summary of the differences between their respectively trained models and the baseline model to the artificial intelligence engine, which may consider such differences, and any newly available data, when training and further updating the baseline model for use in the performance of the given task.

Figure 11A:
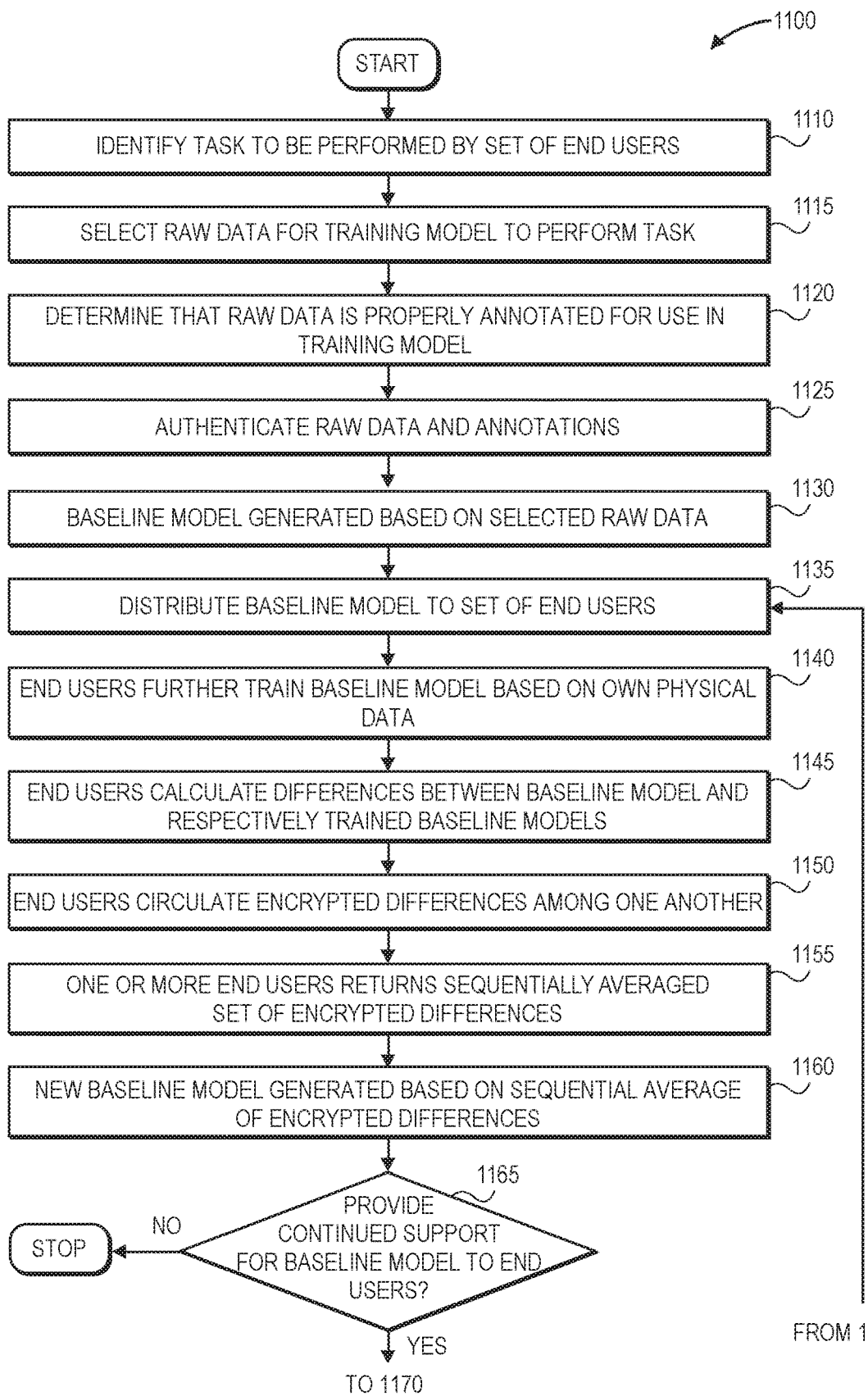
FIGS. 11A and 11B are a flow chart of one process in accordance with embodiments of the present disclosure.
Figure 11B:
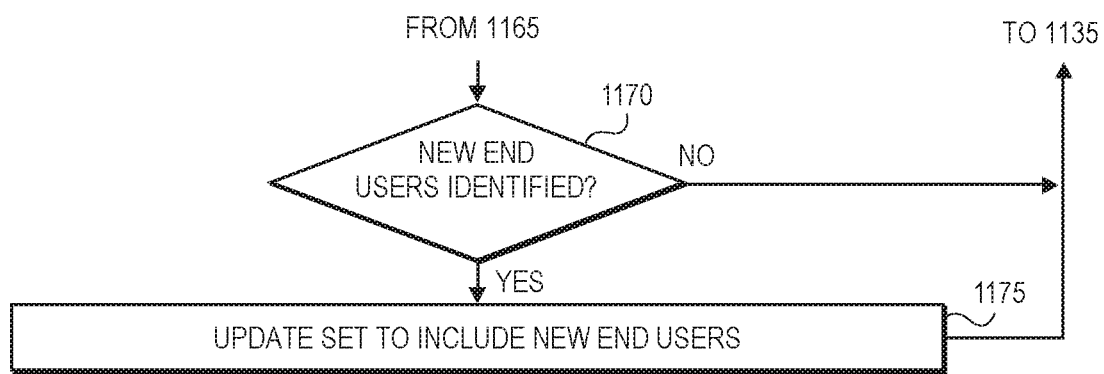

Referring to FIGS. 11A and 11B, a flow chart of one process in accordance with embodiments of the present disclosure is shown. At box 1110, a task to be performed by a set of end users, e.g., any number or type of public or private entities, is identified. The task may include, but is not limited to, one or more image processing, computer vision, anomaly detection or voice processing applications, or any other applications. At box 1115, raw data for training a machine learning model to perform the task is selected. In some embodiments, the raw data may be received from any number of the end users, who may be selected or identified on any basis, such as any historical experience in using the raw data, or a measure of relevance of the raw data to the performance of the task. Alternatively, or additionally, data obtained from one or more open sources may also be identified for use in training the model, which may be an artificial neural network may be any artificial neural network, deep learning system, support vector machine, or any other model.

At box 1120, that the raw data is properly annotated for use in training the model is determined, e.g., by one or more human operators or other computer devices or systems, such as an artificial intelligence engine. At box 1125, the raw data and annotations are authenticated, e.g., by executing one or more authentication functions on the data and the annotations. In some embodiments, the authentication function may be a hash function, or any other function. At box 1130, a baseline model is generated based on the selected raw data. The machine learning model may be trained using both the raw data and the annotations, which may act as targets or other desired values to be received as outputs in response to providing the raw data to the model as inputs. Whether the machine learning model is sufficiently trained may be determined based on a difference between the output and the annotation.

At box 1135, the baseline model is distributed to the end user, e.g., by distributing code for operating the trained model to the end user over a network or in any other manner. At box 1140, one or more of the end users further train the baseline model based on their own physical data. For example, where the end users obtain raw data, e.g., intrinsic, proprietary raw data other than the raw data selected for training the model at box 1115, the end users may further train the baseline model received from the artificial intelligence engine by annotating the raw data, providing the raw data to the baseline model as inputs, and comparing outputs received from the baseline model to the annotations. The accuracy or precision of the baseline model may be enhanced by the additional training.

At box 1145, the end users calculate differences between the baseline model that each of the end users received at box 1135 and the baseline models following their subsequent training at box 1140. For example, each of the end users may independently transmit one or more records or sets of code indicative of differences between the baseline models, both before and after the training at box 1140, over one or more networks, e.g., to the artificial intelligence engine or other system that generated the baseline model at box 1130.

At box 1150, the end users encrypt their respectively calculated differences between the baseline models before and after their training at box 1140, e.g., according to one or more encryption techniques, thereby converting such differences to ciphertext, and circulate the encrypted differences among one another. For example, a first end user may calculate a first difference between a baseline model that it received at box 1135 and the baseline model following its subsequent training by the first end user at box 1140, and encrypt the first difference using an encryption algorithm and encryption key. The first end user then transfers the encrypted first difference to a second end user, which also calculates a second difference between the baseline model that it received at box 1135 and the baseline model following its subsequent training by the second end user at box 1140. The second end user may also encrypt the second difference using an encryption algorithm and encryption key.

Next, the second end user combines the encrypted first difference and the encrypted second difference, e.g., according to a fully or partially homomorphic encryption scheme. For example, in some embodiments, the second end user may sum the encrypted first difference and the encrypted second difference, calculate an average of the encrypted first difference and the encrypted second difference, or execute any function on each of the encrypted first difference and the encrypted second difference, before circulating the combined encrypted differences to a third end user. The third end user may then also calculate a third difference between the baseline model that it received at box 1135 and the baseline model following its subsequent training by the third end user at box 1140, encrypts the third difference, combines the encrypted third difference with the encrypted first difference and the encrypted second difference in any manner, e.g., by summing or sequentially averaging the encrypted differences. The encryption of differences and the combination of encrypted differences may be completed by any number of the end users, in any order, e.g., according to a Monte Carlo shuffling algorithm or technique.

At box 1155, one or more of the end users returns a sequentially averaged set of the encrypted differences, e.g., to the artificial intelligence engine or data processing system that generated the baseline model at box 1130. Information or data regarding the sequentially averaged set of the encrypted differences, e.g., one or more matrices or other sets of data describing differences in weights or other attributes of layers or neurons of an artificial neural network, may be transmitted or otherwise provided to the artificial intelligence engine or data processing system in any manner.

At box 1160, a new baseline model is generated based on the differences received from the respective end users. For example, the differences between the respectively trained models and the baseline model may be used to adjust the baseline model that was generated at box 1130, e.g., by using the differences to tune or modify one or more parameters of the baseline model. Once the baseline model has been updated, code for operating the baseline model may be stored in one or more data stores. Alternatively, in some embodiments, the new baseline model may be generated based on any new and relevant data regarding the performance of the task that may have been identified or become available since the previous baseline model was generated at box 1130.

At box 1165, whether the end users require continued support for the use of the baseline model is determined. For example, where the task identified at box 1110 is an ongoing one, or where data associated with the task continues to evolve, e.g., where the task is in a rapidly emerging field, the end users may require updated versions of the baseline model to continue to perform the task at sufficiently high levels of accuracy. If the end users do not require any further support for the use of the baseline model, then the process ends.

If the end users require further support for the model, however, then the process advances to box 1170, where whether any new end users are identified as requiring the baseline model in order to perform the task is determined. If there are any new end users, then the process advances to box 1175, where the set of users is updated to include the new end users.

If there are no new end users, or after the set has been updated at box 1175 to include the new end users, the process returns to box 1135, where the new baseline model generated at box 1160 is distributed to the end users, and to box 1140, where the end users further train the baseline model based on their own raw data. The baseline models may be repeatedly generated, distributed, trained and updated any number of times or for any number of iterations in accordance with the present disclosure, and the end users of the set that utilize the baseline model in the performance of the task may vary with each iteration.

Referring to FIGS. 12A through 12E, views of aspects of one system in accordance with embodiments of the present disclosure are shown. Except where otherwise noted, reference numerals preceded by the number "12" shown in FIGS. 12A through 12E indicate components or features that are similar to components or features having reference numerals preceded by the number "10" shown in FIGS. 10A through 10D, by the number "8" shown in FIG. 8, by the number "6" shown in FIGS. 6A through 6D, by the number "4" shown in FIGS. 4A through 4C, by the number "2" shown in the block diagram of FIG. 2A or 2B or by the number "1" shown in FIGS. 1A through 1G.

Figure 12A:
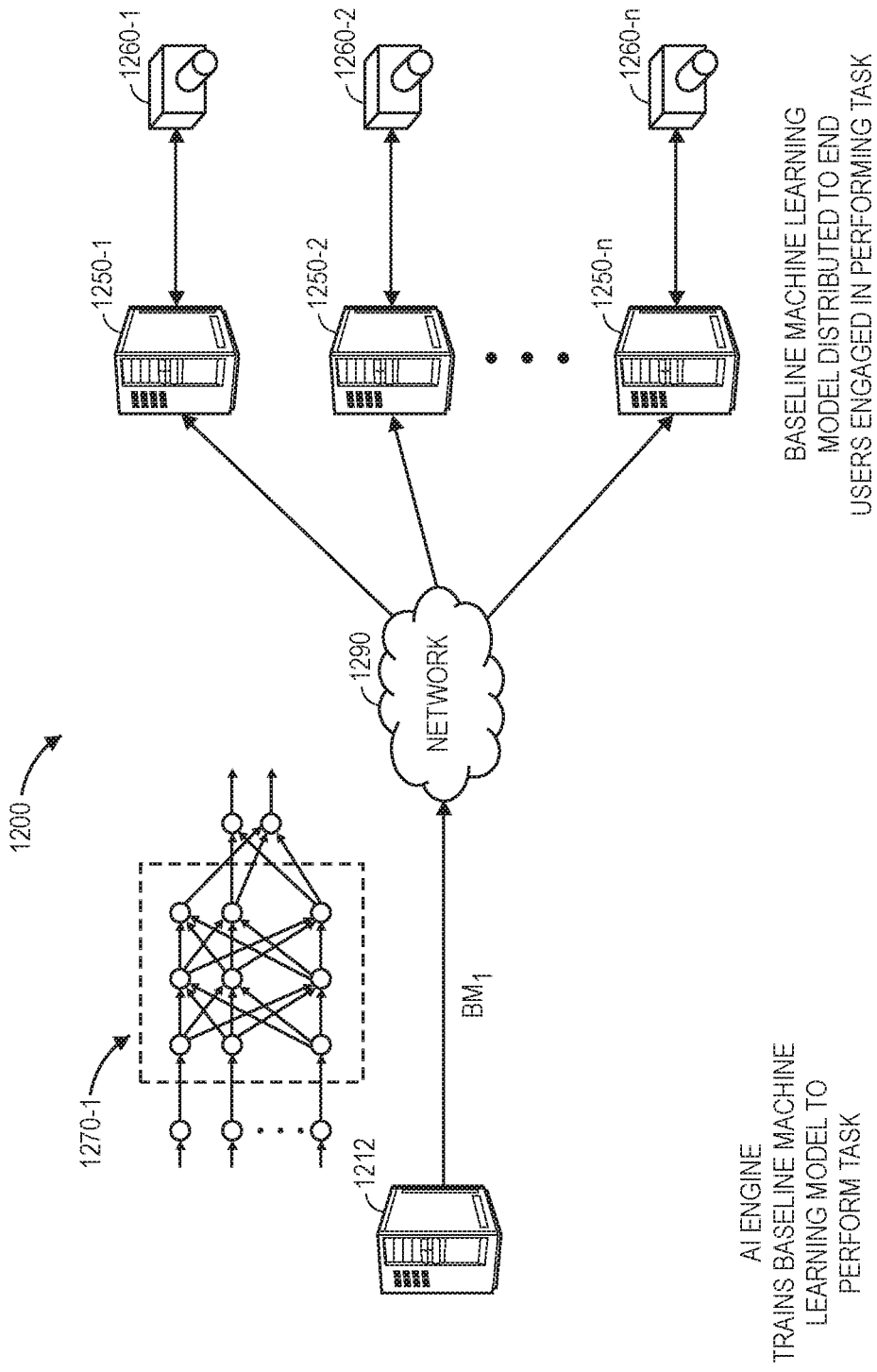

As is shown in FIG. 12A, a system 1200 includes a server 1212 operated by or associated with an artificial intelligence engine or other data processing system and a plurality of servers (or other computer devices or systems) 1250-1, 1250-2 . . . 1250-n that are operated by or associated with any type of end users (e.g., hospitals, universities, research laboratories, military facilities, financial institutions, manufacturing plants or retail stores). Each of the servers 1250-1, 1250-2 . . . 1250-n is in communication with one or more sensors 1260-1, 1260-2 . . . 1260-n, e.g., imaging devices, acoustic sensors, or others, that are configured to capture information or data that is required to perform a task. Any number of servers associated with any number of end users may be in communication with the artificial intelligence system in accordance with the present disclosure, and each of such end users may utilize any number of sensors to capture any type of information or data.

As is further shown in FIG. 12A, the server 1212 trains a baseline machine learning model 1270-1 to perform a task. For example, in some embodiments, the task may require the processing of imaging data, acoustic data, or any other information or data captured by the sensors 1260-1, 1260-2 . . . 1260-n, in accordance with one or more computer vision applications, anomaly detection applications, or voice recognition or natural language processing applications. Subsequently, the server 1212 distributes the baseline model 1270-1 to the servers 1250-1, 1250-2 . . . 1250-n associated with the end users via the network 1290, such as by transmitting code or other data for operating the machine learning model, e.g., one or more matrices of weights or other attributes of layers or neurons of an artificial neural network, to the servers 1250-1, 1250-2 . . . 1250-n, or in any other manner.

Upon receiving the baseline model 1270-1, each of the servers 1250-1, 1250-2 . . . 1250-n may immediately begin using the baseline model 1270-1 to assist in the performance of the task. Additionally, as is shown in FIG. 12B, the end users may further train the baseline model 1270-1 based on the raw data captured by the sensors 1260-1, 1260-2 . . . 1260-n during the performance of the task, or obtained in any other manner. For example, as is shown in FIG. 12B, each of the servers 1250-1, 1250-2 . . . 1250-n may calculate differences between the baseline model 1270-1, or $BM_1$, and updated or revised versions of the baseline model $M_1$, $M_2$ . . . $M_n$ that were respectively trained by each of the servers 1250-1, 1250-2 . . . 1250-n using the data captured by the sensors 1260-1, 1260-2 . . . 1260-n, or $(BM_1-M_1)_1$, $(BM_1-M_2)_1$ . . . $(BM_1-M_n)_1$.

Figure 12C:
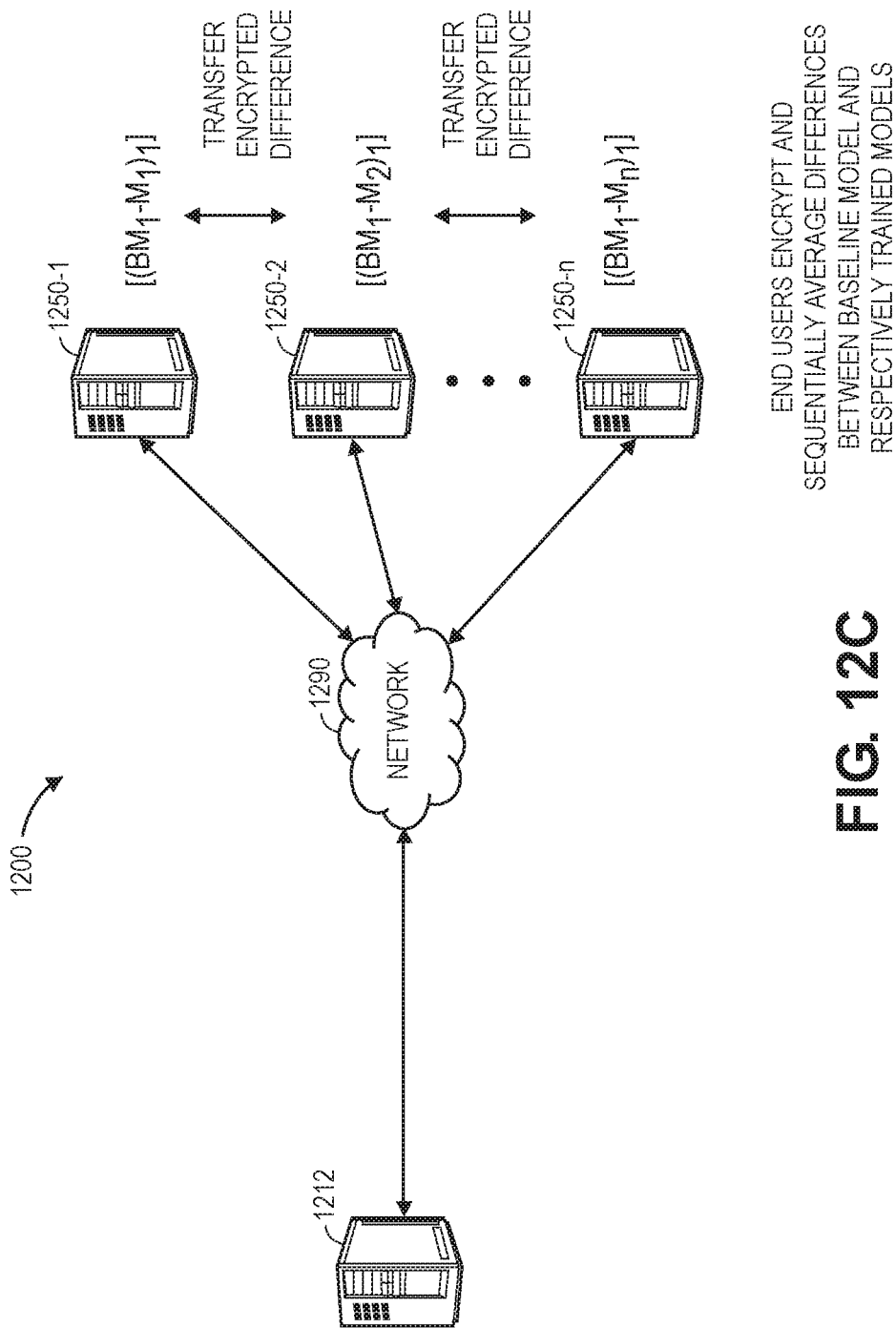

As is shown in FIG. 12C, each of the servers 1250-1, 1250-2 . . . 1250-n encrypts the respectively calculated differences $(BM_1-M_1)_1$, $(BM_1-M_2)_1$ . . . $(BM_1-M_n)_1$, and transfers the encrypted differences $[(BM_1-M_1)]_1$, $[(BM_1-M_2)_1]$ . . . $[(BM_1-M_n)_1]$ between one another, e.g., over the network 1290. The differences $(BM_1-M_1)_1$, $(BM_1-M_2)_1$ . . . $(BM_1-M_n)_1$ may be encrypted according to any encryption algorithm, including but not limited to a fully or partially homomorphic encryption algorithm, prior to transferring the encrypted differences $[(BM_1-M_1)]_1$, $[(BM_1-M_2)_1]$ . . . $[(BM_1-M_n)_1]$ therebetween. Each of the servers 1250-1, 1250-2 . . . 1250-n that receives an encrypted difference from another of the servers 1250-1, 1250-2 . . . 1250-n may perform any calculations or execute any functions on the encrypted differences $[(BM_1-M_1)]_1$, $[(BM_1-M_2)_1]$ . . . $[(BM_1-M_n)_1]$, such as by sequentially averaging the encrypted differences $[(BM_1-M_1)]_1$, $[(BM_1-M_2)_1]$ . . . $[(BM_1-M_n)_1]$, or any other calculations or functions.

Figure 12D:
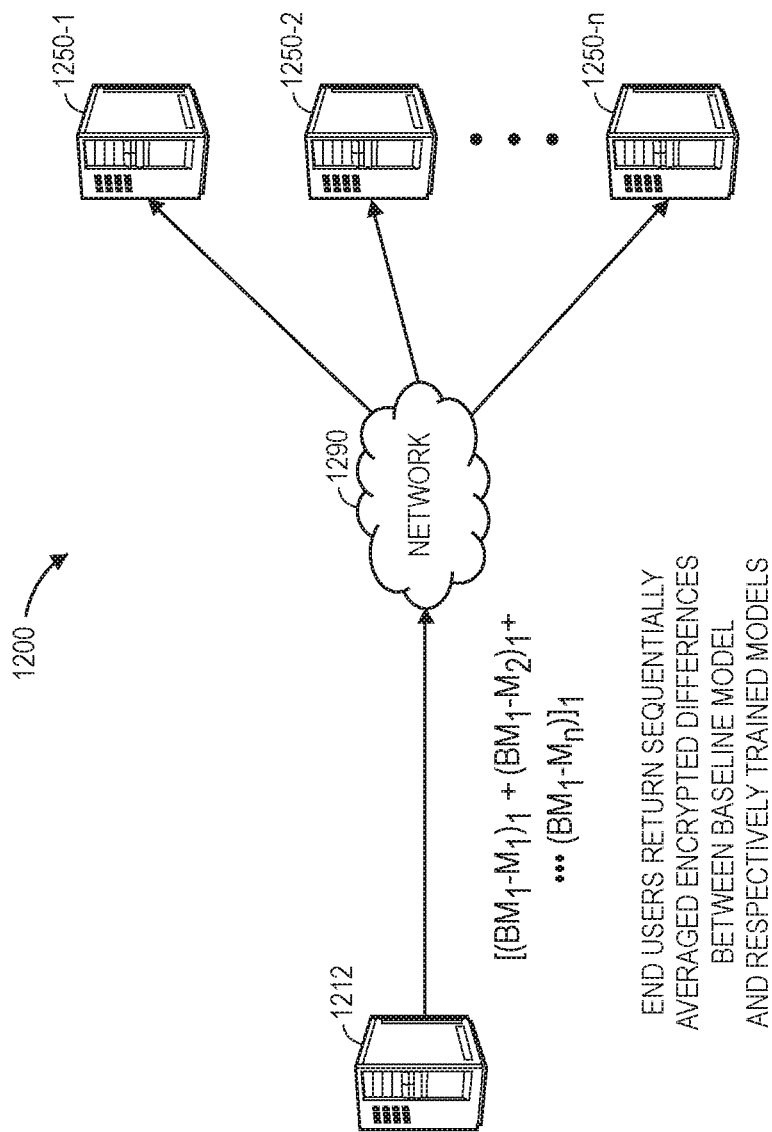

As is shown in FIG. 12D, one or more of the servers 1250-1, 1250-2 . . . 1250-n returns feedback including the sequentially averaged encrypted differences $[(BM_1-M_1)]_1$, $[(BM_1-M_2)_1]$ . . . $[(BM_1-M_n)_1]$ to the server 1212 over the network 1290, or in any other manner. Alternatively, or additionally, the feedback may include any other qualitative or quantitative information regarding the effectiveness of the baseline model 1270-1 during the performance of the task by each of the respective end users.

Figure 12E:
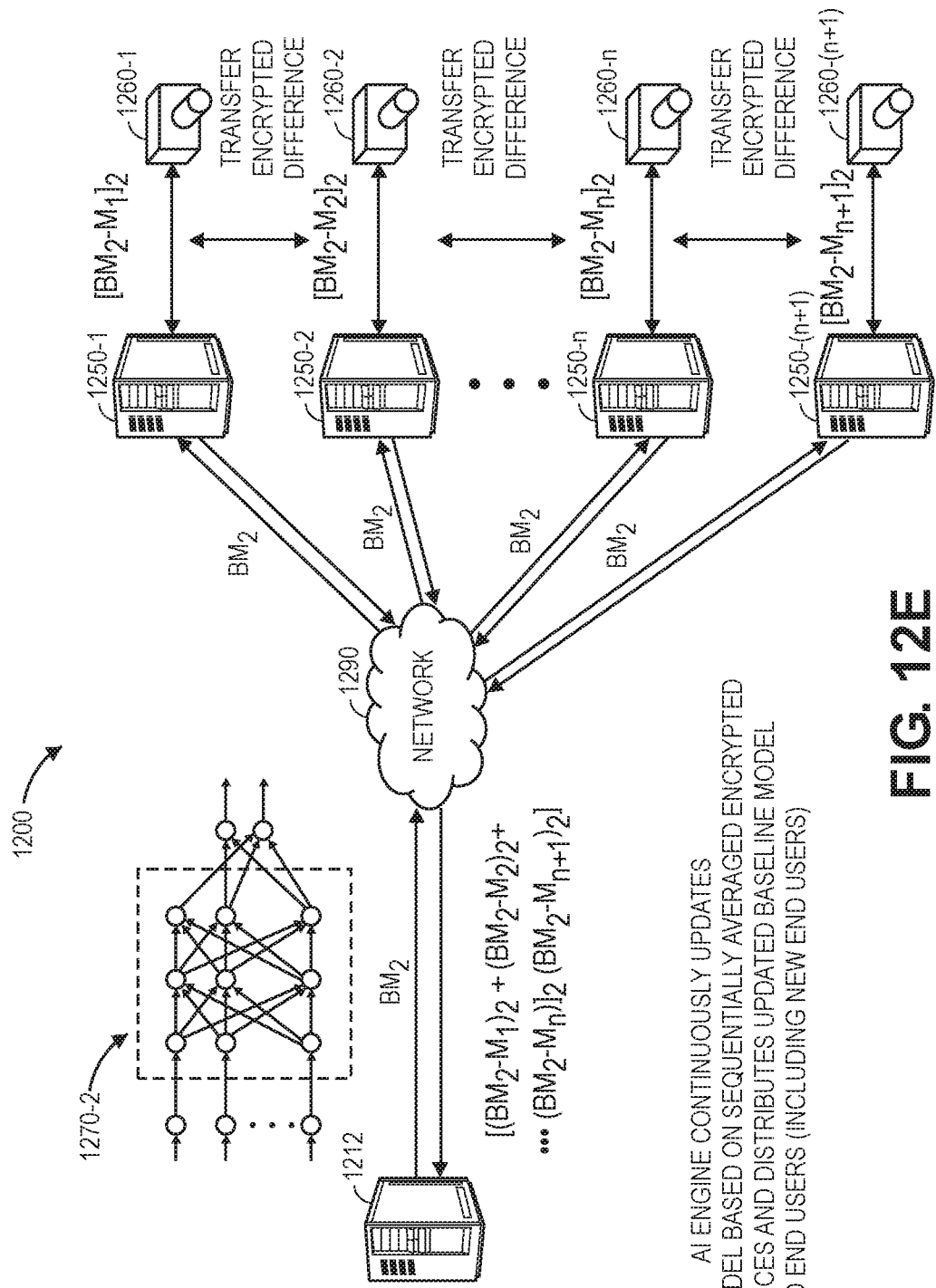

As is shown in FIG. 12E, the server 1212 associated with the artificial intelligence engine continuously updates the baseline models generated thereby based on the sequentially averaged encrypted differences $[(BM_1-M_1)]_1$, $[(BM_1-M_2)_1]$ . . . $[(BM_1-M_n)_1]$ or any other feedback received from the servers 1250-1, 1250-2 . . . 1250-n, through any number of iterations. The server 1212 may update the baseline models by training the baseline models based on the sequentially averaged encrypted differences $[(BM_1-M_1)]_1$, $[(BM_1-M_2)_1]$ . . . $[(BM_1-M_n)_1]$ or the feedback, validate and/or test the updated baseline models before distributing the updated baseline models to the end users, including any new end users that may be engaged in the performance of the same task.

For example, as is shown in FIG. 12D, upon receiving the sequentially averaged encrypted differences $[(BM_1-M_1)]_1$, $[(BM_1-M_2)_1]$ . . . $[(BM_1-M_n)_1]$ from the servers 1250-1, 1250-2 . . . 1250-n, the server 1212 generates an updated baseline model 1270-2, or $BM_2$, and distributes the baseline model 1270-2 not only to the servers 1250-1, 1250-2 . . . 1250-n that received the baseline model 1270-1 and returned the feedback to the server 1212, but also one or more additional servers 1250-(n+1) that are associated with new end users that did not previously receive the baseline model 1270-1.

Thereafter, any of the servers 1250-1, 1250-2 . . . 1250-n, 1250-(n+1) may further train the baseline model 1270-2 based on the raw data captured by sensors 1260-1, 1260-2 . . . 1260-n, 1260-(n+1) during the performance of the task. The servers 1250-1, 1250-2 . . . 1250-n, 1250-(n+1) may also calculate differences between the baseline model 1270-2, or $BM_2$, and updated or revised versions of the baseline model $M_1$, $M_2$ . . . $M_n$ that were respectively trained by each of the servers 1250-1, 1250-2 . . . 1250-n, 1250-(n+1) using the data captured by the sensors 1260-1, 1260-2 . . . 1260-n, 1260-(n+1), or $(BM_2-M_1)_2$, $(BM_2-M_2)_2$ . . . $(BM_2-M_n)_2$, $(BM_2-M_{n+1})_2$. The servers 1250-1, 1250-2 . . . 1250-n, 1250-($n$+1) may then encrypt the respectively calculated differences $(BM_2-M_1)_2$, $(BM_2-M_2)_2$ ... $(BM_2-M_n)_2$, $(BM_2-M_{n+1})_2$ and transfer the encrypted differences $[(BM_1-M_1)]_2$, $[(BM_2-M_2)_2]$ ... $[(BM_2-M_n)_2]$, $[(BM_2-M_{n+1})_2]$ between one another, e.g., over the network 1290.

One or more of the servers 1250-1, 1250-2 ... 1250-$n$, 1250-($n$+1) returns feedback including the sequentially averaged encrypted differences $[(BM_1-M_1)]_2$, $[(BM_2-M_2)_2]$ ... $[(BM_2-M_n)_2]$, $[(BM_2-M_{n+1})_2]$ to the server 1212, for any number of iterations in accordance with the present disclosure. Alternatively, or additionally, the feedback may include any other qualitative or quantitative information regarding the effectiveness of the baseline model 1270-2 during the performance of the task by each of the respective end users.

As is discussed above, an artificial intelligence solution may utilize one or more relevant sets of rules for processing data in tandem with a trained machine learning model. Where a desired outcome may be determined most efficiently for a given data point according to one or more rules, the relevant rules may be applied, thereby reducing the amount of processing power required to arrive at the desired outcome, and freeing machine learning resources to evaluate other data points. Where none of the rules are applicable, however, the data point may be provided to the model as an input, and an outcome or decision may be determined based on an output received from the model.

Figure 13:
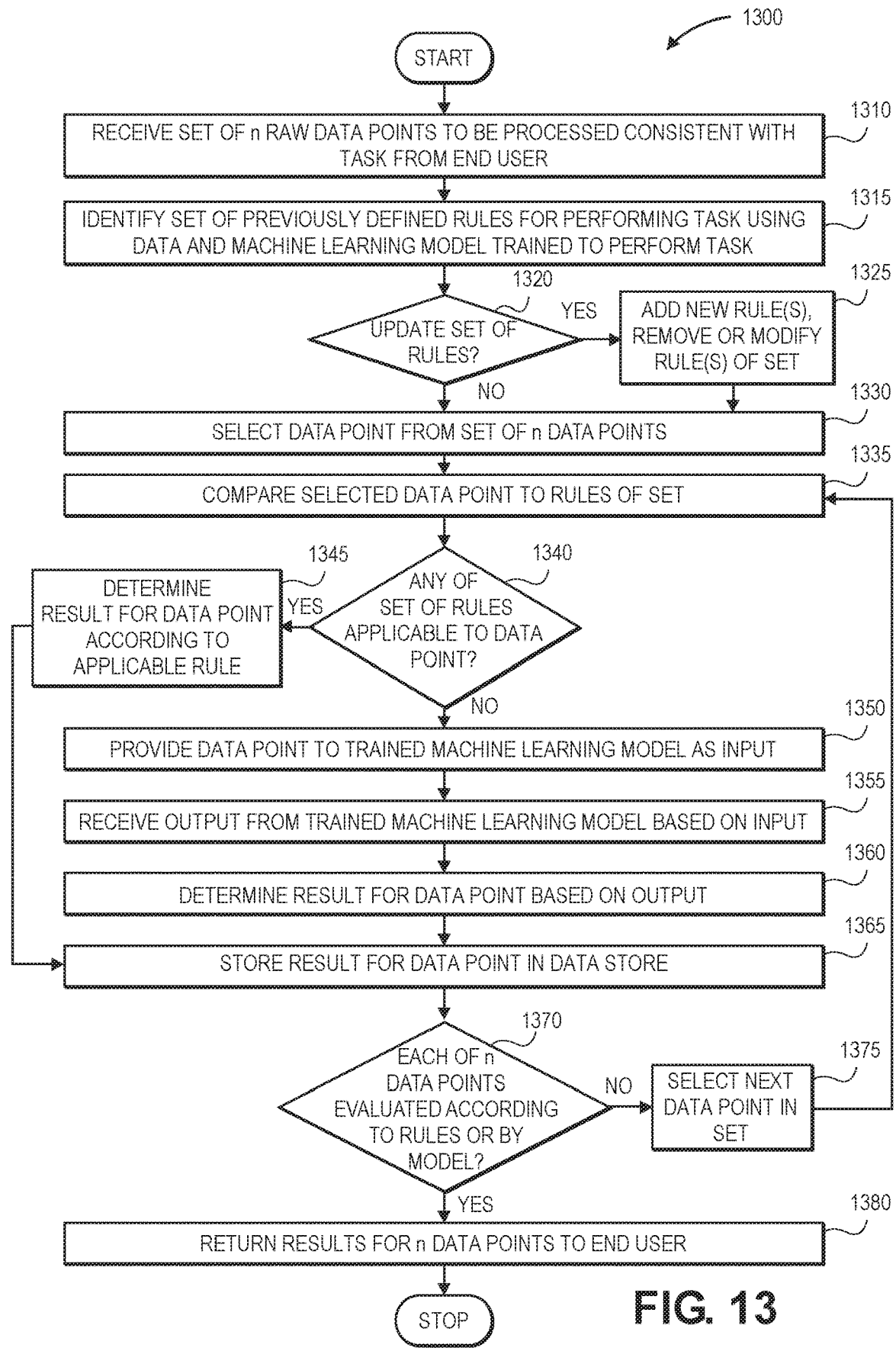
FIG. 13 is a flow chart of one process in accordance with embodiments of the present disclosure.

Referring to FIG. 13, a flow chart one process in accordance with embodiments of the present disclosure is shown. At box 1310, a set of n raw data points to be processed consistent with the performance of a task is received from an end user. The raw data points may be any data that is required for the performance of a given task, such as a set of images, a set of acoustic data, or any other data. Additionally, the task may be any number of computer-based tasks such as computer vision, anomaly detection, voice recognition or natural language processing that are to be performed by or on behalf of the end user, which may be any entity operating or existing in any industry or field. In some embodiments, sets of raw data points may be received from any number of end users.

At box 1315, a set of previously defined rules for performing the task using the n data points and a machine learning model that is trained to perform the task is identified. The set may have been previously derived by the end user, by one or more other end users, or by an artificial intelligence engine or another entity, to generate outcomes associated with the task where data points are consistent with one or more of the rules. For example, the rules set may be used to designate one outcome for a data point where a value of the data point exceeds a predetermined threshold, or to calculate another outcome for a data point according to a predetermined equation or formula. Any type or form of rule for processing data of any type or form (e.g., images, acoustic data, or any other data) may be included in the set of rules.

At box 1320, whether the set of rules requires updating may be determined. For example, where the set of rules was generated for one or more tasks in general, the rules may be updated (e.g., modified, augmented or altered in any way) to account for one or more attributes of the specific task to be performed, or based on one or more attributes of the set of data points received from the end users. Alternatively, the set of rules may require updating on any other basis. If the rules require updating, then the process advances to box 1325, where one or more new rules are added to the set, or one or more existing rules of the set are removed or modified accordingly.

If the rules do not require updating, or after the rules have been updated at box 1325, the process advances to box 1330, where a data point is selected from the n data points received from the end user at box 1310. The data point may be selected according to any criterion, including at random, according to a serial order, based on sizes or values of one or more of the n data points, or on any other basis.

At box 1335, the selected data point is compared to the rules of the set, e.g., by a rules-based firewall or other system or module. For example, the rules may identify one or more actions that must be taken where a data point has a specific value, or a value falling within a specific range, the selected data point is compared to the specific value or the specific range. The types of actions that may be required by a rule, or may be performed when a data point satisfies the rule, are not limited.

At box 1340, whether any of the rules of the set is applicable to the data point is determined. If one or more of the rules is applicable to the data point, then the process advances to box 1345, where a result is determined for the data point according to the one or more rules.

If none of the rules is applicable to the data point, however, then the process advances to box 1350, where the data point is provided to the trained machine learning model as an input. At box 1355, an output is received from the trained machine learning system based on the input, and at box 1360, a result for the data point is determined based on the output. At box 1365, the result for the data point is stored in at least one data store.

At box 1370, whether each of the n data points has been evaluated according to the rules or by the model is determined. If each of the n data points has not yet been evaluated, then the process advances to box 1375, where a next data point in the set is selected, before returning to box 1335, where the selected data point is compared to the rules of the set. If each of the n data points has been evaluated, then the process advances to box 1380, where the results for each of the n data points is returned to the end user, and the process ends.

Figure 14:
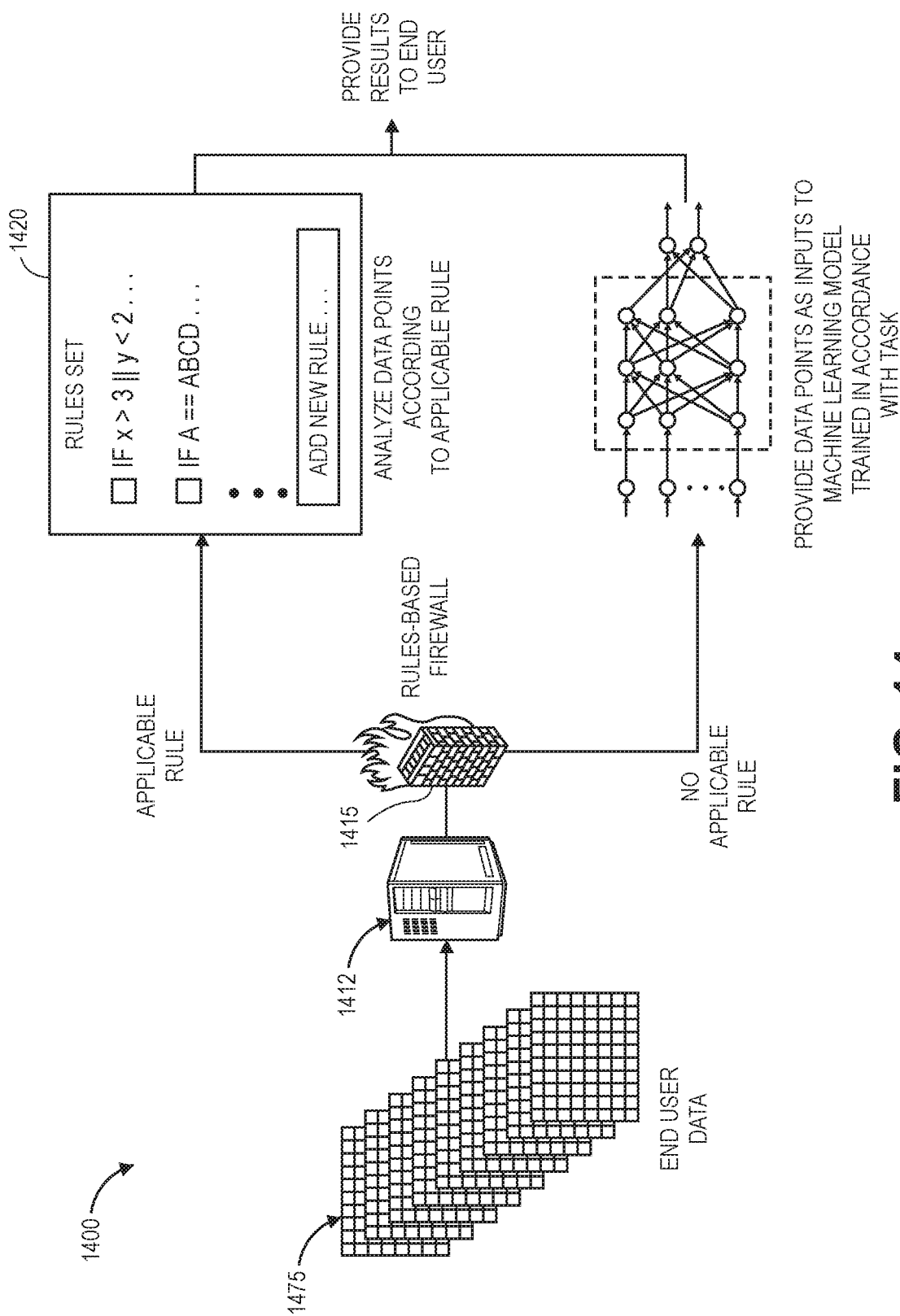
FIG. 14 is a view of aspects of one system in accordance with embodiments of the present disclosure.

Referring to FIG. 14, views of aspects of one system in accordance with embodiments of the present disclosure are shown. Except where otherwise noted, reference numerals preceded by the number "14" shown in FIG. 14 indicate components or features that are similar to components or features having reference numerals preceded by the number "12" shown in FIGS. 12A through 12E, by the number "10" shown in FIGS. 10A through 10D, by the number "8" shown in FIG. 8, by the number "6" shown in FIGS. 6A through 6D, by the number "4" shown in FIGS. 4A through 4C, by the number "2" shown in the block diagram of FIG. 2A or 2B or by the number "1" shown in FIGS. 1A through 1G.

As is shown in FIG. 14, a system 1400 includes a server 1412 or other computer device or machine. Where the server 1412 receives data 1475 from an end user that is to be processed for the performance of one or more tasks, the server 1412 may compare the various data points of the data 1475 to a rules-based firewall that determines whether any rules of a previously established set of rules 1420 is applicable to any of the data points. If any rules apply to one or more of the data points, results may be identified for such data points according to such rules, and returned to the end user that provided the data 1475. If none of the rules applies to a given data point of the data 1475, the data point may be provided to a machine learning model 1470 that is trained to perform the task as an input, A result associated with the data point may be determined based on an output received from the model 1470, and returned to the end user that provided the data 1475.

Some examples of embodiments of the present disclosure may be described in view of the following clauses.

Clause 1. A system comprising an artificial intelligence engine; and a plurality of servers, wherein each of the plurality of servers is associated with one of a plurality of end users, wherein the artificial intelligence engine is in communication with each of the plurality of servers over at least one network, and wherein the artificial intelligence engine includes one or more computer processors configured to at least:

receive a set of data associated with a task, wherein the set of data comprises a first plurality of images and a first plurality of annotations, and wherein each of the first plurality of annotations identifies at least a portion of an object of a type relating to the task depicted in one of the first plurality of images; parse the set of data into at least a training subset, wherein the training subset comprises a second plurality of images and a second plurality of annotations, wherein each of the second plurality of images is one of the first plurality of images, and wherein each of the second plurality of annotations is one of the first plurality of annotations; train a first machine learning model to detect at least one object of the type in images based at least in part on the training subset, wherein the first machine learning model is trained using at least the second plurality of images as training inputs and at least the second plurality of annotations as training outputs; transmit code for operating the first machine learning model to at least some of the plurality of servers over the at least one network; receive, from a first server over the at least one network, feedback regarding effectiveness of the first machine learning model in the performance of the task, wherein the first server is one of the at least some of the plurality of servers; train a second machine learning model to detect the at least one object of the type in images based at least in part on the feedback and the first machine learning model; and transmit code for operating the second machine learning model to at least a second server over the at least one network, wherein the second server is one of the plurality of servers.

Clause 2. The system of clause 1, wherein the first machine learning model is an artificial neural network comprising an input layer having a first plurality of neurons, at least one hidden layer having at least a second plurality of neurons, and an output layer having a third plurality of neurons, wherein a first connection between at least one of the first plurality of neurons and at least one of the second plurality of neurons in the first machine learning model has a first synaptic weight, wherein a second connection between at least one of the second plurality of neurons and at least one of the third plurality of neurons in the first machine learning model has a second synaptic weight, and wherein training the first machine learning model to detect the at least one object of the type in the images based at least in part on the training subset comprises: selecting at least one of the first synaptic weight for the first connection or the second synaptic weight for the second connection based at least in part on at least one of the second plurality of images and at least one of the second plurality of annotations.

Clause 3. The system of clause 2, wherein training the second machine learning model to detect the at least one object of the type in the images based at least in part on the feedback and the first machine learning model comprises selecting at least one of a third synaptic weight for the first connection or a fourth synaptic weight for the second connection based at least in part on the feedback.

Clause 4. A computer-implemented method comprising receiving first data associated with a computer-based task to be performed by a plurality of end users, wherein at least a first portion of the first data is received from a first computer device associated with at least a first end user of the plurality of end users; training a first machine learning model to perform the computer-based task based at least in part on at least some of the first data; distributing first code for operating the first machine learning model to a plurality of computer devices at a first time, wherein each of the plurality of computer devices is associated with one of the plurality of end users, and wherein the first computer device is one of the plurality of computer devices; receiving feedback regarding effectiveness of the first machine learning model in performing the computer-based task from at least one of the plurality of end users at a second time, wherein the second time follows the first time; training a second machine learning model to perform the computer-based task based at least in part on the feedback and the first machine learning model; and distributing second code for operating the second machine learning model to at least one of the plurality of computer devices at a third time, wherein the third time follows the second time.

Clause 5. The computer-implemented method of clause 4, wherein distributing the second code for operating the second machine learning model to at least one of the plurality of computer devices comprises transmitting the second code for operating the second machine learning model to at least the first computer device, wherein the first code defines a first matrix of weights associated with the first machine learning model, wherein the second code defines a second matrix of weights associated with the second machine learning model, and wherein at least one of the second matrix of weights is different from at least one of the first matrix of weights.

Clause 6. The computer-implemented method of clause 4, further comprising distributing third code for applying a rules set to data associated with the computer-based task.

Clause 7. The computer-implemented method of clause 4, wherein the computer-based task comprises detecting anomalies in data, wherein the first data comprises a first plurality of data points and a first plurality of annotations, wherein at least some of the first plurality of data points are anomalous, and wherein each of the first plurality of annotations indicates whether one of the first plurality of data points is anomalous or not anomalous.

Clause 8. The computer-implemented method of clause 4, wherein the computer-based task comprises detecting objects in imaging data, wherein the first data comprises a first plurality of images and a first plurality of annotations, wherein each of the first plurality of images depicts at least a portion of at least one object, and wherein each of the first plurality of annotations identifies a portion of one of the first plurality of images that depicts the portion of the at least one object.

Clause 9. The computer-implemented method of clause 4, wherein the computer-based task comprises natural language processing, wherein the first data comprises a first plurality of acoustic signals and a first plurality of annotations, wherein each of the first plurality of acoustic signals includes at least one spoken word, and wherein each of the first plurality of annotations is a label of one of the at least one spoken word or a part of speech of the at least one spoken word in one of the first plurality of acoustic signals.

Clause 10. The computer-implemented method of clause 4, wherein the first machine learning model is an artificial neural network comprising an input layer having a first plurality of neurons, at least one hidden layer having at least a second plurality of neurons, and an output layer having a third plurality of neurons, wherein a first connection between at least one of the first plurality of neurons and at least one of the second plurality of neurons has a first synaptic weight, wherein a second connection between at least one of the second plurality of neurons and at least one of the third plurality of neurons has a second synaptic weight, and wherein training the first machine learning model to perform the computer-based task based at least in part on at least some of the first data comprises selecting at least one of the first synaptic weight for the first connection or the second synaptic weight for the second connection based at least in part on at least a first data point of the first data and at least a first annotation associated with the first data point.

Clause 11. The computer-implemented method of clause 10, further comprising splitting the first data into a first set and a second set, wherein the first set comprises a first plurality of data points and a first plurality of annotations, wherein the second set comprises a second plurality of data points and a second plurality of annotations, and wherein training the first machine learning model to perform the computer-based task based at least in part on at least some of the first data comprises training the first machine learning model to perform the computer-based task based at least in part on the first set, and testing the training of the first machine learning model based at least in part on the second set.

Clause 12. The computer-implemented method of clause 4, wherein training the second machine learning model to perform the computer-based task based at least in part on the feedback and the first machine learning model comprises selecting at least one of a third synaptic weight for the first connection or a fourth synaptic weight for the second connection based at least in part on the feedback, wherein the second machine learning model comprises the input layer, the at least one hidden layer and the output layer, wherein the first connection has the third synaptic weight, and wherein the second connection has the fourth synaptic weight.

Clause 13. The computer-implemented method of clause 4, wherein the first machine learning model is one of an artificial neural network, a deep learning system, a support vector machine, a nearest neighbor analysis, a factorization method, a K-means clustering technique, a similarity measure, a latent Dirichlet allocation, a decision tree or a latent semantic analysis.

Clause 14. The computer-implemented method of clause 4, wherein at least a second portion of the first data is received from at least one of a second computer device associated with a second end user of the plurality of end users; or a third computer device associated with an open source.

Clause 15. The computer-implemented method of clause 4, wherein the feedback comprises information regarding a difference between the first machine learning model and a third machine learning model, and wherein the third machine model is trained by the first end user to perform the computer-based task based at least in part on second data captured by at least the first end user.

Clause 16. The computer-implemented method of clause 4, wherein the feedback comprises information regarding a difference between a first result generated by the first machine learning model in response to a first data point and a second result identified by a human operator for the first data point.

Clause 17. The computer-implemented method of clause 4, wherein receiving the feedback regarding the effectiveness of the first machine learning model in performing the computer-based task comprises receiving a plurality of differences from the plurality of computer devices over a computer network, wherein each of the plurality of differences is a difference between the first machine learning model and a machine learning model trained by one of the computer devices based at least in part on the first trained machine learning model and data obtained by the one of the computer devices that is homomorphically encrypted by the one of the computer devices, and wherein the plurality of differences are sequentially averaged.

Clause 18. The computer-implemented method of clause 4, wherein receiving the first data associated with the computer-based task comprises providing at least the first portion of the first data as a first input to at least one authentication function at a third time, wherein the third time precedes the first time; determining a first value corresponding to at least the first portion of the first data based at least in part on a first output received from the at least one authentication function in response to the first input; and storing the first value in association with the first data in at least one data store, and wherein training the first machine learning model to perform the computer-based task based at least in part on the at least some of the first data comprises retrieving at least the first portion of the first data from the at least one data store; providing at least the first portion of the first data as a second input to the at least one authentication function at a fourth time, wherein the fourth time precedes the first time and follows the third time; determining a second value corresponding to at least the first portion of the first data based at least in part on a second output received from the at least one authentication function in response to the second input; and determining that the second value is consistent with the first value, wherein the first machine learning model is trained to perform the computer-based task in response to determining that the second value is consistent with the first value.

Clause 19. The computer-implemented method of clause 4, wherein receiving the first data comprises causing a display of a first user interface on a computer display associated with the first computer device, wherein the first user interface indicates that at least the first portion of the first data has been transferred to an artificial intelligence engine, wherein training the first machine learning model to perform the computer-based task comprises causing a display of a second user interface on the computer display associated with the first computer device, wherein the second user interface indicates that the first machine learning model is being trained based at least in part on at least the first portion of the first data, wherein the method further comprises causing a display of a third user interface on the computer display associated with the first computer device, wherein the third user interface includes information regarding the effectiveness of the first machine learning model in performing the computer-based task on the first computer device.

Clause 20. A computer-implemented method comprising training a first machine learning model to perform a task, wherein the first machine learning model is trained based on a first set of training data, and wherein the task is to be performed using data obtained by each of a plurality of end users; distributing code for operating the first machine learning model to a first plurality of computer devices, wherein each of the first plurality of computer devices is associated with one of the plurality of end users, and wherein a first computer device of the first plurality of computer devices is associated with a first end user of the plurality of end users; receiving, from the first computer device, at least first feedback regarding the effectiveness of the first training model, wherein the first feedback is determined based on performance of the task using first operational data obtained by at least the first end user; training a second machine learning model to perform the task, wherein the second machine learning model is trained based at least in part on the first machine learning model and the first feedback; and distributing code for operating the second machine learning model to at least a second computer device, wherein the second computer device is associated with a second end user of the plurality of end users.

Clause 21. The computer-implemented method of clause 20, wherein the first feedback comprises information regarding a difference between the first machine learning model and a third machine learning model, and wherein the third machine model is trained by the first end user to perform the computer-based task based at least in part on the first operational data obtained by at least the first end user.

Clause 22. A system comprising an artificial intelligence engine; and a plurality of servers, wherein each of the plurality of servers is associated with one of a plurality of end users, wherein the artificial intelligence engine is in communication with each of the plurality of servers over at least one network, and wherein the artificial intelligence engine includes one or more computer processors configured to at least receive at least a first plurality of images from at least one of the plurality of end users; identify a first plurality of annotations, wherein each of the first plurality of annotations identifies at least a portion of one of the first plurality of images that depicts at least a portion of an object of a type; modify at least a second plurality of images, wherein each of the second plurality of images is one of the first plurality of images; define a set of training inputs, wherein the set of training inputs comprises: at least some of the second plurality of images; and a third plurality of images, wherein each of the third plurality of images is one of the first plurality of images that and not one of the second plurality of images; define a set of training outputs, wherein the set of training outputs comprises a second plurality of annotations, each of the second plurality of annotations identifies at least a portion of one of the second plurality of images that depicts at least the portion of the object of the type; and a third plurality of annotations, each of the third plurality of annotations identifies at least a portion of one of the third plurality of images that depicts at least the portion of the object of the type; train a machine learning tool to detect at least a portion of the object of the type within an image using the training inputs and the training outputs; and distribute code for operating the machine learning tool to at least some of the plurality of servers.

Clause 23. The system of clause 22, wherein modifying at least the second plurality of images comprises at least one of rotating one of the second plurality of images by a predetermined angle; zooming the one of the second plurality of images by a predetermined ratio; cropping at least a portion of the one of the second plurality of images, wherein the cropped portion depicts at least the portion of the object of the type; or varying a contrast of the portion of the one of the second plurality of images by a predetermined amount.

Clause 24. The system of clause 22, wherein each of the plurality of end users is associated with one of a hospital, a university, a research laboratory, a military facility, a financial institution, a manufacturing facility or a retail establishment.

Clause 25. A computer-implemented method comprising identifying a first plurality of data points, wherein each of the first plurality of data points is associated with performance of a computer-based task by at least one computer device; identifying a first plurality of annotations, wherein each of the first plurality of annotations identifies at least a portion of one of the first plurality of data points that is relevant to the performance of the computer-based task; modifying at least some of the first plurality of data points, wherein each of the modified first plurality of data points is relevant to the performance of the computer-based task; defining a training set, wherein the training set comprises a second plurality of data points, wherein each of the second plurality of data points is a modified one of the first plurality of data points; and a second plurality of annotations, wherein each of the second plurality of annotations is one of the first plurality of annotations that identifies at least the portion of one of the second plurality of data points that is relevant to the performance of the computer-based task; training a first machine learning model to perform the computer-based task based at least in part on the training set; and distributing code for operating the first machine learning model to a plurality of end users over at least one computer network.

Clause 26. The computer-implemented method of clause 25, wherein modifying the at least some of the first plurality of data points comprises rotating, zooming, cropping or filtering each of the at least some of the first plurality of data points.

Clause 27. The computer-implemented method of clause 25, wherein the computer-based task comprises detecting objects in imaging data, wherein each of the first plurality of data points comprises an image, wherein each of the images depicts at least a portion of at least one object, and wherein each of the first plurality of annotations identifies a portion of one of the images that depicts the portion of the at least one object.

Clause 28. The computer-implemented method of clause 25, wherein the computer-based task comprises natural language processing, wherein each of the first plurality of data points comprises an acoustic signal, wherein each of the acoustic signals includes at least one spoken word, and wherein each of the first plurality of annotations is a label of one of the at least one spoken word or a part of speech of the at least one spoken word in one of the acoustic signals.

Clause 29. The computer-implemented method of clause 25, wherein the computer-based task comprises detecting anomalies in data, wherein at least some of the first plurality of data points are anomalous, and wherein each of the first plurality of annotations indicates whether one of the first plurality of data points is anomalous or not anomalous.

Clause 30. The computer-implemented method of clause 25, wherein the first machine learning model is an artificial neural network comprising an input layer having a first plurality of neurons, at least one hidden layer having at least a second plurality of neurons, and an output layer having a third plurality of neurons, wherein a first connection between at least one of the first plurality of neurons and at least one of the second plurality of neurons has a first synaptic weight in the first machine learning model, wherein a second connection between at least one of the second plurality of neurons and at least one of the third plurality of neurons has a second synaptic weight in the first machine learning model, and wherein training the first machine learning model to perform the computer-based task based at least in part on the training set comprises selecting at least one of the first synaptic weight for the first connection or the second synaptic weight for the second connection based at least in part on at least some of the second plurality of data points and at least some of the second plurality of annotations.

Clause 31. The computer-implemented method of clause 30, further comprising receiving feedback regarding effectiveness of the first machine learning model in performing the computer-based task from at least one of the plurality of end users; selecting at least one of a third synaptic weight for the first connection or a fourth synaptic weight for the second connection based at least in part on the feedback; generating code for operating a second machine learning model comprising the input layer, the at least one hidden layer and the output layer, wherein the first connection has the third synaptic weight in the second machine learning model and wherein the second connection has the fourth synaptic weight in the second machine learning model; and distributing the code for operating the second machine learning model to at least some of the plurality of end users over the at least one computer network.

Clause 32. The computer-implemented method of clause 31, wherein the feedback comprises information regarding a difference between the first machine learning model and a third machine learning model, and wherein the third machine model is trained by the first end user to perform the computer-based task based at least in part on second data captured by at least the first end user.

Clause 33. The computer-implemented method of clause 31, wherein the feedback comprises information regarding a difference between at least a first result generated by the first machine learning model in response to at least one of a third plurality of data points and a second result identified by a human operator for the at least one of the third plurality of data points.

Clause 34. The computer-implemented method of clause 31, wherein receiving the feedback regarding the effectiveness of the first machine learning model in performing the computer-based task comprises receiving a plurality of differences from a plurality of computer devices over a computer network, wherein each of the plurality of computer devices is associated with one of the plurality of end users, wherein each of the plurality of differences is a difference between the first machine learning model and a machine learning model trained by one of the computer devices based at least in part on the first trained machine learning model and data obtained by the one of the computer devices that is homomorphically encrypted by the one of the computer devices, and wherein the plurality of differences are sequentially averaged.

Clause 35. The computer-implemented method of clause 25, further comprising splitting the first data into the training set and a test set, wherein the test set comprises a third plurality of data points and a third plurality of annotations, and testing the training of the first machine learning model based at least in part on the test set.

Clause 36. The computer-implemented method of clause 25, wherein the first machine learning model is one of an artificial neural network, a deep learning system, a support vector machine, a nearest neighbor analysis, a factorization method, a K-means clustering technique, a similarity measure, a latent Dirichlet allocation, a decision tree or a latent semantic analysis.

Clause 37. The computer-implemented method of clause 25, wherein at least some of the first plurality of data points are received from at least one of a computer device associated with an end user of the plurality of end users; or a computer device associated with an open source.

Clause 38. The computer-implemented method of clause 25, wherein receiving the first data associated with the computer-based task comprises providing at least the first plurality of data points as a first input to at least one authentication function; determining a first value corresponding to at least the first plurality of data points based at least in part on a first output received from the at least one authentication function in response to the first input; and storing the first value in association with the first plurality of data points in at least one data store, and wherein modifying the at least some of the first plurality of data points comprises retrieving the at least some of the first plurality of data points from the at least one data store; providing the at least some of the first plurality of data points as a second input to the at least one authentication function; determining a second value corresponding to the at least some of the first plurality of data points based at least in part on a second output received from the at least one authentication function in response to the second input; and determining that the second value is consistent with the first value, wherein the at least some of the first plurality of data points are modified in response to determining that the second value is consistent with the first value.

Clause 39. The computer-implemented method of clause 25, wherein modifying the at least some of the first plurality of data points comprises causing a display of a first user interface on a computer display associated with a first computer device associated with a first end user, wherein the first user interface indicates that the at least some of the first plurality of data points are being modified by an artificial intelligence engine, wherein defining the training set comprises causing a display of a second user interface on the computer display associated with the first computer device, wherein the second user interface indicates that the training set has been defined to include the second plurality of data points and the second plurality of annotations, and wherein the method further comprises causing a display of a third user interface on the computer display associated with the first computer device, wherein the third user interface includes information regarding effectiveness of the first machine learning model in performing the computer-based task on the first computer device.

Clause 40. A computer-implemented method comprising receiving, by an artificial intelligence engine over a computer network, a plurality of data points, wherein each of the data points is received from one of a plurality of end users engaged in performance of a computer-based task, and wherein each of the data points relates to the computer-based task; receiving, by the artificial intelligence engine, a plurality of annotations, wherein each of the annotations identifies a portion of a corresponding one of the data points that is relevant to the computer-based task; executing, by the artificial intelligence engine, a modification to at least some of the plurality of data points; defining a training set of training inputs and training outputs, wherein the training inputs comprises each of the plurality of data points and each of the modified at least some of the plurality of data points, and wherein the training outputs comprises the plurality of annotations; training a machine learning model to perform the computer-based task based at least in part on the training inputs and the training outputs; generating code for operating the machine learning model, wherein the code defines a matrix of weights associated with the machine learning model, and wherein at least one of the matrix of weights is defined based at least in part on the modified at least some of the plurality of data points; and distributing the code for operating the machine learning model to each of the plurality of end users over a computer network.

Clause 41. The computer-implemented method of clause 40, wherein each of the first plurality of data points is one of imaging data or acoustic data.

Clause 42. A system comprising an artificial intelligence engine; and a plurality of servers, wherein each of the plurality of servers is associated with one of a plurality of end users, wherein the artificial intelligence engine is in communication with each of the plurality of servers over at least one network, and wherein the artificial intelligence engine includes one or more computer processors configured to at least receive, from each of the plurality of servers, a set of images, wherein each of the images of each of the sets depicts at least a portion of object of a type associated with performance of a task; receive, from each of the plurality of servers, a set of annotations from each of the plurality of servers, wherein each of the annotations of each of the sets identifies a portion of one of the images depicting at least the portion of the object of the type; execute an authentication function on a first set of data at a first time, wherein the first set of data comprises a set of images received from a first end user of the plurality of end users and a set of annotations received from the first end user; identifying a first value based at least in part on the execution of the authentication function on the first set of data at the first time; store the first set of data in at least one data store associated with the artificial intelligence engine; receive a request for a machine learning model trained to detect at least a portion of the object within an image, wherein the request is received from at least one of the end users; retrieve at least the first set of data from the at least one data store; execute the authentication function on at least the first set of data at a second time; identify a second value based at least in part on the execution of the authentication function on the first set of data at the second time; determine whether the second value is consistent with the first value; and in response to determining that the second value is consistent with the first value, generate a training set comprising training inputs and training outputs, wherein the training inputs comprise the first set of data and the training outputs comprise the first set of annotations; train the machine learning model based at least in part on the training set; and distribute code for executing the trained machine learning model to the at least one of the plurality of end users.

Clause 43. The system of clause 42, wherein the one or more computer processors are further configured to at least, in response to determining that the second value is inconsistent with the first value, investigate a cause of the inconsistency.

Clause 44. A computer-implemented method comprising receiving a first set of data points from a first end user over at least one computer network, wherein each of the first set of data points is associated with performance of a computer-based task; receiving a first set of annotations from the first end user over the at least one computer network, wherein each of the first set of annotations identifies a portion of one of the first set of data points that is relevant to the performance of the computer-based task; determining that each of the first set of data points and the first set of annotations is authentic at a first time; in response to determining that each of the first set of data points and the first set of annotations is authentic at the first time, storing the first set of data points in association with the first set of annotations in at least one data store; receiving a request for a machine learning model to perform the computer-based task from at least a second end user over the at least one computer network; determining whether each of the first set of data points and the first set of annotations is authentic at a second time; in response to determining that each of the first set of data points and the first set of annotations is authentic at the second time, retrieving the first set of data points and the first set of annotations from the at least one data store; training a first machine learning model to perform the computer-based task based at least in part on the first set of data points and the first set of annotations; distributing first code for executing the first machine learning model to at least the second end user over the at least one computer network.

Clause 45. The computer-implemented method of clause 44, wherein determining that each of the first set of data points and the first set of annotations is authentic at the first time comprises executing an authentication function with at least the first set of data points and the first set of annotations as a first input; receiving a first output from the authentication function in response to the first input; and determining a first value for the first set of data points and the first set of annotations based at least in part on the first output, and wherein determining whether each of the first set of data points and the first set of annotations is authentic at a second time comprises executing the authentication function with at least the first set of data points and the first set of annotations as a second input; receiving a second output from the authentication function in response to the second input; determining a second value for the first set of data points and the first set of annotations based at least in part on the second output; and determining that the first value is consistent with the second value, wherein that each of the first set of data points and the first set of annotations is determined to be authentic at the second time in response to determining that the first value is consistent with the second value.

Clause 46. The computer-implemented method of clause 45, wherein the authentication function is a hash function, and wherein the first value is a 128-bit value representing each of the first set of data points and the first set of annotations generated in response to the first input, wherein the second value is a 128-bit value representing each of the first set of data points and the first set of annotations generated in response to the second input.

Clause 47. The computer-implemented method of clause 44, wherein the computer-based task comprises at least one of detecting anomalies in data, detecting objects in imaging data, or natural language processing.

Clause 48. The computer-implemented method of clause 44, wherein each of the first end user and the second end user is associated with one of a hospital, a university, a research laboratory, a military facility, a financial institution, a manufacturing facility or a retail establishment.

Clause 49. The computer-implemented method of clause 44, wherein the first machine learning model is an artificial neural network comprising an input layer having a first plurality of neurons, at least one hidden layer having at least a second plurality of neurons, and an output layer having a third plurality of neurons, wherein a first connection between at least one of the first plurality of neurons and at least one of the second plurality of neurons has a first synaptic weight in the first machine learning model, wherein a second connection between at least one of the second plurality of neurons and at least one of the third plurality of neurons has a second synaptic weight in the first machine learning model, and wherein training the first machine learning model to perform the computer-based task based at least in part on the first set of data points and the first set of annotations comprises selecting at least one of the first synaptic weight for the first connection or the second synaptic weight for the second connection based at least in part on at least a first data point of the first data and at least a first annotation associated with the first data point.

Clause 50. The computer-implemented method of clause 49, further comprising receiving feedback regarding effectiveness of the first machine learning model in performing the computer-based task from at least the second end user; selecting at least one of a third synaptic weight for the first connection or a fourth synaptic weight for the second connection based at least in part on the feedback; generating code for operating a second machine learning model comprising the input layer, the at least one hidden layer and the output layer, wherein the first connection has the third synaptic weight in the second machine learning model and wherein the second connection has the fourth synaptic weight in the second machine learning model; and distributing the code for operating the second machine learning model to at least the second end user over the at least one computer network.

Clause 51. The computer-implemented method of clause 44, wherein the feedback comprises information regarding a difference between the first machine learning model and a third machine learning model, and wherein the third machine learning model is trained by the second end user to perform the computer-based task based at least in part on second data captured by at least the second end user.

Clause 52. The computer-implemented method of clause 44, wherein the feedback comprises information regarding a difference between a first result generated by the first machine learning model in response to a first data point and a second result identified by a human operator for the first data point.

Clause 53. The computer-implemented method of clause 44, wherein receiving the feedback regarding the effectiveness of the first machine learning model in performing the computer-based task comprises receiving a plurality of differences from a plurality of computer devices over a computer network, wherein each of the plurality of computer devices is associated with one of a plurality of end users including the first end user and the second end user, wherein each of the plurality of differences is a difference between the first machine learning model and a machine learning model trained by one of the computer devices based at least in part on the first trained machine learning model and data obtained by the one of the computer devices that is homomorphically encrypted by the one of the computer devices, and wherein the plurality of differences are sequentially averaged.

Clause 54. The computer-implemented method of clause 44, wherein the first machine learning model is one of an artificial neural network, a deep learning system, a support vector machine, a nearest neighbor analysis, a factorization method, a K-means clustering technique, a similarity measure, a latent Dirichlet allocation, a decision tree or a latent semantic analysis.

Clause 55. The computer-implemented method of clause 44, further comprising receiving a second set of data points from a third end user over the at least one network, wherein each of the second set of data points is associated with the performance of the computer-based task; receive a second set of annotations from the third end user over the at least one network, wherein each of the second set of annotations identifies a portion of one of the second set of data points that is relevant to the performance of the computer-based task; and determining that each of the second set of data points and the second set of annotations is authentic at a third time, wherein the first machine learning model is trained based at least in part on the first set of data points, the second set of data points, the first set of annotations and the second set of annotations in response to determining that each of the second set of data points and the second set of annotations is authentic at the third time.

Clause 56. The computer-implemented method of clause 44, wherein the first code defines a first matrix of weights associated with the first machine learning model.

Clause 57. The computer-implemented method of clause 44, wherein receiving the first data comprises causing a display of a first user interface on a computer display associated with a computer device associated with the second end user, wherein the first user interface indicates that at least the first set of data points is authentic, wherein training the first machine learning model to perform the computer-based task comprises causing a display of a second user interface on the computer display associated with the computer device, wherein the second user interface indicates that the first machine learning model is being trained based at least in part on at least the first portion of the first data, and wherein the method further comprises causing a display of a third user interface on the computer display associated with the computer device, wherein the third user interface indicates that the first code is distributed to the computer device.

Clause 58. The computer-implemented method of clause 44, further comprising in response to determining that at least one of the first set of data points or at least one of the first set of annotations is not authentic at the second time, investigate a cause of the inauthenticity.

Clause 59. A computer-implemented method comprising receiving, from each of a plurality of end users, a set of data points and a set of annotations, wherein each of the sets of data points relates to a task, and wherein each of the annotations of each of the sets identifies a portion of one of the data points of one of the sets that is relevant to the task; executing, on each of the sets of data points and each of the sets of annotations, an authentication function; determining, for each of the sets of data points and each of the sets of annotations, a value based on an output of the authentication function; storing each of the sets of data points and each of the sets of annotations in association with the value determined based on the output of the authentication function for the respective set of data points and the corresponding set of annotations in at least one data store; receiving a request for a machine learning model trained to execute the task; retrieving at least a first set of data points and a first set of annotations from the at least one data store, wherein each of the first set of data points and the first set of annotations was received from a first end user of the plurality of end users; retrieving a first value determined based on the output of the authentication function for the first set of data points and the first set of annotations; upon retrieving the first set of data points and the first set of annotations from the at least on data store, executing the authentication function on the first set of data points and the first set of annotations; determining a second value based on an output of the authentication function; determining that the second value is consistent with the first value; in response to determining that the second value is consistent with the first value, training a first machine learning model to perform the task based at least in part on the first set of data points and the first set of annotations; and distributing code for executing the first machine learning model to at least a second end user of the plurality of end users over the at least one network.

Clause 60. The computer-implemented method of clause 59, wherein each of the first end user and the second end user is associated with one of a hospital, a university, a research laboratory, a military facility, a financial institution, a manufacturing facility or a retail establishment.

Clause 61. A system comprising an artificial intelligence engine; and a plurality of servers, wherein each of the plurality of servers is associated with one of a plurality of end users, wherein the artificial intelligence engine is in communication with each of the plurality of servers over at least one network, and wherein the artificial intelligence engine includes one or more computer processors configured to at least receive a plurality of sets of images and a plurality of sets of annotations from the plurality of end users, wherein each of the sets of images is relevant to a task performed by each of the plurality of end users, and wherein each of the sets of annotations corresponds to one of the sets of images; receive a request for a machine learning model configured to perform a task from at least a first end user; generate a training set of data comprising a plurality of training inputs and a plurality of training outputs, wherein the plurality of training inputs comprises at least a first set of images received from the first end user, and wherein the training outputs comprise at least a first set of annotations received from the first end user; train at least a first machine learning model to perform the task based at least in part on the training set of data, wherein the first machine learning model comprises an input layer having a first plurality of neurons, at least one hidden layer having a second plurality of neurons and an output layer having a third plurality of neurons, wherein a first connection between one of the first plurality of neurons and one of the second plurality of neurons has a first synaptic weight and wherein a second connection between one of the second plurality of neurons and one of the third plurality of neurons has a second synaptic weight determined based at least in part on the training set of data; determine that the first machine learning model is adequately trained to perform the task; and distribute code for executing the first machine learning model to at least the first end user.

Clause 62. A computer-implemented method comprising identifying a plurality of data points associated with a task, wherein each of the plurality of data points was obtained by one of a plurality of end users; identifying a plurality of annotations, wherein each of the plurality of annotations identifies a portion of one of the plurality of data points that is relevant to the task; receiving a request for a machine learning model that is trained to perform the task from a first end user, wherein the first end user is one of the plurality of end users; define a training set and a test set from the plurality of data points and the plurality of annotations, wherein the training set comprises a first portion of the plurality of data points and the first portion of the plurality of annotations, and wherein the test set comprises a second portion of the plurality of data points and the second portion of the plurality of annotations; select a type of the machine learning model based at least in part on at least one of the first portion of the plurality of data points; training a machine learning model of the type using the training set, wherein training the machine learning model comprises establishing at least a first synaptic weight of a first connection between a neuron of an input layer of the machine learning model of the type and a neuron of at least one hidden layer of the machine learning model and at least a second synaptic weight of a second connection between a neuron of the at least one hidden layer of the machine learning model and an output layer of the machine learning model of the type; and testing the machine learning model using the test set, wherein testing the machine learning model comprises providing at least one of the second portion of the plurality of data points to the machine learning model as an input and comparing an output received from the machine learning model in response to the input to a corresponding one of the second portion of the plurality of annotations; in response to determining that the machine learning model has tested satisfactorily, distributing code for operating the machine learning model to the plurality of end users.

Clause 63. A computer-implemented method comprising receiving a plurality of data points over a network, wherein each of the plurality of data points is received from one of a plurality of servers, wherein each of the plurality of servers is associated with one of a plurality of end users, and wherein each of the end users is associated with one of a hospital, a university, a research laboratory, a military facility, a financial institution, a manufacturing facility or a retail establishment; identifying annotations of the data points, wherein each of the annotations identifies at least a portion of the data point that is relevant to a computer-based task; training a machine learning model to execute the task based at least in part on the first plurality of data points and the first plurality of annotations, wherein training the machine learning model comprises establishing at least a first synaptic weight of a first connection between a neuron of an input layer of the machine learning model of the type and a neuron of at least one hidden layer of the machine learning model and at least a second synaptic weight of a second connection between a neuron of the at least one hidden layer of the machine learning model and an output layer of the machine learning model of the type; generating code for operating the machine learning model; distributing the code for operating the machine learning model to each of the plurality of end users over a computer network; receiving, from at least some of the plurality of end users, information regarding differences between the machine learning model and machine learning models trained using each of the plurality of servers based on data obtained by one of the plurality of end users; updating the machine learning model based at least in part on the differences; generating code for operating the updated machine learning model; receiving a request for the machine learning model from an end user, wherein the end users is not one of the plurality of end users to which the code for operating the machine learning model was distributed; and distributing the code for operating the updated machine learning model to the end user that is not one of the plurality of end users to which the code for operating the machine learning model was distributed and to each of the plurality of end users over the network.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

For example, although some of the embodiments disclosed herein reference the generation of artificial intelligence solutions, including the generation, training, validation, testing and use of machine learning models, in applications such as computer vision applications, anomaly detection applications, and voice recognition or natural language processing, those of ordinary skill in the pertinent arts will recognize that the systems and methods disclosed herein are not so limited. Rather, the artificial intelligence solutions and machine learning models disclosed herein may be utilized in connection with the performance of any task or in connection with any type of application having any industrial, commercial, recreational or other use or purpose.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow charts of FIGS. 3A and 3B, 5, 7, 9, 11A and 11B, and 13, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to a stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. A system comprising:
   an artificial intelligence engine; and
   a plurality of servers, wherein each of the plurality of servers is associated with one of a plurality of end users,
   wherein the artificial intelligence engine is in communication with each of the plurality of servers over at least one network, and
   wherein the artificial intelligence engine includes one or more computer processors configured to at least:
      receive at least a first plurality of images from at least one of the plurality of end users;
      identify a first plurality of annotations, wherein each of the first plurality of annotations identifies at least a portion of one of the first plurality of images that depicts at least a portion of an object of a type;
      modify at least a second plurality of images, wherein each of the second plurality of images is one of the first plurality of images;
      define a set of training inputs, wherein the set of training inputs comprises:
         at least some of the second plurality of images; and
         a third plurality of images, wherein each of the third plurality of images is one of the first plurality of images and not one of the second plurality of images; define a set of training outputs, wherein the set of training outputs comprises:
      a second plurality of annotations, wherein each of the second plurality of annotations identifies at least a portion of one of the second plurality of images that depicts at least the portion of the object of the type; and
      a third plurality of annotations, wherein each of the third plurality of annotations identifies at least a portion of one of the third plurality of images that depicts at least the portion of the object of the type;
      train a machine learning tool to detect at least a portion of the object of the type within an image using the training inputs and the training outputs; and
      distribute code for operating the machine learning tool to at least some of the plurality of servers.

2. The system of claim 1, wherein the one or more computer processors are configured to modify at least the second plurality of images by at least one of:
   rotating one of the second plurality of images by a predetermined angle;
   zooming the one of the second plurality of images by a predetermined ratio;
   cropping at least a portion of the one of the second plurality of images, wherein the cropped portion depicts at least the portion of the object of the type; or
   varying a contrast of the portion of the one of the second plurality of images by a predetermined amount.

3. The system of claim 1, wherein each of the plurality of end users is associated with one of a hospital, a university, a research laboratory, a military facility, a financial institution, a manufacturing facility or a retail establishment.

4. A computer-implemented method comprising:
  identifying a first plurality of data points, wherein each of the first plurality of data points is associated with performance of a computer-based task by at least one computer device;
  identifying a first plurality of annotations, wherein each of the first plurality of annotations identifies at least a portion of one of the first plurality of data points that is relevant to the performance of the computer-based task;
  modifying at least some of the first plurality of data points, wherein each of the modified first plurality of data points is relevant to the performance of the computer-based task;
  defining a training set, wherein the training set comprises:
    a second plurality of data points, wherein each of the second plurality of data points is a modified one of the first plurality of data points; and
    a second plurality of annotations, wherein each of the second plurality of annotations is one of the first plurality of annotations that identifies at least the portion of one of the second plurality of data points that is relevant to the performance of the computer-based task;
  training a first machine learning model to perform the computer-based task based at least in part on the training set; and
  distributing code for operating the first machine learning model to a plurality of end users over at least one computer network.

5. The computer-implemented method of claim 4, wherein modifying the at least some of the first plurality of data points comprises:
  rotating, zooming, cropping or filtering each of the at least some of the first plurality of data points.

6. The computer-implemented method of claim 4, wherein the computer-based task comprises detecting objects in imaging data,
  wherein each of the first plurality of data points comprises an image,
  wherein each of the images depicts at least a portion of at least one object, and
  wherein each of the first plurality of annotations identifies a portion of one of the images that depicts the portion of the at least one object.

7. The computer-implemented method of claim 4, wherein the computer-based task comprises natural language processing,
  wherein each of the first plurality of data points comprises an acoustic signal,
  wherein each of the acoustic signals includes at least one spoken word, and
  wherein each of the first plurality of annotations is a label of one of the at least one spoken word or a part of speech of the at least one spoken word in one of the acoustic signals.

8. The computer-implemented method of claim 4, wherein the computer-based task comprises detecting anomalies in data,
  wherein at least some of the first plurality of data points are anomalous, and
  wherein each of the first plurality of annotations indicates whether one of the first plurality of data points is anomalous or not anomalous.

9. The computer-implemented method of claim 4, wherein the first machine learning model is an artificial neural network comprising an input layer having a first plurality of neurons, at least one hidden layer having at least a second plurality of neurons, and an output layer having a third plurality of neurons,
  wherein a first connection between at least one of the first plurality of neurons and at least one of the second plurality of neurons has a first synaptic weight in the first machine learning model,
  wherein a second connection between at least one of the second plurality of neurons and at least one of the third plurality of neurons has a second synaptic weight in the first machine learning model, and
  wherein training the first machine learning model to perform the computer-based task based at least in part on the training set comprises:
    selecting at least one of the first synaptic weight for the first connection or the second synaptic weight for the second connection based at least in part on at least some of the second plurality of data points and at least some of the second plurality of annotations.

10. The computer-implemented method of claim 9, further comprising:
  receiving feedback regarding effectiveness of the first machine learning model in performing the computer-based task from at least one of the plurality of end users;
  selecting at least one of a third synaptic weight for the first connection or a fourth synaptic weight for the second connection based at least in part on the feedback;
  generating code for operating a second machine learning model comprising the input layer, the at least one hidden layer and the output layer, wherein the first connection has the third synaptic weight in the second machine learning model and wherein the second connection has the fourth synaptic weight in the second machine learning model; and
  distributing the code for operating the second machine learning model to at least some of the plurality of end users over the at least one computer network.

11. The computer-implemented method of claim 10, wherein the feedback comprises information regarding a difference between the first machine learning model and a third machine learning model, and
  wherein the third machine model is trained by the first end user to perform the computer-based task based at least in part on second data captured by at least the first end user.

12. The computer-implemented method of claim 10, wherein the feedback comprises information regarding a difference between at least a first result generated by the first machine learning model in response to at least one of a third plurality of data points and a second result identified by a human operator for the at least one of the third plurality of data points.

13. The computer-implemented method of claim 10, wherein receiving the feedback regarding the effectiveness of the first machine learning model in performing the computer-based task comprises:
  receiving a plurality of differences from a plurality of computer devices over a computer network, wherein each of the plurality of computer devices is associated with one of the plurality of end users, wherein each of the plurality of differences is a difference between the first machine learning model and a machine learning model trained by one of the computer devices based at least in part on the first trained machine learning model and data obtained by the one of the computer devices that is homomorphically encrypted by the one of the computer devices, and wherein the plurality of differences are sequentially averaged.

14. The computer-implemented method of claim 4, further comprising:
splitting the first data into the training set and a test set, wherein the test set comprises a third plurality of data points and a third plurality of annotations, and
testing the training of the first machine learning model based at least in part on the test set.

15. The computer-implemented method of claim 4, wherein the first machine learning model is one of:
an artificial neural network, a deep learning system, a support vector machine, a nearest neighbor analysis, a factorization method, a K-means clustering technique, a similarity measure, a latent Dirichlet allocation, a decision tree or a latent semantic analysis.

16. The computer-implemented method of claim 4, wherein at least some of the first plurality of data points are received from at least one of:
a computer device associated with an end user of the plurality of end users; or
a computer device associated with an open source.

17. The computer-implemented method of claim 4, wherein receiving the first data associated with the computer-based task comprises:
providing at least the first plurality of data points as a first input to at least one authentication function;
determining a first value corresponding to at least the first plurality of data points based at least in part on a first output received from the at least one authentication function in response to the first input; and
storing the first value in association with the first plurality of data points in at least one data store,
wherein modifying the at least some of the first plurality of data points comprises:
retrieving the at least some of the first plurality of data points from the at least one data store;
providing the at least some of the first plurality of data points as a second input to the at least one authentication function;
determining a second value corresponding to the at least some of the first plurality of data points based at least in part on a second output received from the at least one authentication function in response to the second input; and
determining that the second value is consistent with the first value, and
wherein the at least some of the first plurality of data points are modified in response to determining that the second value is consistent with the first value.

18. The computer-implemented method of claim 4, wherein modifying the at least some of the first plurality of data points comprises:
causing a display of a first user interface on a computer display associated with a first computer device associated with a first end user, wherein the first user interface indicates that the at least some of the first plurality of data points are being modified by an artificial intelligence engine,
wherein defining the training set comprises:
causing a display of a second user interface on the computer display associated with the first computer device, wherein the second user interface indicates that the training set has been defined to include the second plurality of data points and the second plurality of annotations, and
wherein the method further comprises:
causing a display of a third user interface on the computer display associated with the first computer device, wherein the third user interface includes information regarding effectiveness of the first machine learning model in performing the computer-based task on the first computer device.

19. A computer-implemented method comprising:
receiving, by an artificial intelligence engine over a computer network, a plurality of data points, wherein each of the data points is received from one of a plurality of end users engaged in performance of a computer-based task, and wherein each of the data points relates to the computer-based task;
receiving, by the artificial intelligence engine, a plurality of annotations, wherein each of the annotations identifies a portion of a corresponding one of the data points that is relevant to the computer-based task;
executing, by the artificial intelligence engine, a modification to at least some of the plurality of data points;
defining a training set of training inputs and training outputs, wherein the training inputs comprises each of the plurality of data points and each of the modified at least some of the plurality of data points, and wherein the training outputs comprises the plurality of annotations;
training a machine learning model to perform the computer-based task based at least in part on the training inputs and the training outputs;
generating code for operating the machine learning model, wherein the code defines a matrix of weights associated with the machine learning model, and wherein at least one of the matrix of weights is defined based at least in part on the modified at least some of the plurality of data points; and
distributing the code for operating the machine learning model to each of the plurality of end users over a computer network.

20. The computer-implemented method of claim 19, wherein each of the first plurality of data points is one of imaging data or acoustic data.

* * * * *